United States Patent
Cao

(10) Patent No.: US 11,695,451 B2
(45) Date of Patent: Jul. 4, 2023

(54) ELECTRONIC DEVICE, COMMUNICATION METHOD AND STORAGE MEDIUM

(71) Applicant: Sony Group Corporation, Tokyo (JP)

(72) Inventor: Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 95 days.

(21) Appl. No.: 17/288,572

(22) PCT Filed: Nov. 26, 2019

(86) PCT No.: PCT/CN2019/120902
§ 371 (c)(1),
(2) Date: Apr. 26, 2021

(87) PCT Pub. No.: WO2020/108473
PCT Pub. Date: Jun. 4, 2020

(65) Prior Publication Data
US 2021/0391899 A1 Dec. 16, 2021

(30) Foreign Application Priority Data
Nov. 28, 2018 (CN) .......................... 201811432397.6

(51) Int. Cl.
*H04B 7/0408* (2017.01)
*H04B 17/373* (2015.01)
(Continued)

(52) U.S. Cl.
CPC ......... *H04B 7/0408* (2013.01); *H04B 7/0413* (2013.01); *H04B 7/0695* (2013.01); *H04B 7/0897* (2013.01); *H04B 17/373* (2015.01)

(58) Field of Classification Search
CPC .. H04B 7/0413; H04B 7/0408; H04B 17/373; H04B 7/0897; H04B 7/0695; H04L 5/0023; H04L 5/0053
See application file for complete search history.

(56) References Cited

U.S. PATENT DOCUMENTS

| | | |
|---|---|---|
| 2015/0236774 A1 | 8/2015 | Son et al. |
| 2017/0047976 A1 | 2/2017 | Noh et al. |
| 2019/0297637 A1* | 9/2019 | Liou ................. H04W 72/1273 |

FOREIGN PATENT DOCUMENTS

| | | |
|---|---|---|
| CN | 107888266 A | 4/2018 |
| CN | 108882274 A | 11/2018 |

OTHER PUBLICATIONS

International Search Report and Written Opinion dated Feb. 12, 2020, received for PCT Application PCT/CN2019/120902, Filed on Nov. 26, 2019, 8 pages including English Translation.

(Continued)

*Primary Examiner* — Rahel Guarino
(74) *Attorney, Agent, or Firm* — Xsensus LLP

(57) ABSTRACT

The present disclosure relates to electronic device, communication method and storage medium in a wireless communication system. There is provided an electronic device on user device side, comprising a processing circuitry configured to: receive, from a control device, configuration on an association between a first reference signal and a second reference signal; receive, from the control device, an indication for the first reference signal; and in response to the indication for the first reference signal, implement reception of a third reference signal by using spatial reception parameters for the second reference signal based on the association between the first reference signal and the second reference signal.

16 Claims, 26 Drawing Sheets

(51) Int. Cl.
*H04B 7/0413* (2017.01)
*H04B 7/06* (2006.01)
*H04B 7/08* (2006.01)

(56) References Cited

OTHER PUBLICATIONS

3rd Generation Partnership Project:"3rd Generation Partnership Project; Technical Specification Group Radio Access Network; NR; Physical layer procedures for data (Release 15)",3GPP Standard; Technical Specification;3GPP TS 38.214, 3rd Generation Partnership Project (3GPP), Mobile Competence Centre; 650, Route Des Lucioles; F-06921 Sophia-Antipolis Cedex; France, No. V15.3.0, Oct. 1, 2018 (Oct. 1, 2018),pp. 1-96, XP051487513,* Section 5.1.5;p. 26-p. 28 ** Section 6.2.1;p. 85-p. 86 *.

Ericsson: "Maintenance for Reference signals and QCL",3GPP Draft; RI-1813250 Maintenance for RS and QCL, 3rd Generation Partnership Project (3GPP), Mobile Competence Centre;650, Route Des Lucioles; F-06921 Sophia-Antipolis Cedex; France, vol. RAN WG1, No. Spokane, USA;Nov. 12, 2018-Nov. 16, 2018 Nov. 11, 2018 (Nov. 11, 2018), XP051555259, Retrieved from the Internet: URL:http://www.3gpp.org/ftp/Meetings%5F3GPP%5FSYNC/RAN1/Docs/RI%2D1813250%2Ezip, R1-1813250.

Qualcomm Incorporated: "Maintenance on Reference Signals and QCL", 3GPP Draft; RI-1809504, 3rd Generation Partnership Project (3GPP), Mobile Competence Centre; 650, Route Des Lucioles; F-06921 Sophia-Antipolis Cedex; France Aug. 17, 2018 (Aug. 17, 2018), pp. 1-25, XP051516867, Retrieved from the Internet: URL:http://www.3gpp.org/ftp/tsg%5Fran/WG1%5FRL1/TSGR1%5F94/Docs/RI%2D1809504%2Ezip, R1-1809504.

Communication pursuant to Rule 164(1) EPC, dated Feb. 18, 2022, in corresponding European Patent Application 19888686.3.

\* cited by examiner

PUCCH SpatialRelationInfo

SRS SpatialRelationInfo

ELECTRONIC DEVICE, COMMUNICATION METHOD AND STORAGE MEDIUM

CROSS-REFERENCE TO RELATED APPLICATIONS

The present application is based on PCT filing PCT/CN2019/120902, filed Nov. 26, 2019, which claims priority of Chinese Patent Application No. 201811432397.6 filed on Nov. 28, 2018, the entirety of each are incorporated here by reference.

FIELD OF THE INVENTION

The present disclosure relates to electronic device, communication method, and storage medium, in particular, to electronic device, communication method, and storage medium for beam indication in a wireless communication system.

BACKGROUND

With the advent of the 5G era, the number of users and the rate requirement per user have increased significantly, and the need for further expansion of the spatial domain has become more urgent. Large-scale antenna technology has become one of the key technologies of 5G communication because of its huge potential in improving efficiency of system spectrum and rate experienced by user.

In a wireless communication system using the large-scale antenna technology, base station and user equipment (UE) have multiple antennas, and antennas of the base station and antennas of the UE can form a spatial beam with narrow directivity through beamforming to provide a stronger power coverage in a specific direction, so as to combat the large path loss that exists in the high-frequency channel. Many beams with different transmitting directions are used to achieve a larger coverage area. In order to improve reception quality of the beam signal, the base station and the UE need to select a beam that matches the channel direction as much as possible, that is, on the transmitting side, the transmitting beam is aligned with Angle of Departure (AOD) of the channel, and on the receiving side, the receiving beam is aligned with Angle of Arrival (AOA) of the channel.

Typically, the base station and the UE can determine the transmitting beam and the receiving beam to be used by means of beam training. Beam training may generally include steps such as beam measurement, beam reporting, and beam indication. More specifically, the base station may transmit a set of beams with mutually different directions, and the UE measures the quality of each received beam and reports the measurements to the base station, so that the base station can select the optimal beam among them. The base station may indicate the selected optimal beam to the UE with a transmission configuration indication (TCI) state, for example.

However, there may be cases where there is no suitable TCI state for performing the beam indication. For example, in the first standard R15 of 5G New Radio (5G NR), the base station can configure at most 64 TCI states for the UE, but these TCI states may not correspond to the selected optimal beam, and thus cannot be used to indicate the optimal beam. In addition, reconfiguring the TCI states for the UE will consume a lot of resources.

Therefore, there is a need for improving the beam indication mechanism in order to increase the efficiency of beam indication.

SUMMARY OF THE INVENTION

Aspects are provided by the present disclosure to satisfy the above-mentioned need.

A brief overview regarding the present disclosure is given below to provide a basic understanding on some aspects of the present disclosure. However, it will be appreciated that the overview is not an exhaustive description of the present disclosure. It is not intended to specify key portions or important portions of the present disclosure, nor to limit the scope of the present disclosure. It aims at merely describing some concepts about the present disclosure in a simplified form and serves as a preorder of a more detailed description to be given later.

According to one aspect of the present disclosure, there is provided an electronic device on user device side, comprising a processing circuitry configured to: receive, from a control device, configuration on an association between a first reference signal and a second reference signal; receive, from the control device, an indication for the first reference signal; and in response to the indication for the first reference signal, implement reception of a third reference signal by using spatial reception parameters for the second reference signal based on the association between the first reference signal and the second reference signal.

According to one aspect of the present disclosure, there is provided an electronic device on control device side, comprising a processing circuitry configured to: send, to a user device, configuration on an association between a first reference signal and a second reference signal; and send, to the user device, an indication for the first reference signal; wherein in response to the indication for the first reference signal, the user device implements reception of a third reference signal by using spatial reception parameters for the second reference signal based on the association between the first reference signal and the second reference signal.

According to one aspect of the present disclosure, there is provided an electronic device on user device side, comprising: a processing circuitry configured to: receive, from a control device, configuration on an association between a first reference signal and a second reference signal; receive, from the control device, an indication for the first reference signal; and in response to the indication for the first reference signal, implement transmission of a third reference signal by using spatial reception parameters or spatial transmission parameters for the second reference signal based on the association between the first reference signal and the second reference signal.

According to one aspect of the present disclosure, there is provided an electronic device on control device side, comprising a processing circuitry configured to: send, to a user device, configuration on an association between a first reference signal and a second reference signal; and send, to the user device, an indication for the first reference signal; wherein in response to the indication for the first reference signal, the user device implements transmission of a third reference signal by using spatial reception parameters or spatial transmission parameters for the second reference signal based on the association between the first reference signal and the second reference signal.

According to one aspect of the present disclosure, there is provided an electronic device on user device side, comprising a processing circuitry configured to: receive, from a control device, activation information for a first set of transmission configuration indication (TCI) states, wherein each of the first set of TCI states is respectively associated with a corresponding one of a second set of TCI states; receive, from the control device, indication information for a specific TCI state in the first set of TCI states and association enabling information; and in a case where the association enabling information indicates enablement of association, determine spatial reception parameters based on an TCI state in the second set of TCI states associated with the specific TCI state.

According to one aspect of the present disclosure, there is provided an electronic device on control device side, comprising a processing circuitry configured to: send, to a user device, activation information for a first set of transmission configuration indication (TCI) states, wherein each of the first set of TCI states is respectively associated with a corresponding one of a second set TCI states; and send, to the user device, indication information for a specific TCI state in the first set of TCI states and association enabling information, wherein in a case where the association enabling information indicates enablement of association, a TCI state in the second set of TCI states associated with the specific TCI state is used by the user device to determine spatial reception parameters.

According to one aspect of the present disclosure, there is provided a communication method, comprising: receiving, from a control device, configuration on an association between a first reference signal and a second reference signal; receiving, from the control device, an indication for the first reference signal; and in response to the indication for the first reference signal, implementing reception of a third reference signal by using spatial reception parameters for the second reference signal based on the association between the first reference signal and the second reference signal.

According to one aspect of the present disclosure, there is provided a communication method, comprising: sending, to a user device, configuration on an association between a first reference signal and a second reference signal; and sending, to the user device, an indication for the first reference signal; wherein in response to the indication for the first reference signal, the user device implements reception of a third reference signal by using spatial reception parameters for the second reference signal based on the association between the first reference signal and the second reference signal.

According to one aspect of the present disclosure, there is provided a communication method, comprising: receiving, from a control device, configuration on an association between a first reference signal and a second reference signal; receiving, from the control device, an indication for the first reference signal; and in response to the indication for the first reference signal, implementing transmission of a third reference signal by using spatial reception parameters or spatial transmission parameters for the second reference signal based on the association between the first reference signal and the second reference signal.

According to one aspect of the present disclosure, there is provided a communication method, comprising: sending, to a user device, configuration on an association between a first reference signal and a second reference signal; and sending, to the user device, an indication for the first reference signal; wherein in response to the indication for the first reference signal, the user device implements transmission of a third reference signal by using spatial reception parameters or spatial transmission parameters for the second reference signal based on the association between the first reference signal and the second reference signal.

According to one aspect of the present disclosure, there is provided a communication method, comprising: receiving, from a control device, activation information for a first set of transmission configuration indication (TCI) states, wherein each of the first set of TCI states is respectively associated with a corresponding one of a second set of TCI states; receiving, from the control device, indication information for a specific TCI state in the first set of TCI states and association enabling information; and in a case where the association enabling information indicates enablement of association, determining spatial reception parameters based on an TCI state in the second set of TCI states associated with the specific TCI state.

According to one aspect of the present disclosure, there is provided a communication method, comprising: sending, to a user device, activation information for a first set of transmission configuration indication (TCI) states, wherein each of the first set of TCI states is respectively associated with a corresponding one of a second set TCI states; and sending, to the user device, indication information for a specific TCI state in the first set of TCI states and association enabling information, wherein in a case where the association enabling information indicates enablement of association, a TCI state in the second set of TCI states associated with the specific TCI state is used by the user device to determine spatial reception parameters.

According to one aspect of the present disclosure, there is provided a non-transitory computer readable storage medium storing executable instructions which, when executed, perform any of the above communication methods.

DESCRIPTION OF THE DRAWINGS

A better understanding of the present disclosure may be achieved by referring to a detailed description given hereinafter in connection with accompanying figures, wherein the same or similar reference signs are used to indicate the same or similar components throughout the figures. The figures are included in the specification and form a part of the specification along with the following detailed descriptions, for further illustrating embodiments of the present disclosure and for explaining the theory and advantages of the present disclosure. Wherein.

Further features of the present invention will become apparent from the following description of exemplary embodiments with reference to the attached drawings.

DETAILED DESCRIPTION OF PREFERRED EMBODIMENTS

Various illustrative embodiments of the present disclosure will be described hereinafter with reference to the drawings. For purpose of clarity and simplicity, not all features are described in the specification. Note that, however, many settings specific to the implementations can be made in practicing the embodiments of the present disclosure according to specific requirements, so as to achieve specific goals of the developers, for example, to comply with the limitations related to apparatus and service, and these limitations may vary from implementations. Furthermore, it will be appreciated that the developing work will be a routine task, despite complex and tedious, for those skilled in the art who benefit from the present disclosure.

In addition, it should be noted that the figures illustrate only steps of a process and/or components of a device that are closely related to the technical solutions according to the present disclosure, and omit other details that are in little relation to the invention. The following description of illustrative embodiments are merely explanatory and should not be regarded as any limit to the scope of the present disclosure and the applications thereof.

For convenient explanation of the technical solutions of the present disclosure, various aspects of the present disclosure will be described below in the context of 5G NR. However, it should be noted that this is not a limitation on the scope of application of the present disclosure. One or more aspects of the present disclosure can also be applied to wireless communication systems that have been commonly used, such as 4G LTE/LTE-A, or various wireless communication systems to be developed in future. The architecture, entities, functions, processes and the like as described in the following description are not limited to those in the NR communication system, but can be found in other communication standards.

OVERVIEW

Figure 1:
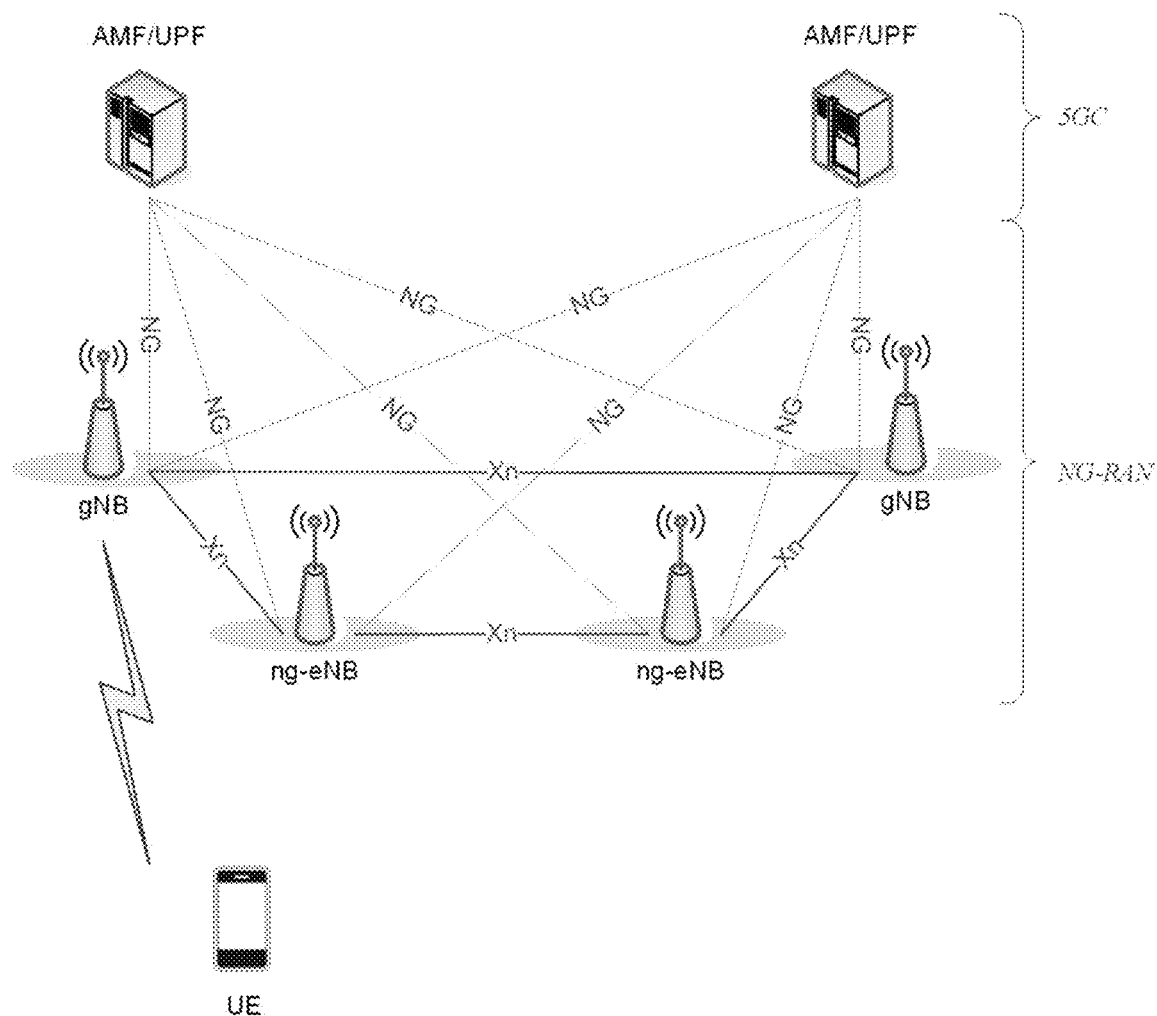
FIG. 1 is a simplified diagram showing the architecture of the NR communication system.

FIG. 1 is a simplified diagram showing the architecture of 5G NR communication system. As shown in FIG. 1, on the network side, the radio access network (NG-RAN) nodes of the NR communication system include gNB and ng-eNB, wherein gNB is a newly defined node in the 5G NR communication standard, and it is connected to 5G core network (5GC) via a NG interface, and provides the NR user plane and control plane protocols terminating with terminal equipment (also referred to as "user equipment", hereinafter referred to as "UE"); ng-eNB is a node defined to be compatible with the 4G LTE communication system, and it can be upgradation of evolved Node B (eNB) of the LTE radio access network, connects a device to the 5G core network via the NG interface, and provides user plane and control plane protocols of an evolved universal terrestrial radio access (E-UTRA) terminating with the UE. Hereinafter. The gNB and ng-eNB are collectively referred to as "base station".

However, it should be noted that the term "base station" used in the present disclosure is not limited to the above two types of nodes, but serves as an example of a control device on the network side, and has the full breadth of its usual meaning. For example, in addition to the gNB and ng-eNB specified in the 5G communication standard, depending on the scenario in which the technical solution of the present disclosure is applied, the "base station" may also be, for example, an eNB in the LTE communication system, a remote radio head, a wireless access point, a drone control tower, a control node in an automated factory, or a communication device that performs similar functions. Application examples of the base station will be described in detail in the following chapter.

In addition, in the present disclosure, the term "UE" has the full breadth of its usual meaning, including various terminal devices or in-vehicle devices that communicate with the base station. As an example, the UE may be a terminal device such as a mobile phone, a laptop computer, a tablet computer, an in-vehicle communication device, a drone, a sensor and an actuator in an automated factory, or an element thereof. Application examples of the UE will be described in detail in the following chapter.

Figure 2A:
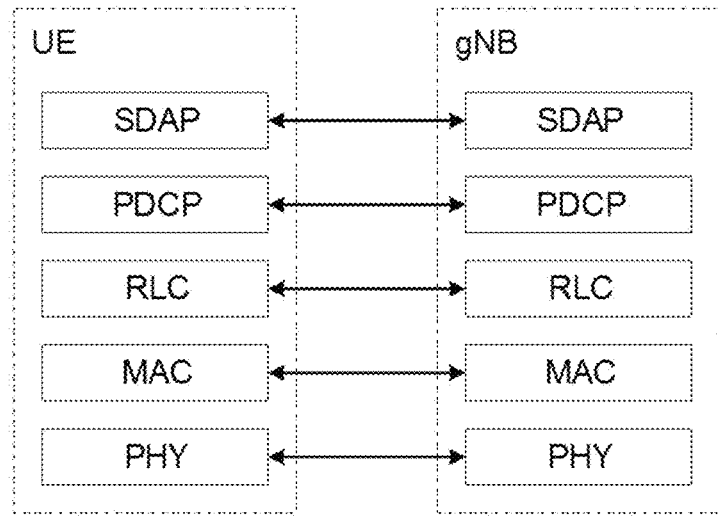
FIGS. 2A and 2B are NR radio protocol architecture in the user plane and in control plane, respectively.
Figure 2B:
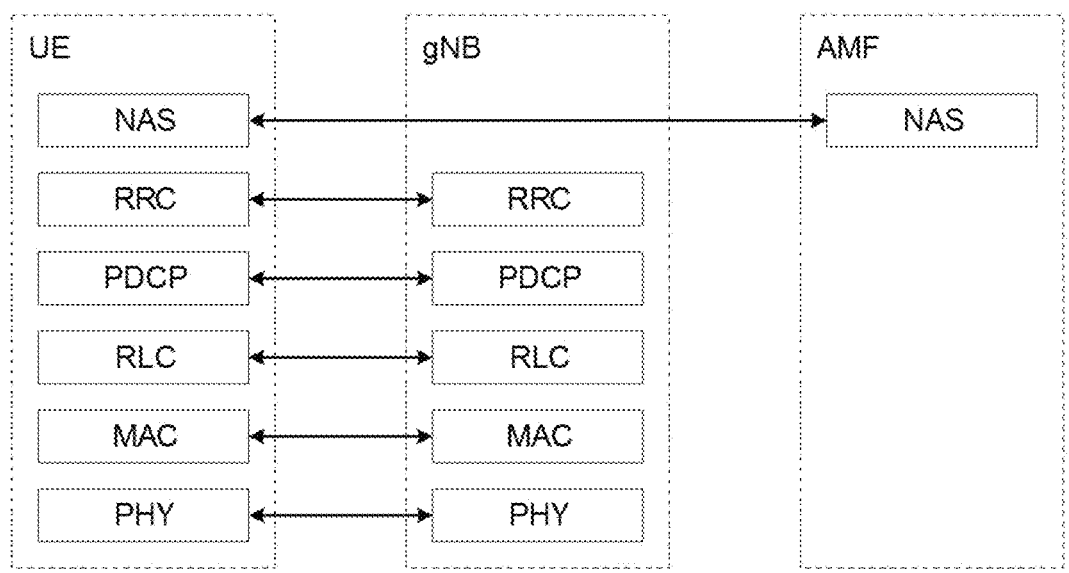

Next, the NR radio protocol architecture for the base station and UE in FIG. 1 will be introduced with reference to FIGS. 2A and 2B. FIG. 2A shows the radio protocol stack for the user plane of UE and gNB, and FIG. 2B shows the radio protocol stack for the control plane of UE and gNB. The radio protocol stack can include the following three layers: Layer 1, Layer 2, and Layer 3.

Layer 1 (L1) is the lowest layer and implements various physical-layer signal processing to provide a transparent transmission function of signals. The L1 layer will be referred to herein as physical layer (PHY).

The various signal processing functions of the L1 layer (i.e., the physical layer) implemented on the base station side will be introduced briefly. These signal processing functions include coding and interleaving to facilitate forward error correction (FEC) at the UE and mapping to signal constellations based on various modulation schemes (for example, Binary Phase Shift Keying (BPSK), Quadrature Phase Shift Keying (QPSK), M-Phase Shift Keying (M-PSK), M-Quadrature Amplitude Modulation (M-QAM)). Subsequently, the coded and modulated symbols are split into parallel streams. Each stream is then used with reference signals to generate a physical channel that carries a stream of time-domain symbols. The stream of symbols is spatially pre-coded to generate multiple spatial streams. Channel estimation can be used to determine coding and modulation schemes and for spatial processing. The channel estimation may be derived from the reference signal transmitted by the UE and/or channel condition feedback. Each spatial stream is then provided to a different antenna via a separate transmitter. Each transmitter modulates the RF carrier with its own spatial stream for transmission.

At the UE, each receiver receives the signal with its respective antenna. Each receiver recovers the information modulated on the radio frequency (RF) carrier and provides this information to various signal processing functions of the L1 layer. Spatial processing is performed on the information at the L1 layer to recover any spatial stream destined for the UE. If there are multiple spatial streams destined for the UE, they can be combined into a single symbol stream. This symbol stream is then converted from the time domain to the frequency domain. By determining the signal constellation points which are the most likely to be transmitted by the base station, each of the symbols and the reference signal are recovered and demodulated. These soft decisions can be based on the channel estimation. These soft decisions are then decoded and de-interleaved to recover the data and control signals originally transmitted by the base station on the physical channel. These data and control signals are then provided to higher-level processing.

Layer 2 (L2 layer) is above the physical layer and is responsible for the link between the UE and the base station above the physical layer. In the user plane, the L2 layer includes a medium access control (MAC) sublayer, a radio link control (RLC) sublayer, a packet data convergence protocol (PDCP) sublayer, and a service data adaptation protocol (SDAP) sublayer. They terminate with the base station (ng-eNB, gNB) on the network side, and terminate with the UE on the user side. In addition, in the control plane, the L2 layer includes a MAC sublayer, an RLC sublayer, and a PDCP sublayer. These sublayers have the following relationships: the physical layer provides transmission channels for the MAC sublayer, the MAC sublayer provides logical channels for the RLC sublayer, the RLC sublayer provides RLC channels for the PDCP sublayer, and the PDCP sublayer provides radio bearers for the SDAP sublayer.

Among them, the MAC sublayer provides services such as data transfer and radio resource allocation for the upper layers, and provides services such as data transmission, HARQ feedback signaling, scheduling request signaling, and measurement (for example, channel quality indicator CQI) for the physical layer. The MAC sublayer also provides mapping between logical channels and transport channels, multiplexing and demultiplexing of MAC service data units (SDU), reporting of scheduling information, error correction through HARQ, priority processing between UEs, and priority processing among logical channels for a single UE, padding and other functions. The MAC sublayer is responsible for allocating various radio resources (for example, resource blocks) among UEs in a cell.

The RLC sublayer provides functions such as segmentation and reassembly of upper-layer data packets, retransmission of lost data packets, and reordering of data packets. The PDCP sublayer provides multiplexing between different radio bearers and logical channels. The PDCP sublayer also provides functions such as sequence numbering, header compression and decompression, transmission of user data and control-plane data, rearrangement and duplicate detection. In addition, the PDCP sublayer also provides different functions for the user plane and the control plane. The SDAP sublayer provides functions such as mapping between QoS flows and data radio bearers, and marking QoS flow ID (QFI) in upstream and downstream data packets.

In the control plane, radio resource control (RRC) layer in Layer 3 (L3 layer) is also included in the UE and the base station. The RRC layer is responsible for obtaining radio resources (i.e., radio bearers) and for configuring the lower layers using RRC layer signaling between the base station and the UE. In addition, the non-access stratum (NAS) control protocol in the UE performs functions such as authentication, mobility management, and security control.

Both of the base station and the UE can use the massive antenna technology such as Massive MIMO. In order to support the application of MIMO technology, the base station and the UE both have many antennas, such as dozens, hundreds or even thousands of antennas. For the antenna model, a three-layer mapping relationship is generally defined around the antennas, so that it can successfully undertake the channel model and the communication standard.

The bottom layer is the most basic physical units antennas (also called antenna elements). Each of the antenna array elements radiates electromagnetic waves according to its own amplitude parameter and phase parameter.

Figure 3A:
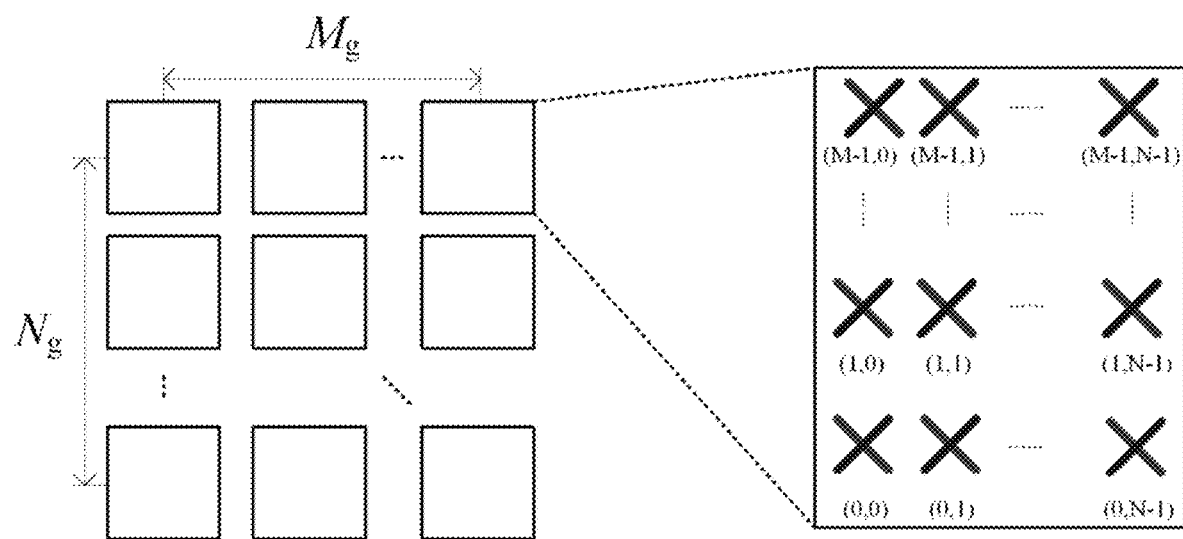
FIG. 3A shows an example of an antenna array arranged in a matrix.

The antenna elements are arranged into one or more antenna arrays in a form of matrix. An antenna array can be composed of an entire row, an entire column, multiple rows, and multiple columns of antenna array elements. In this layer, each antenna array actually constitutes a Transceiver Unit (TXRU). Each TXRU can be configured independently. By configuring the amplitude parameters and/or phase parameters for the antenna elements that make up the TXRU to adjust the TXRU antenna pattern, the electromagnetic wave radiations emitted by all the antenna elements in the antenna array form a narrow beam pointing to a specific spatial direction, that is, beamforming is implemented. Physically, one antenna panel may include at least one antenna array. FIG. 3A shows an example of antenna arrays arranged in a matrix, where $M_g$ and $N_g$ ($M_g \geq 1$, $N_g \geq 1$) represent the number of antenna arrays in the horizontal and vertical directions, respectively. The base station and the UE may include one, two or more antenna panels. Generally speaking, the base station can include more antennas (for example, up to 1024) than the UE, thereby having a stronger beamforming capability.

The TXRU and its antenna elements can be configured with a variety of correspondences, thereby changing capability and characteristics of beamforming. From the perspective of the TXRU, a single TXRU can only contain a single row or single column of antenna elements, i.e., a so-called one-dimensional TXRU, in which case the TXRU can only adjust the beam direction in one dimension; a single TXRU can also contain multiple rows or multiple columns of antenna array elements, i.e., a so-called two-dimensional TXRU, in which case the TXRU can adjust the beam direction in the horizontal and vertical dimensions. From the perspective of the antenna elements, for example, a column of antenna elements can form multiple TXRUs, but the construction may be made by partial connection in which each of the TXRUs uses only part of the antenna elements to form a beam; it may also be made by full connection in which each of the TXRUs can adjust the weighting coefficients of all antenna elements to form a beam.

Figure 3B:
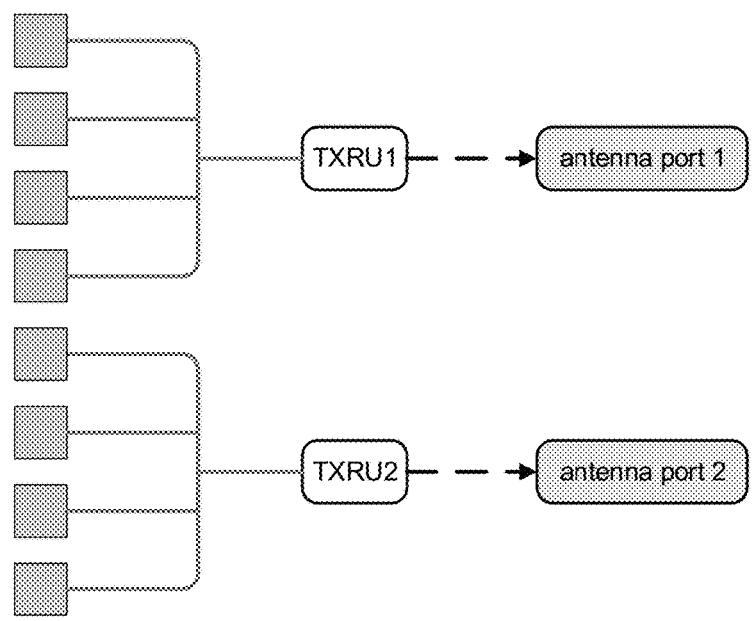
FIG. 3B illustrates transceiver units (TXRUs) and the mapping between the TXRUs and antenna ports.

Finally, one or more TXRUs form antenna ports seen at the system level by logical mapping. When one-to-one mapping is employed between the TXRU and the antenna port, the TXRU and the antenna port are equivalent, as shown in FIG. 3B. Of course, depending on the system configuration, when two or more TXRUs belong to the coherent beam selection type, they can jointly form an antenna port.

As commonly understood, "antenna port" is defined such that a channel over which a symbol on a certain antenna port is carried can be inferred from a channel over which another symbol on the same antenna port is carried. For example, for demodulation reference signal (DMRS) associated with physical downlink shared channel (PDSCH), only when both the PDSCH symbol and the DMRS symbol are in the same transmission resource scheduled for the PDSCH, that is, in the same time slot and the same resource block group (PRG), the channel carrying the PDSCH symbol on one antenna port can be inferred from the channel carrying the DMRS symbol on the same antenna port. This means that different signals transmitted by the same antenna port experience the same channel environment.

Generally speaking, an antenna port can be characterized by a reference signal. There is a one-to-one correspondence between the antenna port and the reference signal, and different antenna ports are used to transmit different reference signals. The reference signal includes, for example, channel state information reference signal (CSI-RS), cell specific reference signal (CRS), sounding reference signal (SRS), DMRS, and the like.

There may be a quasi-co-located (QCL) relationship between different antenna ports. If the large-scale properties of the channel carrying symbols on one antenna port can be inferred from the channel carrying symbols on another antenna port, then the two antenna ports are considered to be quasi-co-located. This means that when, for example, the QCL relationship is satisfied between antenna port A and antenna port B, the large-scale property parameters of channel estimated from signals on antenna port A are also suitable for signals on antenna port B. The large-scale properties include at least one of the following: delay spread, Doppler spread, Doppler shift, average gain, average delay, and spatial reception parameters. In particular, if the antenna port A and the antenna port B have a QCL relationship with respect to the spatial reception parameters, the same spatial reception parameter can be used on the receiving side to implement reception of the signals on the two antenna ports.

In this sense, an antenna port can be regarded as an identification based on air interface environment for a physical channel or a physical signal, and the channel environment of the same antenna port changes roughly the same, on basis of which, the channel estimation may be made on the receiving side to perform reception and demodulation.

The process of sending data by the base station or the UE using the antenna array is briefly described below. First, baseband signals representing a user data stream are mapped onto m (m≥1) radio frequency links by digital precoding. Each of the radio frequency links up-converts the baseband signal to obtain a radio frequency signal, and transmits the radio frequency signal to the antenna array of the corresponding antenna port. According to the transmitting direction, a set of analog beamforming parameters are applied to the antenna elements in the antenna array. The analog beamforming parameters may include, for example, phase setting parameters and/or amplitude setting parameters for the antenna elements of the antenna array. According to the corresponding analog beamforming parameters, the electromagnetic wave radiations emitted by all antenna elements of the antenna array form a desired beam in space. Receiving a beam by the antenna array has the same principle, that is, the analog beamforming parameters associated with a specific direction are applied to the antenna elements in the antenna array, so that the antenna array can receive the beam in that direction. The foregoing processing of beamforming using analog beamforming parameters may also be referred to as "analog precoding". The base station or the UE may pre-store a beamforming codebook, and the beamforming codebook includes beamforming parameters for generating a limited number of beams with different directions.

The base station or the UE can also determine the transmitting direction or the receiving direction of the beam by means of channel estimation, thereby determining the beamforming parameters associated with the beam direction.

In addition, more flexible digital beamforming can be achieved by performing precoding operations at the antenna port level, such as precoding for a single user or multiple users to achieve multi-stream or multi-user transmission.

As used in the present disclosure, the term "spatial transmission parameter" includes beamforming parameters for forming a transmitting beam directed in a specific spatial direction. The spatial transmission parameters can be codebook-based, pre-configured and stored on the transmitting side. The spatial transmission parameters may also be non-codebook-based. For example, the spatial transmission parameters may correspond to the transmitting direction or the channel direction, and the base station or the UE as the transmitter may calculate the spatial transmission parameters based on the transmitting direction or the channel direction. In an example, the spatial emission parameter may be embodied as a spatial domain transmitting filter. It should be understood that in the present disclosure, "spatial transmission parameters" may sometimes have the same meaning as "transmitting beam" used on the transmitting side.

As used in the present disclosure, the term "spatial reception parameter" includes beamforming parameters for receiving a transmitting beam from a specific spatial direction. The antenna array configured with specific spatial reception parameters can achieve optimal reception of beam signals from the corresponding spatial direction. The spatial reception parameters can be codebook-based and pre-stored on the receiving side. The spatial reception parameters may also be based on non-codebooks. For example, the spatial reception parameters may correspond to the receiving direction or the channel direction, and the base station or the UE as the receiver may calculate the spatial reception parameters based on the receiving direction or the channel direction. In an example, the spatial reception parameter may be embodied as a spatial domain receiving filter. It should be understood that in the present disclosure, "spatial reception parameters" may have the same meaning as "receiving beam" used on the receiving side.

With beamforming, the radiated energy can be mainly concentrated in a specific direction to combat path loss. In order to achieve a complete coverage, the base station and the UE need to have the ability to form many beams with different directivities, and select a transmitting beam or a receiving beam that matches the channel direction as much as possible from these beams before using beams for transmission and reception, that is, on the transmitting side, the transmitting beam is aligned with the channel angle of departure, and on the receiving side, the receiving beam is aligned with the channel angle of arrival.

The base station and UE can select beams by means of beam training. The beam training generally includes processes such as beam measurement, beam reporting, and beam indication.

Figure 4:
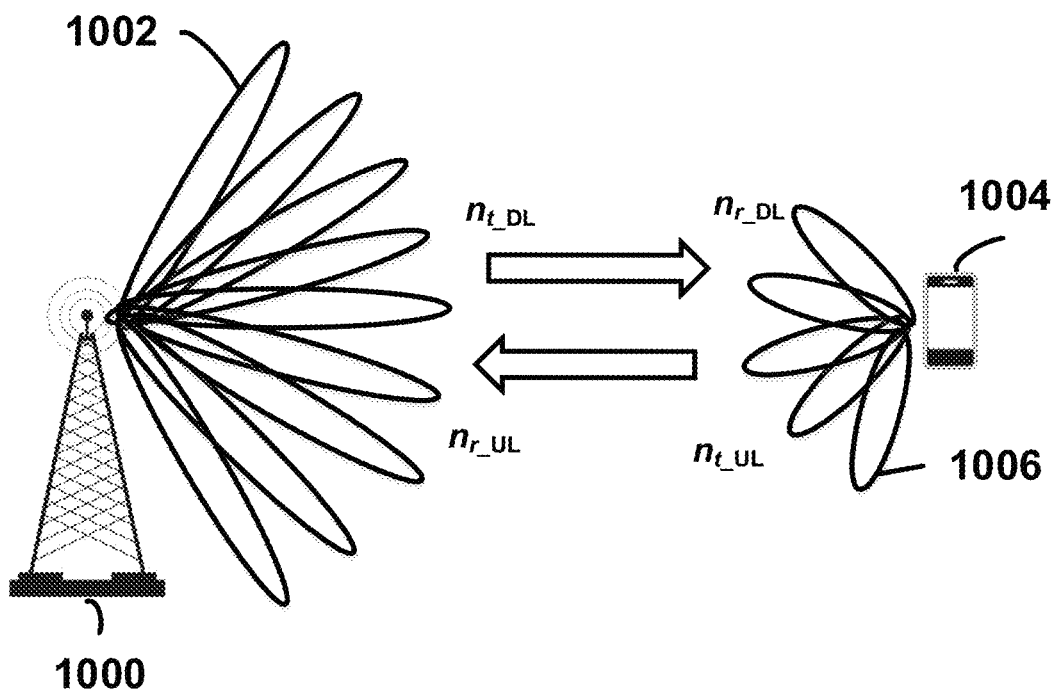
FIG. 4 schematically shows beams usable by the base station and the UE.

The beam training process in the wireless communication system will be briefly described below with reference to FIG. 4. In FIG. 4, the arrow to the right represents a downlink direction from the base station 1000 to the UE 1004, and the arrow to the left represents an uplink direction from the UE 1004 to the base station 1000. As shown in FIG. 4, the base station 1000 may use $n_{t\_DL}$ ($n_{t\_DL} \geq 1$) downlink transmitting beams with different directions, and the UE 1004 may use $n_{r\_DL}$ ($n_{r\_DL} \geq 1$) downlink receiving beams with different directions. Similarly, the base station 1000 may also use $n_{r\_UL}$ ($n_{r\_UL} \geq 1$) uplink receivinge beams with different directions, and the UE 1004 may also use $n_{t\_UL}$ ($n_{t\_UL} \geq 1$) uplink transmitting beams with different directions. Although in FIG. 4, the number of uplink receiving beams and downlink transmitting beams 1002 of the base station 1000 and the coverage of each beam are the same, the number of uplink transmitting beams and downlink receiving beams 1006 of the UE 1004 and the coverage of each beam are the same, it should be understood that, according to system requirements and settings, the coverage and number of the uplink receiving beams and the downlink transmitting beams of the base station 1000 may be different, and the same is true for the uplink transmitting beams and the downlink receiving beams of the UE 1004.

The base station 1000 and the UE 1004 traverse all transmitting beam-receiving beam combinations by scanning beams, so as to select the optimal transmitting beam-receiving beam pair. The downlink beam scanning is taken as an example. First, the base station 1000 transmits $n_{r\_DL}$ downlink reference signals to the UE 1004 by each of its $n_{t\_DL}$ transmitting beams per downlink scanning period. In this way, the $n_{t\_DL}$ transmitting beams of the base station 1000 sequentially transmit $n_{t\_DL} \times n_{r\_DL}$ downlink reference signals to the UE 1004. The $n_{t\_DL}$ transmitting beams may come from a beamforming codebook of the base station 1000, which corresponds to the respective spatial transmission parameters. Reference signal resources that can be utilized by the base station 1000 include, for example, non-zero power CSI-RS (NZP-CSI-RS) resources, synchronization signal and physical broadcast channel block (SS/PBCH Block, SSB) resources.

The UE 1004 receives each of the transmitting beams with its $n_{r\_DL}$ receiving beams 1006, and measures the beam signal. For example, the UE 1004 may measure $n_{t\_DL}$ downlink reference signals carried in each transmitting beam, and the $n_{r\_DL}$ receiving beams of the UE 1004 receive and measure $n_{t\_DL} \times n_{r\_DL}$ downlink reference signals from the base station 1000 in total. For example, the UE 1004 may measure reference signal received power (RSRP), reference signal received quality (RSRQ), signal to interference plus noise ratio (SINR), and the like.

Then, the UE 1004 reports the beam measurements to the base station 1000 in the form of a beam report. In order to reduce the amount of reported data, the UE 1004 may be configured to report only a part of beam information of the transmitting beams, for example, report only beam information of Nr (Nr is pre-configured by the base station 1000) beams. For example, the UE 1004 may report the measurements of Nr reference signals and their indicators. Due to the correspondence between the reference signal and the transmitting beam and the receiving beam, the measurement of each reference signal indicates beam information for a pair of transmitting beam-receiving beam.

Based on the reported beam information, the base station 1000 may select the optimal transmitting beam from the transmitting beams reported by the UE 1004 for downlink transmission with the UE 1004. In an example, the base station 1000 may select the transmitting beam which corresponds to the reference signal with the best measurement as the optimal transmitting beam, the direction of which transmitting beam generally best matches the channel direction and corresponds to the respective spatial reception parameter.

In order to facilitate beam reception by the UE 1004, the base station 1000 indicates the selected optimal transmitting beam to the UE 1004. For example, the base station 1000 may indicate the reference signal corresponding to the optimal transmitting beam to the UE 1004, so that the UE 1004 can determine the receiving beam which corresponds to the reference signal in the beam scanning process as the optimal receiving beam. The receiving beam achieves the best reception for the optimal transmitting beam and its direction generally best matches the channel direction. Thereafter, the base station 1000 and the UE 1004 can use the determined optimal transmitting beam and the optimal receiving beam for downlink transmission.

Similarly, in the uplink beam scanning process, the UE 10004 transmits $n_{r\_UL}$ uplink reference signals to the base station 1000 with each of its $n_{t\_UL}$ transmitting beams. In this way, the base station 1000 transmits $n_{r\_UL} \times n_{t\_UL}$ uplink reference signals in total with its $n_{r\_UL}$ receiving beams. The base station 1000 measures the $n_{r\_UL} \times n_{r\_UL}$ uplink reference signals, for example, measures RSRP, RSRQ, CQI, etc., to determine the optimal uplink transmitting beam of the UE 1004 and the optimal uplink receiving beam of the base station 1000. The base station 1000 indicates the corresponding reference signal to the UE 1004, so that the UE 1004 can use the determined optimal transmitting beam to be used for uplink transmission.

Typically, the base station can indicate the selected optimal beam to the UE by using an indication mechanism by TCI states.

Figure 5:
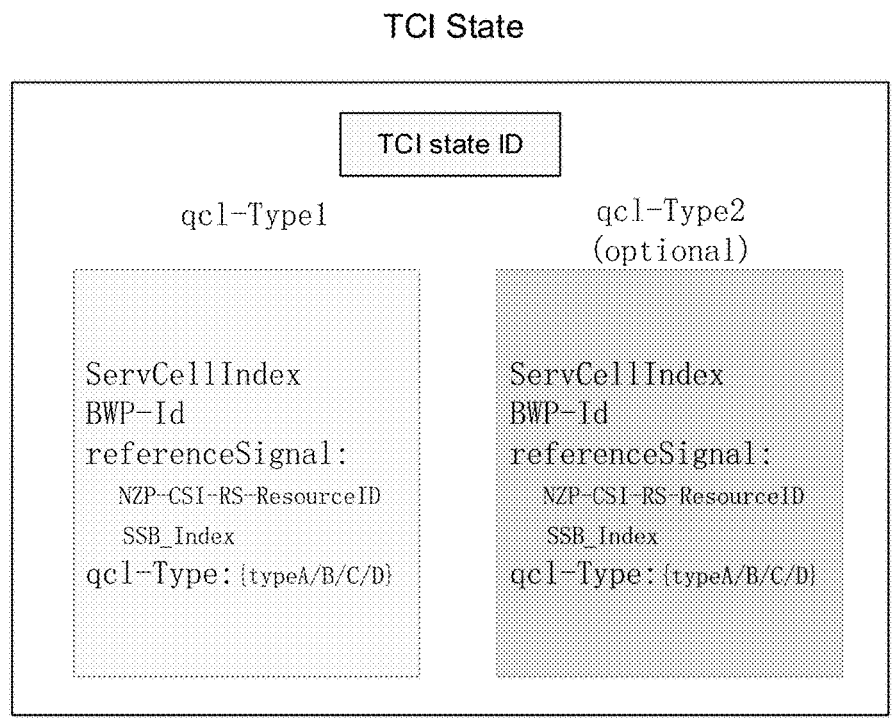
FIG. 5 is a schematic diagram illustrating configuration of the TCI state.

FIG. 5 is a configuration diagram illustrating the TCI state. As shown in FIG. 5, the TCI state is identified by TCI state ID. Each TCI state contains parameters for configuring the quasi co-location (QCL) relationship between one or two downlink reference signals and the DMRS port of PDCCH or PDSCH. For the first downlink reference signal, this quasi co-location relationship is configured by a RRC layer parameter qcl-Type1. If there is the second downlink reference signal, the quasi co-location relationship is configured by an optional qcl-Type2. As shown in FIG. 5, the qcl-Type1 or qcl-Type2 parameter include the following information:

Serving cell index (ServCellIndex), which represents the serving cell where the reference signal is located;

Bandwidth part ID (BWP-Id), which represents the downlink bandwidth part where the reference signal is located;

Reference Signal (referenceSignal), which represents a source reference signal resource for providing QCL information, including NZP-CSI-RS resource identified by NZP-CSI-RS-ResoureId and SSB resource identified by SSB-Index;

QCL type (qcl-Type), which represents the quasi co-location type corresponding to the listed downlink reference signal.

Depending on the large-scale property of the wireless channel that needs to be inferred, the QCL type qcl-Type involved in the TCI state may include the following options:

"typeA": with respect to {Doppler frequency shift, Doppler spread, average delay, delay spread};

"typeB": with respect to {Doppler frequency shift, Doppler extension};

"typeC": with respect to {Doppler shift, average delay};

"typeD": with respect to {spatial reception parameters}.

To avoid ambiguity, each TCI state generally only allows one QCL hypothesis of the type "typeD".

Among them, when the UE receives a TCI state of type D, the UE makes the following QCL hypothesis: the antenna port of the reference signal (hereinafter referred to as "source reference signal") listed in the TCI state and the antenna port of the reference signal (hereinafter referred to as the "target reference signal") indicated by the TCI state for purpose of receiving has a quasi co-location relationship with respect to the spatial reception parameters, so that the spatial reception parameters previously used to receive the source reference signal (for example, spatial domain receiving filter) can be used to receive the target reference signal.

Figure 6:
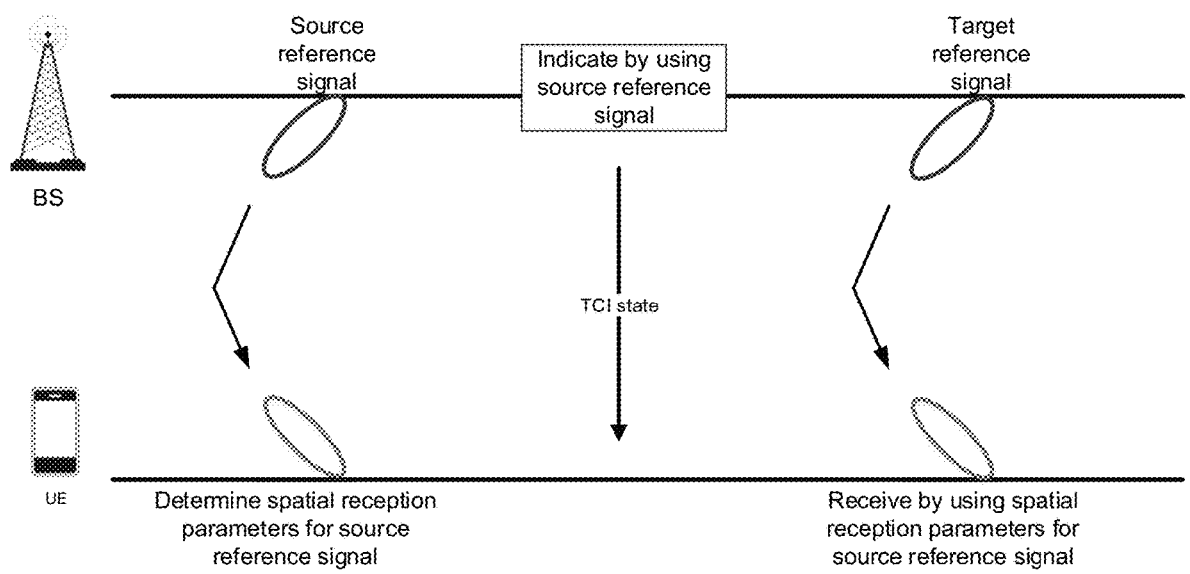
FIG. 6 is a schematic diagram illustrating the existing beam indication using the TCI states.

The existing beam indication using the TCI state will be described in more detail below with reference to FIG. 6. As shown in FIG. 6, in a process such as the downlink beam scanning, the base station transmits a source reference signal (for example, SSB or NZP-CSI-RS) to the UE with a transmitting beam, and the UE receives the source reference signal with a receiving beam, and determines the spatial reception parameters for the source reference signal. The base station determines this transmitting beam as the optimal transmitting beam of PDCCH or PDSCH under a beam selection strategy, and indicates the source reference signal corresponding to the transmitting beam to the UE. The indication for the source reference signal can be implemented by including indication information of the TCI state referring to the source reference signal in a control signaling such as MAC control element (MAC CE) or downlink control information (DCI).

The UE decodes the control signaling and extracts the TCI state, finds the qcl-Type1 or qcl-Type2 whose qcl-Type parameter is set to "typeD" in the TCI state, and finds therefrom an identifier of the source reference signal, such as NZP-CSI-RS-ResoureId or SSB-Index. The UE will assume that the port of the source reference signal and the port of the target reference signal, that is, the DMRS port of PDCCH or PDSCH scheduled by the above-mentioned control signaling, have a quasi co-location relationship with respect to spatial reception parameters, so that the UE can use the spatial reception parameters for receiving the source reference signal to receive the DMRS of the scheduled PDCCH or PDSCH for coherent demodulation of the PDCCH or PDSCH.

Seen from the base station side, the base station ensures that there is a substantial QCL relationship of typeD between the source reference signal and the target reference signal. For this reason, the transmitting beam used by the base station when transmitting the PDCCH or PDSCH is the same as the transmitting beam used when transmitting the source reference signal, or at least has the same transmission direction However, the existing beam indication mechanism faces problems regarding availability of the TCI states. For example, when the TCI state resources are scarce, and it is impossible to assign TCI states to all reference signals, resulting in the possibility that there may not be a TCI state corresponding to the source reference signal. For another example, although there is a TCI state corresponding to the source reference signal, the base station did not configure or activate the TCI state to the UE. For yet another example, the TCI state corresponding to the source reference signal is not of typeD, and cannot be used for indicating a beam to the UE. For still yet another example, the type of source reference signal is restricted to be unusable for beam indication, and so on.

Considering various problems regarding availability of the TCI states, the base station's beam selection may be restricted, so that the base station cannot select one or more beams which have the best transmission performance but lack the available TCI state, resulting in a decrease in performance of the beam indication. Alternatively, the base station needs to reconfigure and activate the TCI state for the selected optimal beam, which will undoubtedly consume a lot of processing resources and transmission resources, resulting in a decrease in efficiency of the beam indication.

In view of these, the present disclosure proposes an improved beam indication mechanism to make up for the shortcomings of the existing beam indication.

Specifically, when the base station selects the transmitting beam-receiving beam pair corresponding to the source reference signal to perform data transmission, the TCI state corresponding to the source reference signal may not exist or the TCI state corresponding to the source reference signal is not available for the beam indication, but there is an available TCI state corresponding to another reference signal (hereinafter referred to as "intermediate reference signal"). The base station can create an association between the source reference signal and the another reference signal, and configure this association to the UE through RRC layer signaling. The base station uses the intermediate reference signal to perform beam indication instead. For example, the base station may indicate the TCI state referring to the intermediate reference signal to the UE with MAC CE or DCI.

However, unlike the existing beam indication described with reference to FIG. 6, the indication by the base station using the intermediate reference signal is not intended to indicate a direct use of the spatial reception parameters for the intermediate reference signal. After receiving the indication of the intermediate reference signal, the UE implements reception of the DMRS of PDCCH or PDSCH for coherent demodulation of the PDCCH or PDSCH by using the spatial reception parameters for the source reference signal, instead of the spatial reception parameters for the intermediate reference signal, based on the association between the intermediate reference signal and the source reference signal. In the example of using the TCI state for indication, the UE finds an identifier of the intermediate reference signal from the indicated TCI state, such as NZP-CSI-RS-ResourceId or SSB-Index. However, the UE does not directly use the spatial reception parameters for the reference signal represented by the identifier to receive the target reference signal, but finds the source reference signal based on the association between the configured source reference signal and the intermediate reference signal, and uses the spatial reception parameters for the source reference signal to make preparations for reception of the PDCCH or PDSCH.

By establishing the association between the source reference signal and the intermediate reference signal, the indication of the source reference signal can be implemented via the intermediate reference signal. Therefore, the beam indication according to the present disclosure is an indirect beam indication.

The indirect beam indication according to the present disclosure provides additional flexibility. The selection of the optimal beam is no longer limited by whether there is an available TCI state corresponding to the reference signal. Even if the TCI state corresponding to the reference signal does not exist or is unavailable due to any other factors, the base station can still indirectly implement the indication of the source reference signal based on the association between the intermediate reference signal and the source reference signal.

It can be understood that by creating an association between two reference signals, the range of reference signals available for beam indication is actually expanded. Further, the present disclosure also proposes that it is possible to create an association between one set of multiple reference signals and another set of multiple reference signals, and to perform, by each reference signal in one set of reference signals, indication of itself or a corresponding reference signal of another set of reference signals, so as to further improve the efficiency of the beam indication, as described in detail below.

It should be noted that the "association" mentioned in the present disclosure refers to any form of correlation between two reference signals, as long as the base station and the UE can determine the other reference signal from one reference signal based on such correlation. The "association" can include an association between identifiers of the two reference signals, or an association between information elements (for example, TCI states, SpatialRelationInfo, etc.) that refer to the two reference signals, and also an association between an identifier of one reference signal and information element of another reference signal.

For a thorough understanding of the present disclosure, embodiments embodying various aspects of the present disclosure will be described in detail below.

First Embodiment

The first embodiment of the present disclosure relates to beam indication for downlink transmission, that is, in the first embodiment, the target reference signal is a downlink reference signal. The following description will take DMRS of PDCCH or PDSCH as an example of the target reference signal. However, it should be understood that the first embodiment of the present disclosure is also applicable to beam indication of downlink reference signals such as CSI-RS or synchronization signals.

Figure 7:
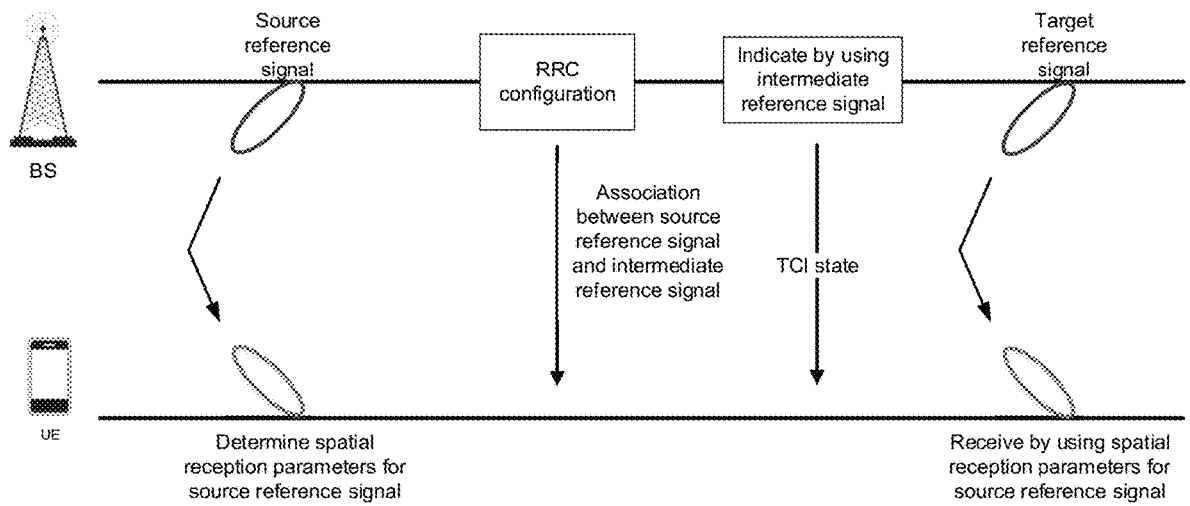
FIG. 7 is a schematic diagram illustrating beam indication according to the first embodiment.

FIG. 7 is a simplified schematic diagram illustrating beam indication according to the first embodiment. Different from the existing beam indication described with reference to FIG. 6, in the first embodiment of the present disclosure, for the reception of the target reference signal, the reference signal used by the beam indication and the reference signal providing the spatial reception parameters are two different reference signals.

In some cases, the base station wishes to transmit the target reference signal using the transmitting beam used previously to transmit the source reference signal, and accordingly, the UE receives the target reference signal by using the receiving beam used previously to receive the source reference signal. However, the base station may not have generated a TCI state having a QCL hypothesis of typeD for the source reference signal, or even this TCI state exists, the TCI state has not been configured or activated for the UE or is restricted in indicating the target reference signal.

As shown in FIG. 7, the base station can create an association between the source reference signal and another reference signal (the intermediate reference signal) having an available TCI state.

The association between the source reference signal and the intermediate reference signal can be any form of correlation.

In a preferred example, the port of the source reference signal and the port of the intermediate reference signal have a QCL relationship. More preferably, the port of the source reference signal and the port of the intermediate reference signal have a QCL relationship of typeD.

Figure 8:
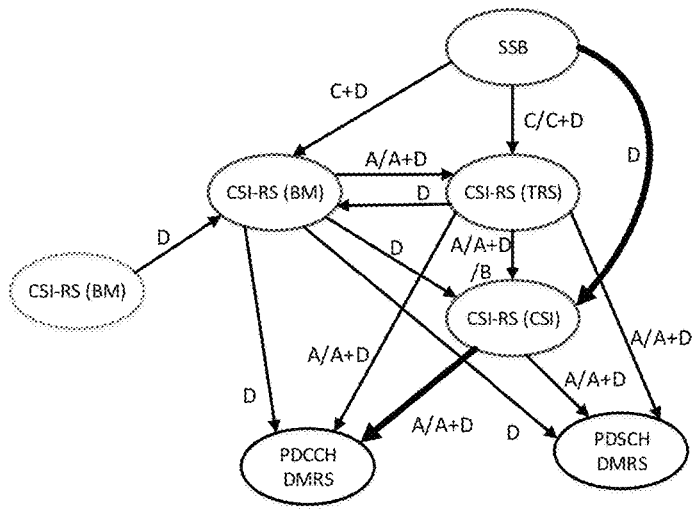
FIG. 8 is a schematic diagram illustrating QCL relationships between various reference signals.

In the 5G NR standard R15, configurable QCL relationships are defined for various reference signals. FIG. 8 is a schematic diagram illustrating the QCL relationships between various reference signals. As shown in FIG. 8, for CSI-RS used for beam management (denoted as CSI-RS (BM) in FIG. 8), it may have a QCL relationship of typeC and typeD with the SSB resource, which is denoted as a "C+D" arrow between CSI-RS (BM) and SSB. In addition, CSI-RS (BM) may also have a QCL relationship of typeD with another CSI-RS (BM) used for beam management, and a QCL relationship of typeD with CSI-RS used for tracking (indicated as CSI-RS(TRS) in FIG. 8).

Similarly, CSI-RS (TRS) used for tracking and CSI-RS (CSI) used for CSI measurement may have corresponding QCL relationships with SSB resources or CSI-RS for other purposes, respectively.

In particular, for DMRS of PDCCH or PDSCH, it may have a QCL relationship of typeD with CSI-RS (BM), a QCL relationship of typeA or typeA+typeD with CSI-RS (TRS), and a QCL relationship of typeA or typeA+typeD with CSI-RS (CSI). CSI-RS (BM), CSI-RS (TRS), and CSI-RS (CSI) all can be used to indicate a QCL relationship with respect to spatial reception parameters for DMRS of PDCCH or PDSCH.

Also, it can be seen from FIG. 8 that SSB cannot be used to directly indicate a QCL relationship for DMRS of PDCCH or PDSCH.

By means of the indirect beam indication of the present disclosure, various CSI-RSs such as CSI-RS (BM), CSI-RS (TRS) or CSI-RS (CSI) can be used as the intermediate reference signal to convey a QCL relationship between SSB and DMRS. As shown by the bold arrow in FIG. 8, a QCL relationship of typeD between SSB as the source reference signal and CSI-RS (CSI) as the intermediate reference signal can be created and, a QCL relationship of typeA+typeD between it and DMRS of PDCCH is indicated by CSI-RS (CSI). In this way, a QCL chain of SSB→CSI-RS (CSI)→DMRS can be achieved.

Obviously, the selection of the intermediate reference signal may not be limited to CSI-RS (CSI), but may be any other suitable reference signal. For example, although not shown in FIG. 8, a QCL chain of SSB→CSI-RS (BM)→DMRS or a QCL chain of CSI-RS(BM)→CSI-RS (TRS)→DMRS can be achieved similarly.

In some cases, the intermediate reference signal is not limited to one. In other words, the QCL chain from the source reference signal to the target reference signal can be achieved via two or more reference signals. For example, a QCL chain of SSB→CSI-RS(BM)→CSI-RS (TRS)→DMRS may be established, where the TCI state referring to CSI-RS(TRS) can be used for beam indication for DMRS, but the association between SSB as the source reference signal and CSI-RS (TRS) may include a QCL relationship between SSB and CSI-RS (BM) and a QCL relationship between CSI-RS (BM) and CSI-RS (TRS). A longer QCL chain is feasible, but it may complicate the indication process.

Alternatively, the association between the source reference signal and the intermediate reference signal may not be a QCL relationship of typeD. Even the relationship between the two may not be a QCL relationship, but only a nominal correlation, as long as the UE can find the source reference signal from the indicated intermediate reference signal.

Returning to FIG. 7, the base station configures the association between the source reference signal and the intermediate reference signal to the UE by RRC layer signaling. The UE receives configuration information on such association and stores it in its own memory.

Then, the base station can use the intermediate reference signal to perform beam indication. The TCI state referring to the intermediate reference signal can be indicated to the UE by MAC CE or DCI. The indication process for PDCCH transmission and PDSCH transmission will be described in detail later.

After receiving the TCI state referring to the intermediate reference signal, the UE can find an identifier of the intermediate reference signal referred to from the TCI state, such as NZP-CSI-RS-ResourceID or SSB Index.

At this time, the UE needs to interpret whether the TCI state indicates whether to directly use the spatial reception parameters for the intermediate reference signal to receive PDSCH or PDCCH, or to use the spatial reception parameters for the associated source reference signal. That is, the UE needs to determine whether to enable the association from the intermediate reference signal to the source reference signal.

In an example, the UE may determine whether to enable the association by checking the received TCI state. For example, the UE detects that the intermediate reference signal is of the type restricted in beam indication for DMRS of PDCCH or PDSCH, such as the SSB resource that cannot directly perform beam indication for PDCCH or PDSCH, in which case the UE determines that the spatial reception parameters for the intermediate reference signal cannot be used directly. For another example, the UE may determine that the TCI state does not include a QCL hypothesis of type D therein, and thus the spatial reception parameters for the intermediate reference signal cannot be directly used. For yet another example, the UE may determine that the intermediate reference signal has not been received previously, and there are no corresponding spatial reception parameters.

In response to determining that the spatial reception parameters for the intermediate reference signal cannot be used directly, the UE determines to enable the association from the intermediate reference signal to the source reference signal, and uses the spatial parameters for previously receiving the source reference signal to configure its spatial domain reception filter, so as to get ready for reception of the DMRS of PDSCH or PDCCH.

In another example, the base station may send information about whether to enable the association to the UE, so that upon receiving such information, the UE can easily determine the spatial reception parameters for which of the intermediate reference signal and the source reference signal should be used. The information about whether to enable the association can be represented by as few as 1 bit. For example, it can be sent to the UE in MAC CE or DCI along with the TCI state, and of course can also be sent to the UE by another signaling.

In response to receiving the information on enabling the association, the UE can find the source reference signal based on the association between the source reference signal and the intermediate reference signal, and use the spatial reception parameters for previously receiving the source reference signal to configure its spatial domain reception filter, so as to get ready for reception of the DMRS of PDSCH or PDCCH.

In another example, the UE may always enable the association between the source reference signal and the intermediate reference signal in a case where the association was received. In other words, configuring the association to the UE by the base station serves as a trigger to enable this association.

After the beam indication takes effect (for example, 3 ms after the TCI state is sent), the base station can use the selected transmitting beam to transmit PDCCH or PDSCH and its DMRS.

In order to ensure that the spatial reception parameters for the source reference signal can be used for the reception of the target reference signal, the antenna port of the source reference signal and the antenna port of the target reference signal need to have a QCL relationship of typeD. For this reason, the transmitting beam used by the base station when transmitting the target reference signal is the same, or at least has the same transmission direction, as the transmitting beam used when previously transmitting the source reference signal. In a case where the wireless channel has great time selectivity and frequency selectivity, the time-frequency resources (for example, time slots, subcarriers, etc.) used by the base station to transmit the source reference signal and the target reference signal are approximately the same, so that the channel environment experienced by the target reference signal is similar to the channel environment experienced by the source reference signal.

On the UE side, the source reference signal was ever received previously, for example, in the previous beam scanning process, CSI measurement process, beam tracking process, and so on. The spatial reception parameters for the source reference signal are held in the UE. In response to the indication of the intermediate reference signal and the association between the intermediate reference signal and the source reference signal, the UE makes the following assumption: the target reference signal and the source reference signal have a QCL relationship with respect to spatial reception parameters, and the spatial reception parameters for the source reference signal shall be used to implement the reception of the target reference signal.

Some examples of the indirect beam indication according to the first embodiment are described below. It should be understood that the following examples are only used to illustrate representative scenarios in which the first embodiment can be applied, and are not intended to limit the aspects of the first embodiment.

Example 1

Figure 9:
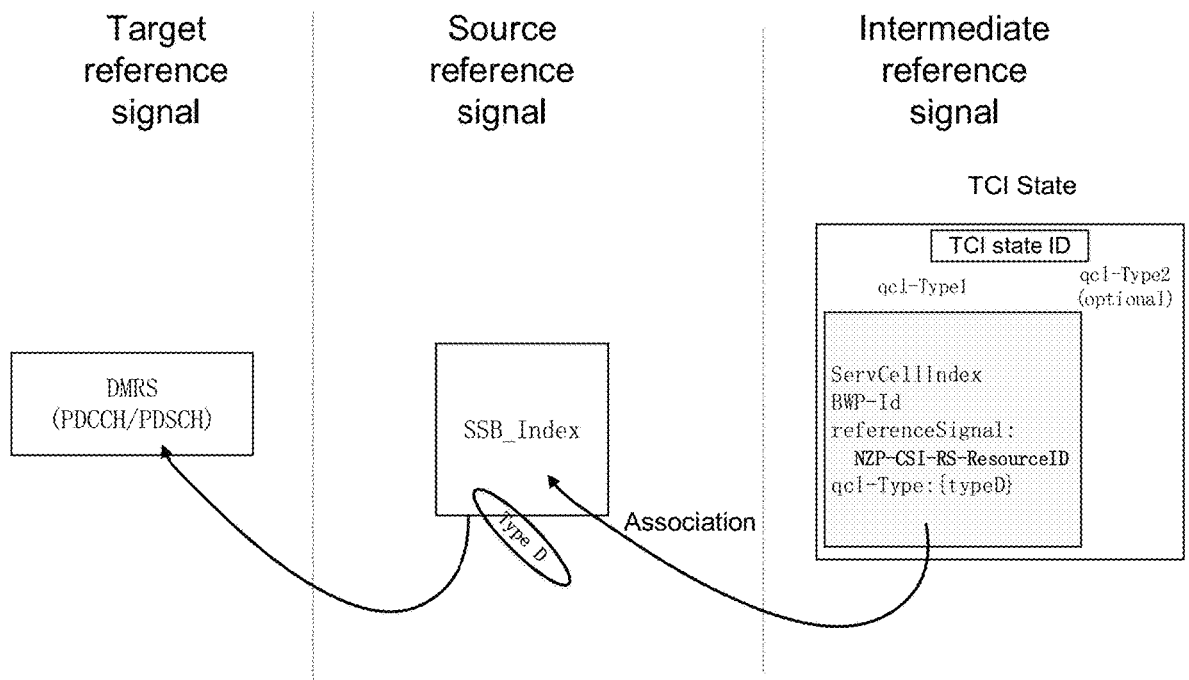
FIG. 9 is a simplified diagram of Example 1 of indirect beam indication according to the first embodiment.

FIG. 9 is a simplified diagram of Example 1 of the indirect beam indication according to the first embodiment. As shown in FIG. 9, the target reference signal is DMRS of PDCCH or PDSCH. The source reference signal is an SSB resource which is identified by SSB_Index. Since the system has restricted that SSB cannot be directly used for DMRS beam indication, NZP-CSI-RS can be used as an intermediate reference signal for indication.

The base station configures the association between the source reference signal SSB and the intermediate reference signal NZP-CSI-RS to the UE. As described above, the association includes but is not limited to the QCL relationship of typeD between SSB and NZP-CSI-RS.

The association may be established on various levels. For example, an association between an identifier SSB_Index of the SSB and an identifier NZP-CSI-RS-ResourceID of the NZP-CSI-RS, and an association between an identifier SSB_Index of the SSB and TCI state ID of a TCI state referring to the NZP-CSI-RS, an association between TCI state ID of a TCI state referring to the SSB and TCI state ID of a TCI state referring to the NZP-CSI-RS or the like may be established.

The base station indicates to the UE the TCI state that refers to the NZP-CSI-RS through MAC CE or DCI. It should be noted that the TCI state may or may not include an additional QCL hypothesis. For brevity, another optional qcl hypothesis is not shown in FIG. 9. The UE receives the indication, and finds NZP-CSI-RS-ResourceID from the QCL hypothesis of typeD (for example, qcl-Type1 in FIG. 9).

Based on the association between the NZP-CSI-RS and the source reference signal SSB, the UE finds the source reference signal identified by SSB_Index. The UE makes the following assumption: there is a QCL chain of SSB→NZP-CSI-RS→DMRS, and there is a QCL relationship of typeD between the source reference signal SSB and the target reference signal DMRS. Thus, the UE prepares for reception of the DMRS by using the spatial reception parameters previously used to receive the SSB.

Figure 10:
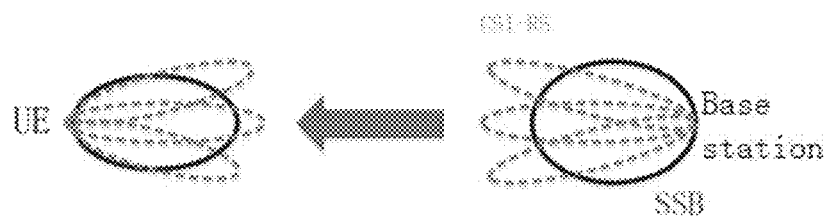
FIG. 10 is a schematic diagram illustrating beam ranges of SSB and CSI-RS.

Typically, SSB resources are used in the initial access phase, and each SSB corresponds to a relatively wide beam, so that a small number of wide beams can be used to cover the entire cell. After the initial access, CSI-RSs are used for beam management, tracking, CSI measurement and the like, and each CSI-RS may correspond to a relatively narrow beam. Therefore, as shown in FIG. 10, it may appear that the beam range of the SSB includes more than one CSI-RS, that is, more than one CSI-RS may have a QCL relationship with the SSB. The base station may select, from these CSI-RS, the CSI-RS whose main beam direction is closest to the main beam direction of the SSB as the intermediate reference signal, and notifies the UE of the QCL association between the CSI-RS and the SSB. Alternatively, the base station may select any one of these CSI-RS as the intermediate reference signal.

Example 2

Figure 11:
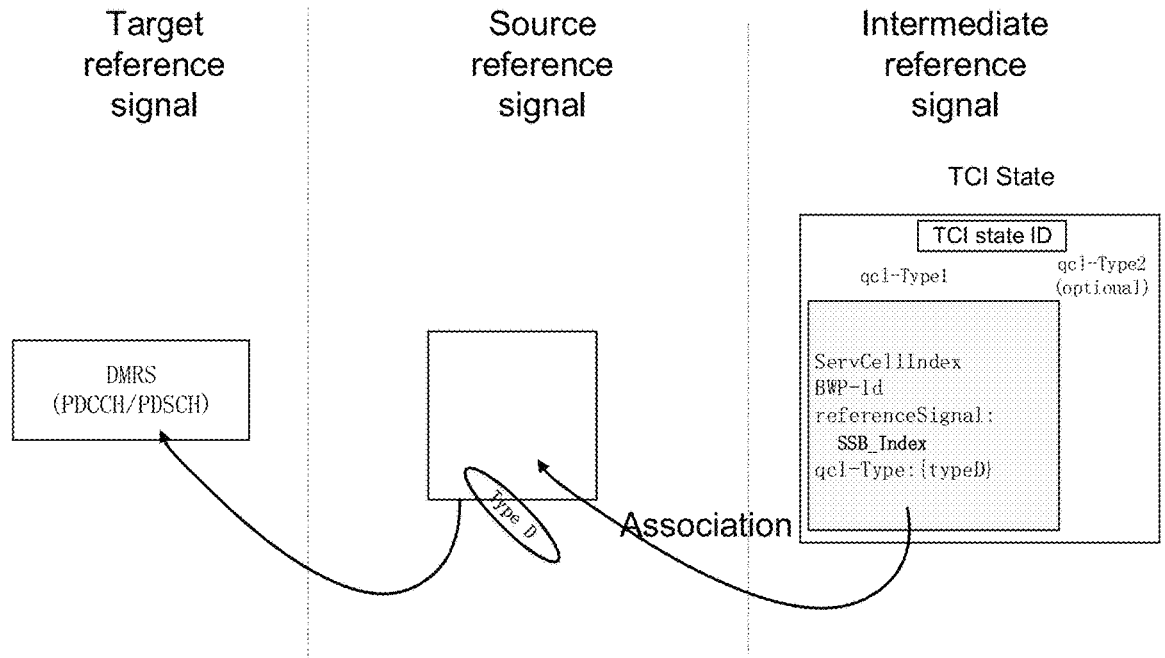
FIG. 11 is a simplified diagram of Example 2 of indirect beam indication according to the first embodiment.

FIG. 11 is a simplified diagram of Example 2 of the indirect beam indication according to the first embodiment. As shown in FIG. 11, the target reference signal is DMRS of PDCCH or PDSCH. The source reference signal is an NZP-CSI-RS resource, which is identified by NZP-CSI-RS-ResourceID.

In situations such as the initial access, in order to achieve cell coverage in a high frequency band, the base station may configure all or most of the TCI states to refer to SSB. In this way, there is not enough TCI state quota to configure other reference signals. Therefore, there may not be a TCI state corresponding to the source reference signal.

According to Example 2, the base station can use the configured TCI state referring to SSB for indirect beam indication.

The base station configures the association between the source reference signal NZP-CSI-RS and the intermediate reference signal SSB to the UE. As described above, the association includes but is not limited to a QCL relationship of typeD between the SSB and the NZP-CSI-RS.

The association may be established on various levels. For example, an association between an identifier NZP-CSI-RS-ResourceID of the NZP-CSI-RS and an identifier SSB_Index of the SSB, an association between an identifier NZP-CSI-RS-ResourceID of the NZP-CSI-RS and TCI state ID of a TCI state referring to the SSB or the like may be established.

The base station indicates to the UE the TCI state referring to the NZP-CSI-RS through MAC CE or DCI. It should be noted that the TCI state may or may not include an additional QCL hypothesis. For brevity, another optional QCL hypothesis is not shown in FIG. 11. The UE receives the indication, and finds SSB_Index from the QCL hypothesis of typeD (for example, qcl-Type1 in FIG. 11).

The UE may determine that the SSB cannot be directly used for the beam indication for DMRS, thereby enabling the association between the intermediate reference signal and the source reference signal. Alternatively, the UE may also receive information about whether to enable the association from the base station.

Based on the association between the NZP-CSI-RS and the source reference signal SSB, the UE finds the source reference signal identified by the NZP-CSI-RS-ResourceID. The UE makes the following assumption: there is a QCL chain of NZP-CSI-RS→SSB→DMRS, and there is a QCL relationship of typeD between the source reference signal NZP-CSI-RS and the target reference signal DMRS. Thus, the UE prepares for reception of the DMRS by using the spatial reception parameters previously used to receive the NZP-CSI-RS.

Example 3

Figure 12:
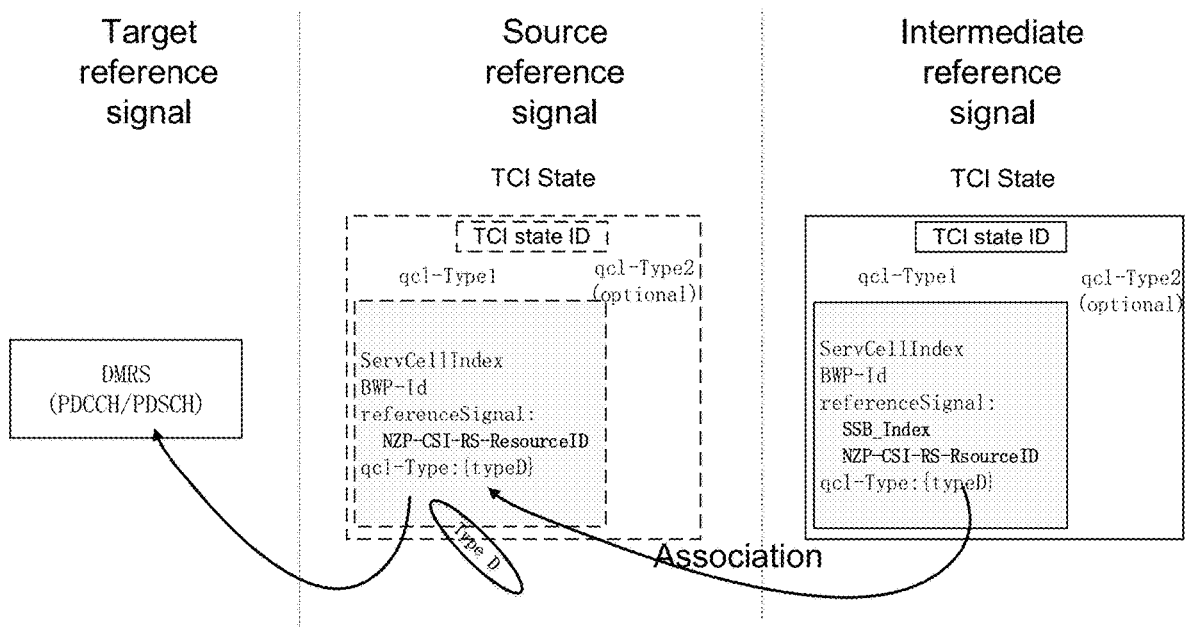
FIG. 12 is a simplified diagram of Example 3 of indirect beam indication according to the first embodiment.

FIG. 12 is a simplified diagram of Example 3 of the indirect beam indication according to the first embodiment. As shown in FIG. 12, the target reference signal is DMRS of PDCCH or PDSCH. The source reference signal is an NZP-CSI-RS resource, which is identified by NZP-CSI-RS-ResourceID.

Typically, the number of TCI states configured and activated by the base station for each UE is limited, for example, at most 64 TCI states are configured or at most 8 TCI states among them are further activated for the UE each time. There may be situations in which the TCI state corresponding to the source reference signal is not configured or activated for the UE, resulting in the TCI state corresponding to the source reference signal unavailable for beam indication, as shown in FIG. 12, the TCI state corresponding to the source reference signal is drawn by a dotted line.

According to Example 3, the base station can use the TCI state referring to the intermediate reference signal for indirect beam indication.

The base station configures the association between the source reference signal NZP-CSI-RS and the intermediate reference signal (such as SSB or NZP-CSI-RS) to the UE. As described above, the association includes but is not limited to a QCL relationship of typeD between SSB and NZP-CSI-RS.

The association may be established on various levels. For example, an association between an identifier NZP-CSI-RS-ResourceID of the source reference signal and an identifier (SSB_Index or NZP-CSI-RS-ResourceID) of the intermediate reference signal, an association between TCI state ID of a TCI state referring to the source reference signal and TCI state ID of a TCI state referring to the intermediate reference signal or the like may be established.

The base station indicates a TCI state referring to the intermediate reference signal to the UE through MAC CE or DCI. It should be noted that the TCI state may or may not include an additional QCL hypothesis. For brevity, another optional qcl hypothesis is not shown in FIG. 12. The UE receives the indication, and finds an identifier of the intermediate reference signal (for example, SSB Index or NZP-CSI-RS-ResourceID) from the QCL hypothesis of typeD (for example, qcl-Type1 in FIG. 12).

The UE may determine that it is necessary to enable the association between the intermediate reference signal and the source reference signal. Based on the association between the intermediate reference signal and the source reference signal, the UE finds the source reference signal identified by NZP-CSI-RS-ResourceID. The UE makes the following assumption: there is a QCL chain of NZP-CSI-RS→SSB/NZP-CSI-RS→DMRS, and there is a QCL relationship of typeD between the source reference signal NZP-CSI-RS and the target reference signal DMRS. Thus, the UE prepares for reception of the DMRS by using the spatial reception parameters previously used to receive NZP-CSI-RS.

Example 4

Figure 13:
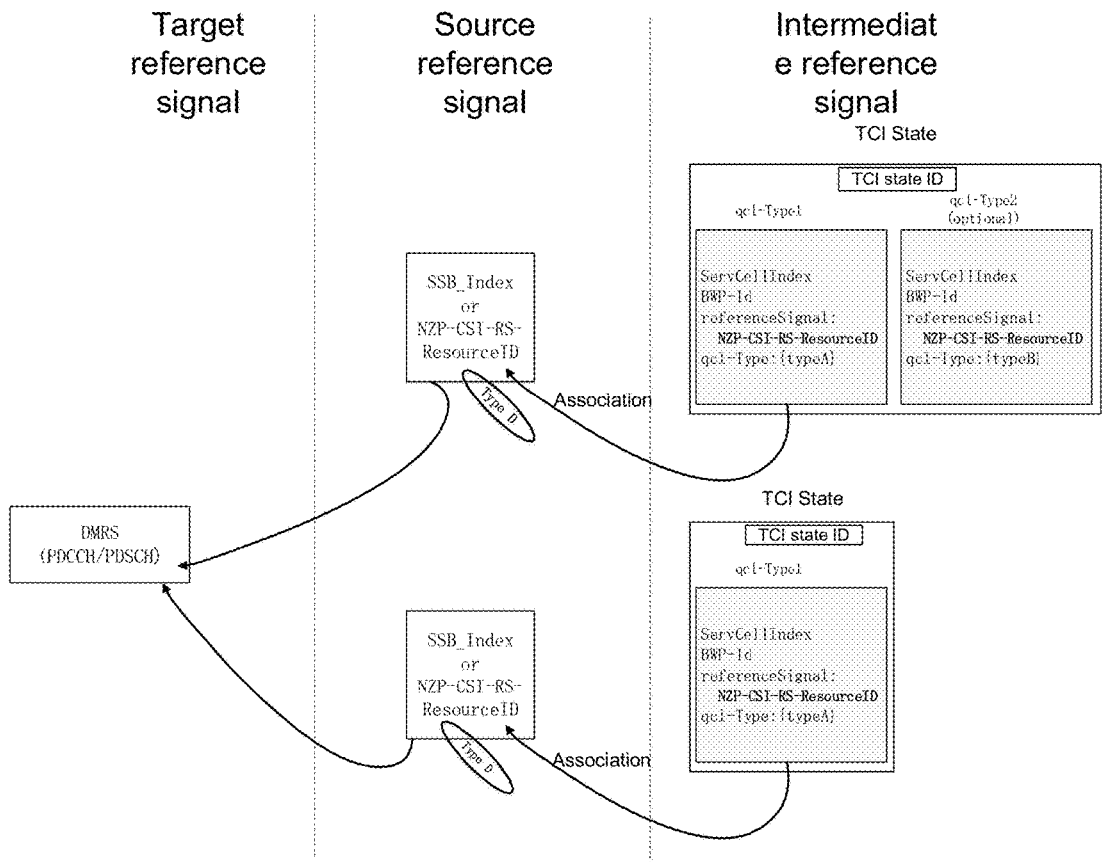
FIG. 13 is a simplified diagram of Example 4 of indirect beam indication according to the first embodiment.

FIG. 13 is a simplified diagram of Example 4 of the indirect beam indication according to the first embodiment. As shown in FIG. 13, the target reference signal is DMRS of PDCCH or PDSCH. The source reference signal is, for example, an NZP-CSI-RS resource identified by NZP-CSI-RS-ResourceID.

In Example 4 according to the first embodiment, the base station may perform the beam indication with a TCI state that does not include a QCL hypothesis of typeD. For example, as shown in the upper part of FIG. 13, both of the two QCL hypotheses (qcl-Type1 and qcl-Type2) of the TCI state are not of typeD, or as shown in the lower part of FIG. 13, the TCI state contains only one QCL hypothesis (qcl-Type1) which is not of typeD. In the existing beam indication, the TCI state including no QCL hypothesis of typeD cannot be used for the beam indication.

According to Example 4, the base station may configure the association between the source reference signal (such as SSB or NZP-CSI-RS) and the intermediate reference signal to the UE. For example, as described above, the association includes but is not limited to a QCL relationship between the SSB and the NZP-CSI-RS.

The association may be established on various levels. For example, an association between an identifier (SSB_Index or NZP-CSI-RS-ResourceID) of the source reference signal and an identifier NZP-CSI-RS-ResourceID of the intermediate reference signal, an identifier (SSB_Index or NZP-CSI-RS-ResourceID) of the source reference signal and TCI state ID of a TCI state referring to the intermediate reference signal, an association between TCI state ID of a TCI state referring to the source reference signal and TCI state ID of a TCI state referring to the intermediate reference signal or the like may be established.

In an example, the NZP-CSI-RS as the source reference signal and the NZP-CSI-RS as the intermediate reference signal may be the same NZP-CSI-RS resource, that is, have the same NZP-CSI-RS-ResourceID.

The base station indicates the TCI state referring to the intermediate reference signal to the UE through MAC CE or DCI.

The UE can determine that since the TCI state does not include a QCL hypothesis of typeD, the association between the intermediate reference signal and the source reference signal should be enabled. The UE may also determine whether the association should be activated or not based on association enabling information from the base station, as described above.

Based on the association between the intermediate reference signal and the source reference signal, the UE finds the source reference signal identified by SSB_Index or NZP-CSI-RS-ResourceID. The UE makes the following assumption: There is a QCL relationship of typeD between the source reference signal NZP-CSI-RS and the target reference signal DMRS. Thus, the UE prepares for reception of the DMRS by using the spatial reception parameters previously used to receive the SSB or the NZP-CSI-RS.

It should be noted that Examples 1 to 4 described above can be applied individually or in any combination depending on the actual application scenario.

Indication process for PDCCH transmission and PDSCH transmission is introduced below.

(Beam Indication for PDCCH Transmission)

According to the beam indication of the present disclosure, the base station can activate the selected beam by transmitting MAC CE for scheduling the PDCCH. As used herein, "activate" refers to enabling the beam(s) listed by the MAC CE in the beam set configured for the UE. After the activation, for example, after 3 ms, the base station can use the selected transmitting beam for PDCCH transmission, and the UE can use the receiving beam corresponding to the transmitting beam to monitor the PDCCH.

First, the base station configures M (for example, 64 or 128) TCI states for the UE through RRC layer signaling. For example, the base station can set tci-StatesPDCCH-ToAddList to configure the TCI states for the UE.

Figure 14:
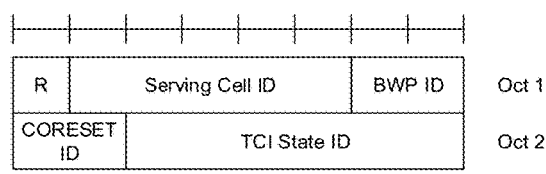
FIG. 14 illustrates MAC CE used in the beam indication for PDCCH.

Then, the base station generates a single MAC CE including the TCI state ID associated with the beam selected in the beam selection at the MAC layer, and the format of the MAC CE is shown in FIG. 14.

In the MAC CE shown in FIG. 14 (which does not show the header of the MAC CE):

The first octet: a R field which indicates a reserved 1 bit; a serving cell ID field which indicates ID of the serving cell to which the MAC CE applies, and has a length of 5 bits; a BWP ID field which contains BWP-Id of the downlink bandwidth part to which the MAC CE applies, and has a length of 2 bits;

The second octet: an identifier (CORESET ID) of the control resource set (ControlResourceSet) where the PDCCH associated with the selected beam is present, and an identifier (TCI state ID) of the TCI state of the PDCCH, these two identifiers occupying 2 bits and 6 bits, respectively; a 6-bit TCI-StateId can indicates up to 64 TCI states.

The UE receives a MAC packet containing the MAC CE and submits it to the UE's MAC layer for decoding. The UE extracts the CORESET ID and TCI state ID in the MAC CE, and finds the reference signal identified by the reference signal identifier (for example, SSB_Index or NZP-CSI-RS-ResourceID) in the TCI state identified by the TCI state ID.

In the case of the indirect beam indication according to the present disclosure, the UE finds the associated source reference signal based on the association between the reference signal in the TCI state and another reference signal, and assumes that the port of the source reference signal and the DMRS port of the PDCCH are in a QCL relationship of typeD, so that the PDCCH is received using the spatial reception parameters (the receiving beam) used when receiving the same source reference signal previously. After the configuration of the MAC CE starts to take effect (for example, after 3 ms), the UE will start to use the determined receiving beam to monitor the PDCCH.

(Beam Indication for PDSCH Transmission)

Typically, the base station uses MAC CE activation plus DCI designation to indicate the beam used for PDSCH transmission.

Specifically, first, the base station configures a maximum of M (for example, M=64 or 128) TCI states for the UE in the RRC layer.

Then, the base station activates up to 8 of the configured TCI states for the UE through MAC CE. However, if the TCI states configured by the RRC layer do not exceed 8, that is, M≤8, the MAC CE activation step can be omitted.

Figure 15A:
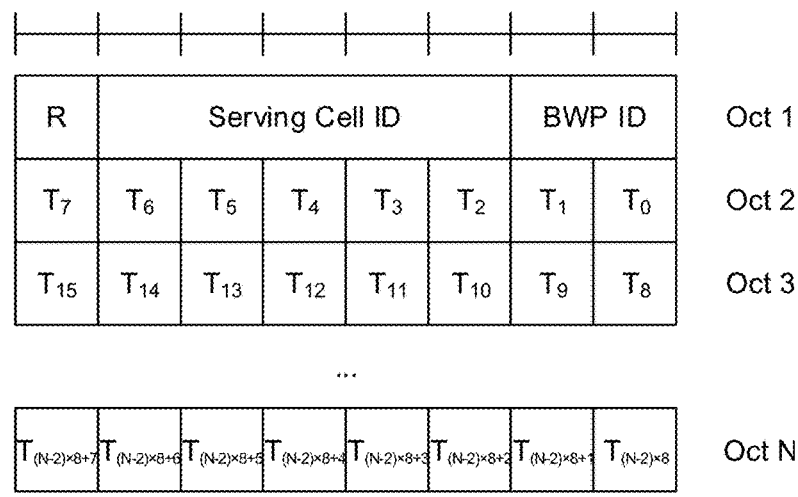
FIG. 15A illustrates MAC CE used in the beam indication for PDSCH.

FIG. 15A illustrates a format (excluding the header) of the MAC CE used to activate the TCI states. As shown in FIG. 15A, "R" field represents a reserved bit, "Serving Cell ID" represents identification information of the serving cell to which the MAC CE applies, which occupies 5 bits, and "BWP ID" represents identification information of the downlink bandwidth part (such as BWP Id) to which the MAC CE applies, which occupies 2 bits, "Ti" represents activation information of the M TCI states configured by the RRC layer, which occupies 1 bit, and if it is set to "1", it means the corresponding TCI state is activated, otherwise it means the corresponding TCI state is deactivated.

Figure 15B:
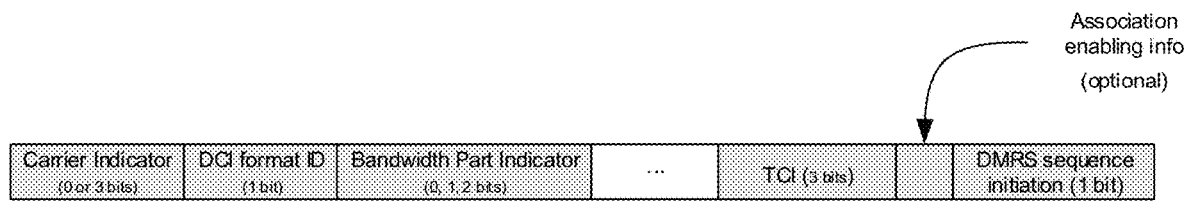
FIG. 15B illustrates an improved DCI used in the beam indication for PDSCH.

Finally, the base station can specify the TCI state corresponding to the beam selected for PDSCH transmission in the DCI. FIG. 15B illustrates a format of DCI that can be used to specify the TCI state, the DCI of which includes an identification field of the TCI state associated with the selected beam. Each TCI state identification field occupies 3 bits to specify one of at most 8 TCI states.

In addition, in the indirect beam indication according to the present disclosure, as shown in FIG. 15B, the DCI may also optionally include association enabling information. The association enabling information may be only 1 bit. For example, when the association enabling information is set to "1", it means that the association between the source reference signal and the intermediate reference signal is enabled, otherwise it means that the association is not enabled.

The DCI may be sent to the UE through, for example, PDCCH. The UE receives the DCI and extracts various fields from it. By means of the TCI state identification field indicating the beam in the DCI, the UE can find the reference signal identified by the reference signal identifier (for example, SSB_Index or NZP-CSI-RS-ResourceID).

In the indirect beam indication according to the present disclosure, the UE can determine whether to enable the association between the intermediate reference signal and the source reference signal based on the type of the reference signal, the presence or absence of the spatial reception parameters for the reference signal, the QCL type in the TCI stat or the like. Alternatively, the UE may determine whether to enable the association between the intermediate reference signal and the source reference signal based on the association enabling information in the DCI. If it is determined that the association between the intermediate reference signal and the source reference signal should be enabled, the UE finds the source reference signal based on this association.

The UE uses the spatial reception parameters for the source reference signal to determine the spatial reception parameters (the receiving beam) for monitoring the PDSCH, so as to implement reception of the beam of the PDSCH.

(Electronic Device and Communication Method According to the First Embodiment)

Next, an electronic device and a communication method that can implement the first embodiment of the present disclosure are described.

Figure 16A:
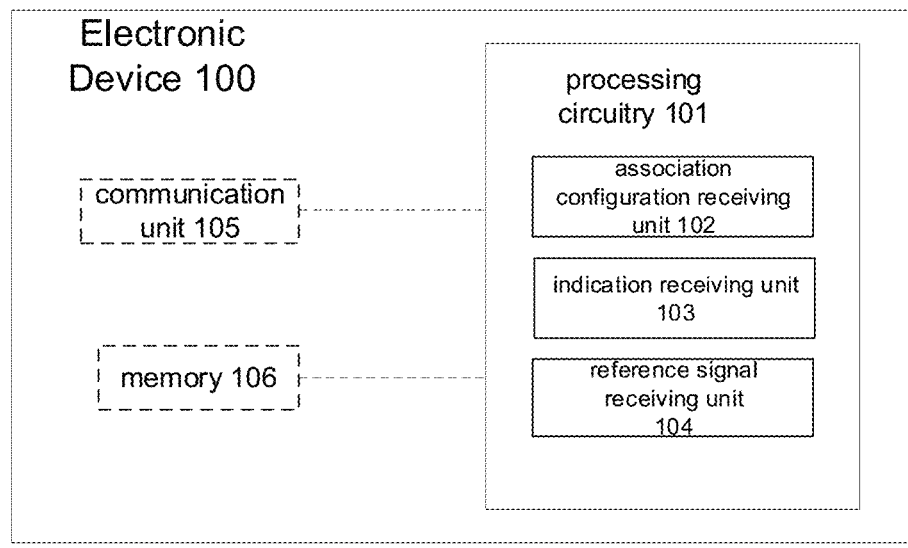
FIGS. 16A and 16B illustrate an electronic device on UE side and a communication method thereof according to the first embodiment.

FIG. 16A is a block diagram illustrating the electronic device 100 according to the first embodiment. The electronic device 100 may be a UE or a component of the UE.

As shown in FIG. 16A, the electronic device 100 includes a processing circuitry 101. The processing circuitry 101 includes at least an association configuration receiving unit 102, an indication receiving unit 103, and a reference signal receiving unit 104. The processing circuitry 101 may be configured to perform the communication method shown in FIG. 16B. The processing circuitry 101 may refer to various implementations of a digital circuitry, an analog circuitry, or a mixed signal (combination of analog signal and digital signal) circuitry that performs functions in a computing system. The processing circuitry may include, for example, circuits such as integrated circuit (IC), application specific integrated circuit (ASIC), a part or circuit of an individual processor core, an entire processor core, an individual processor, a programmable hardware device such as field programmable array (FPGA)), and/or a system including multiple processors.

Figure 16B:
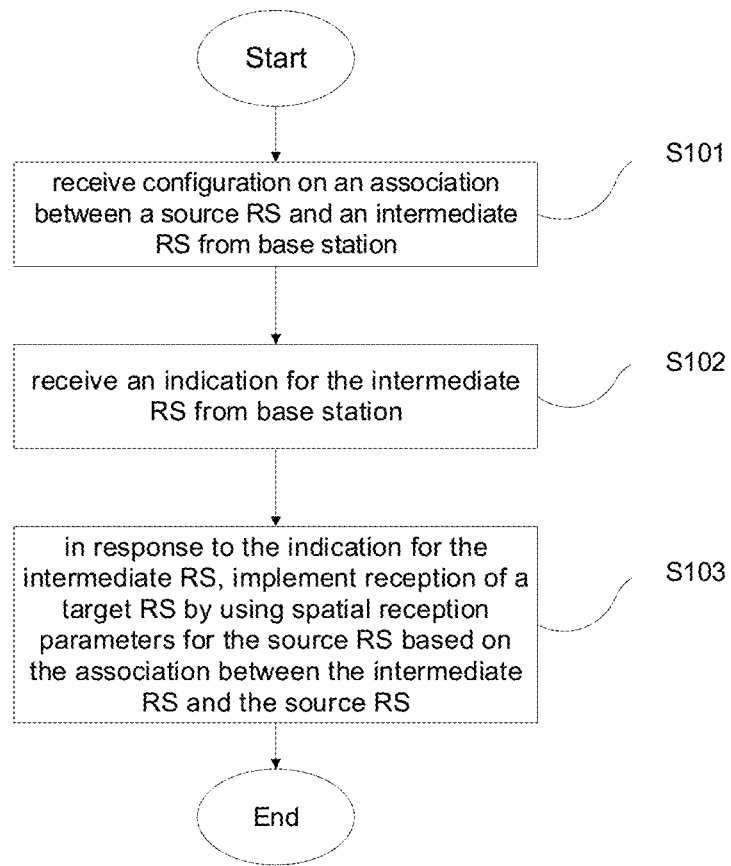

The association configuration receiving unit 102 in the processing circuitry 101 is configured to receive configuration on an association between a source reference signal and an intermediate reference signal from a control device such as a base station, that is, to perform step S101 in FIG. 16B. The association configuration receiving unit 102 is configured to receive RRC signaling regarding the association between the source reference signal and the intermediate reference signal. The processing circuitry 101 may store the received association information in the UE, for example, in the memory 106.

The indication receiving unit 103 is configured to receive an indication for the intermediate reference signal from the base station, that is, to perform step S102 in FIG. 16B. The indication receiving unit 103 may receive indication information of a TCI state corresponding to the intermediate reference signal through MAC CE or DCI.

The reference signal receiving unit 104 is configured to use the spatial reception parameters for the source reference signal to receive a target reference signal based on the association between the intermediate reference signal and the source reference signal in response to the indication for the intermediate reference signal, that is, to perform step S103 in FIG. 16B. The reference signal receiving unit 104 finds the source reference signal from the intermediate reference signal referred to in the TCI state received by the indication receiving unit 103 based on the association between the intermediate reference signal and the source reference signal, and configures the antenna array by using spatial reception parameters previously determined when receiving the source reference signal, to facilitate the reception of PDCCH or PDSCH and its DMRS.

The electronic device 100 may further include, for example, a communication unit 105 and a memory 106.

The communication unit 105 may be configured to communicate with a base station under the control of the processing circuitry 101. In an example, the communication unit 105 may be implemented as a transmitter or transceiver, including communication components such as an antenna array and/or a radio frequency link. The communication unit 105 is drawn with a dashed line because it can also be located outside the electronic device 100. The communication unit 105 may receive configuration information on the association between the source reference signal and the intermediate reference signal, the beam indication information and the like from the base station. The communication unit 105 can also receive the DMRS transmitted by the base station.

The electronic device 100 may further include a memory 106. The memory 106 can store various data and instructions, such as configuration information on the association between the source reference signal and the intermediate reference signal and the beam indication information, programs and data used for operation of the electronic device 100, various data generated by the processing circuitry 101, data received by the communication unit 105, and the like. The memory 106 is drawn with a dashed line because it may also be located within the processing circuitry 101 or outside the electronic device 100. The memory 106 may be a volatile memory and/or a non-volatile memory. For example, the memory 102 may include, but is not limited to, random access memory (RAM), dynamic random access memory (DRAM), static random access memory (SRAM), read only memory (ROM), and flash memory.

Figure 17A:
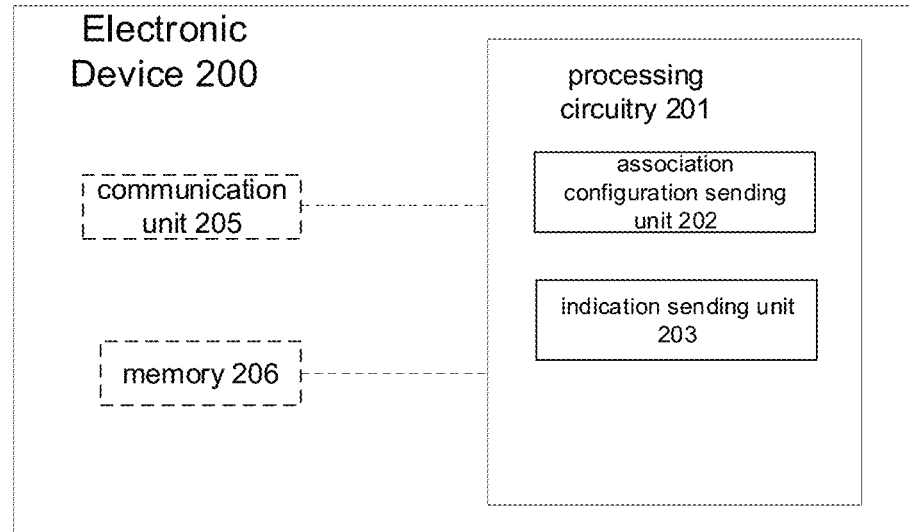
FIGS. 17A and 17B illustrate an electronic device on base station side and a communication method thereof according to the first embodiment.

FIG. 17A is a block diagram illustrating an electronic device 200 according to the present disclosure. The electronic device 200 may be a control device such as a base station or located in a control device such as a base station.

As shown in FIG. 17A, the electronic device 200 includes a processing circuitry 201. The processing circuitry 201 includes at least an association configuration sending unit 202 and an indication sending unit 203. The processing circuitry 201 may be configured to execute the communication method shown in FIG. 17B. The processing circuitry 201 may refer to various implementations of a digital circuitry, an analog circuitry, or a mixed signal (combination of analog signal and digital signal) circuitry that performs functions in a computing system. The processing circuitry may include, for example, circuits such as integrated circuit (IC), application specific integrated circuit (ASIC), a part or circuit of an individual processor core, an entire processor core, an individual processor, a programmable hardware device such as field programmable array (FPGA)), and/or a system including multiple processors.

Figure 17B:
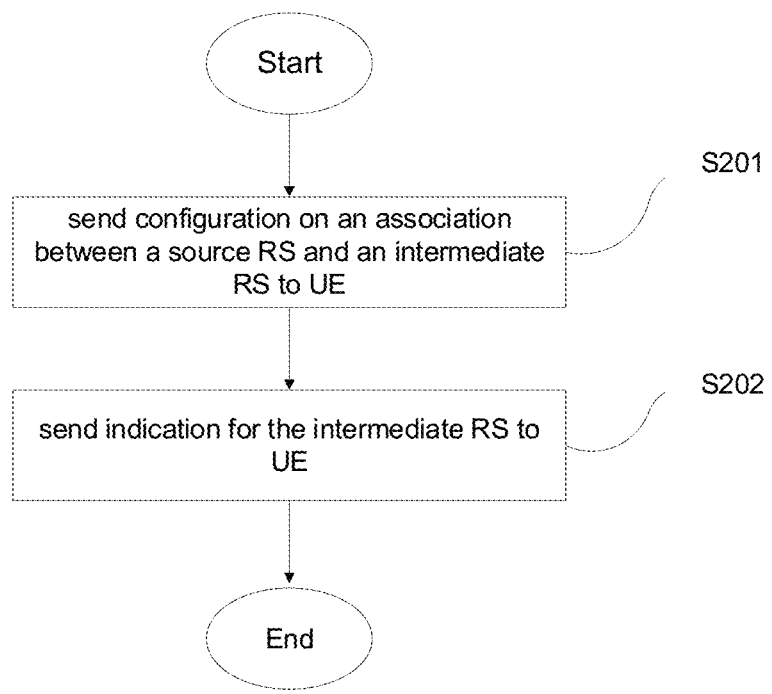

The association configuration sending unit 202 of the processing circuitry 201 is configured to send configuration on an association between a source reference signal and an intermediate reference signal to the UE, that is, to perform step S201 in FIG. 17B. The association configuration sending unit 202 may create an association between two reference signals, and configure such association to the UE through RRC layer signaling.

The indication sending unit 203 is configured to send an indication for the intermediate reference signal to the UE, that is, to perform step S202 in FIG. 17B. The indication sending unit 203 may include indication information of a TCI state corresponding to the intermediate reference signal in the MAC CE or DCI.

In response to the indication for the intermediate reference signal, the UE may configure the antenna array by using spatial reception parameters determined from the spatial reception parameters for the source reference signal based on the association between the intermediate reference signal and the source reference signal, to facilitate the reception of a target reference signal, such as DMRS of PDCCH or PDSCH.

The electronic device 200 may further include, for example, a communication unit 205 and a memory 206.

The communication unit 205 may be configured to communicate with the UE under the control of the processing circuitry 201. In an example, the communication unit 205 may be implemented as a transmitter or transceiver, including communication components such as an antenna array and/or a radio frequency link. The communication unit 205 is drawn with a dashed line because it can also be located outside the electronic device 200. The communication unit 205 may send configuration information on the association between the intermediate reference signal and the source reference signal and the beam indication information for the intermediate reference signal to the UE.

The electronic device 200 may further include a memory 206. The memory 206 can store various data and instructions, such as programs and data for operation of the electronic device 200, various data generated by the processing circuitry 201, various control signaling or service data to be sent by the communication unit 205, the association configuration information, beam indication information to be sent by communication unit 205, and the like. The memory 206 is drawn with a dashed line because it may also be located within the processing circuitry 201 or outside the electronic device 200. The memory 206 may be a volatile memory and/or a non-volatile memory. For example, the memory 202 may include, but is not limited to, random access memory (RAM), dynamic random access memory (DRAM), static random access memory (SRAM), read only memory (ROM), and flash memory.

Second Embodiment

The second embodiment of the present disclosure relates to beam indication for uplink transmission, that is, in the second embodiment, the target reference signal is an uplink reference signal. The following description will be made by taking DMRS of PUCCH and sounding reference signal (SRS) as examples of the target reference signal, but it should be understood that the target reference signal may also be other uplink reference signals.

Figure 18A:
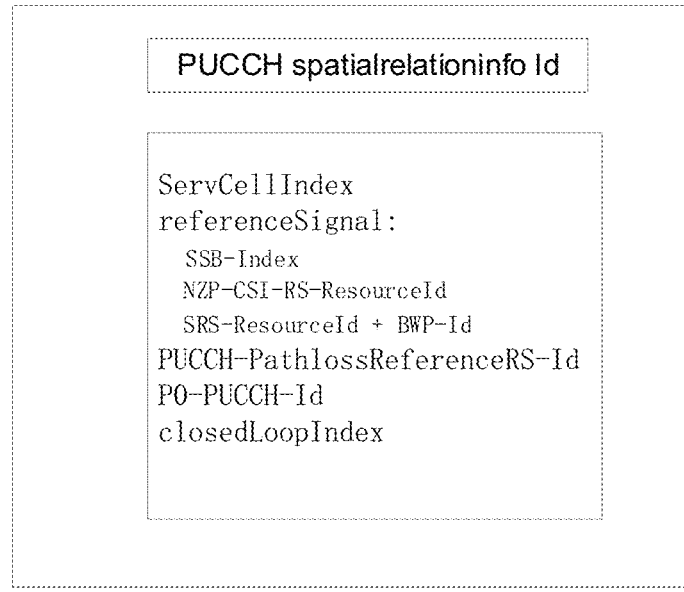
FIG. 18A illustrates configuration of PUCCH spatial relation information for scheduling PUCCH.
Figure 18B:
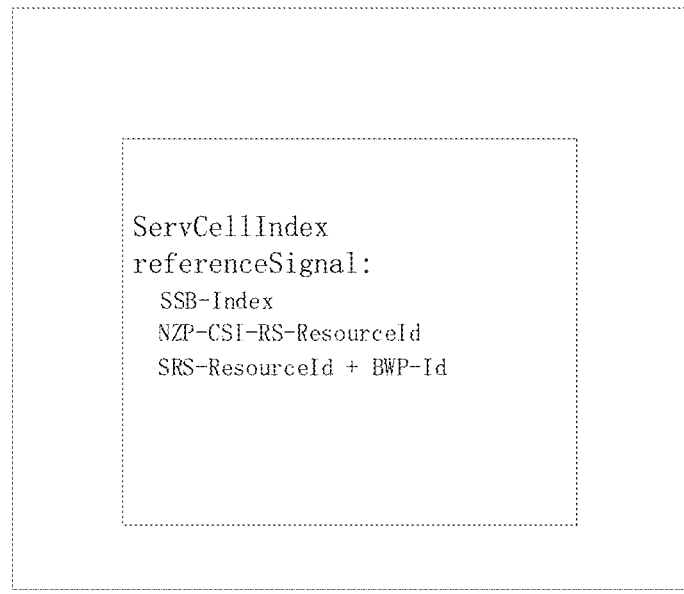
FIG. 18B illustrates configuration of SRS spatial relation information for scheduling SRS.

In the standard R15 of 5G NR, the base station implements the beam indication for uplink transmission by configuring spatial relation information to the UE and activating with MAC CE. FIGS. 18A and 18B illustrate the configuration of two kinds of spatial relation information, respectively.

FIG. 18A illustrates the configuration of PUCCH spatial relation information for scheduling PUCCH. As shown in FIG. 18A, the PUCCH spatial relation information is identified by PUCCH spatial relation information ID (PUCCH-SpatialRelationInfoId), and includes a source reference signal resource for providing spatial relation information, such as an NZP-CSI-RS resource identified by NZP-CSI-RS-ResoureId, a SSB resource identified by SSB-Index, and a SRS resource jointly identified by SRS-ResourceId and BWP-Id. If SSB or NZP-CSI-RS is configured in the PUCCH spatial relation information, the UE should use the spatial reception parameters for receiving the SSB or NZP-CSI-RS to transmit the PUCCH and its DMRS. If SRS is configured in the PUCCH spatial relation information, the UE should use the spatial transmission parameters for transmitting the SRS to transmit the PUCCH and its DMRS.

FIG. 18B illustrates the configuration of SRS spatial relation information for scheduling SRS. As shown in FIG. 18B, the SRS spatial relation information is identified by the SRS spatial relation information ID (SRS-SpatialRelation-InfoId), and includes source reference signal resources for providing spatial relation information, including a NZP-CSI-RS resource identified by NZP-CSI-RS-ResoureId, a SSB resource identified by SSB-Index, and a SRS resource jointly identified by SRS-ResourceId and BWP-Id. If SSB or NZP-CSI-RS is configured in the SRS spatial relation information, the UE should use the spatial reception parameters for receiving the SSB or NZP-CSI-RS to transmit the SRS. If SRS is configured in the PUCCH spatial relation information, the UE should use the spatial transmission parameters for transmitting the SRS to transmit the SRS.

The base station can activate or deactivate the spatial relation information by sending MAC CE to the UE.

According to the existing beam indication mechanism, the downlink beam indication using the TCI state and the uplink beam indication using the spatial relation information are performed independently of each other. This may cause excessive signaling interaction.

The second embodiment of the present disclosure proposes an improved uplink beam indication mechanism to indirectly perform the uplink beam indication simultaneously with the downlink beam indication.

The indirect beam indication according to the second embodiment will be described below with reference to FIGS. 19A and 19B.

As described above, the spatial relation information configured by the base station for the UE includes a reference signal that provides the spatial relation information for the target reference signal, that is, the source reference signal. The source reference signal may be a downlink reference signal such as SSB or NZP-CSI-RS. The UE can determine and save its spatial reception parameters when previously receiving the source reference signal. The source reference signal may also be an uplink reference signal such as SRS. The UE can determine and save its spatial transmission parameters when previously transmitting the source reference signal.

In addition, the base station can perform the beam indication to the UE with the TCI state, so that the UE can use the spatial reception parameters for the reference signal listed in the TCI state to implement reception of PDCCH or PDSCH.

According to the second embodiment of the present disclosure, the base station can create an association between the source reference signal in the spatial relation information and the reference signal (the intermediate reference signal) in the TCI state. Preferably, this association may be an association between the spatial relation information and the TCI state, for example, an association between the spatial relation information ID and the TCI state ID. Of course, other associations may also be adopted, such as an association between the identifier of the source reference signal and the identifier of the intermediate reference signal, an association between the TCI state ID and the identifier of the source reference signal or the like, as long as the UE can find the source reference signal from the intermediate reference signal based on the association. The base station can configure such association to the UE through RRC layer signaling.

Thus, when the UE receives the TCI state, on the one hand, the UE finds the QCL hypothesis of typeD from the TCI state, and uses spatial reception parameters for the listed reference signal to implement the reception of downlink reference signals such as DMRS of PDCCH, for coherent demodulation of the PDCCH or PDSCH; on the other hand, the UE finds the associated spatial relation information based on the association between the TCI state and the spatial relation information, and uses the spatial relation information to implement.

Figure 19A:
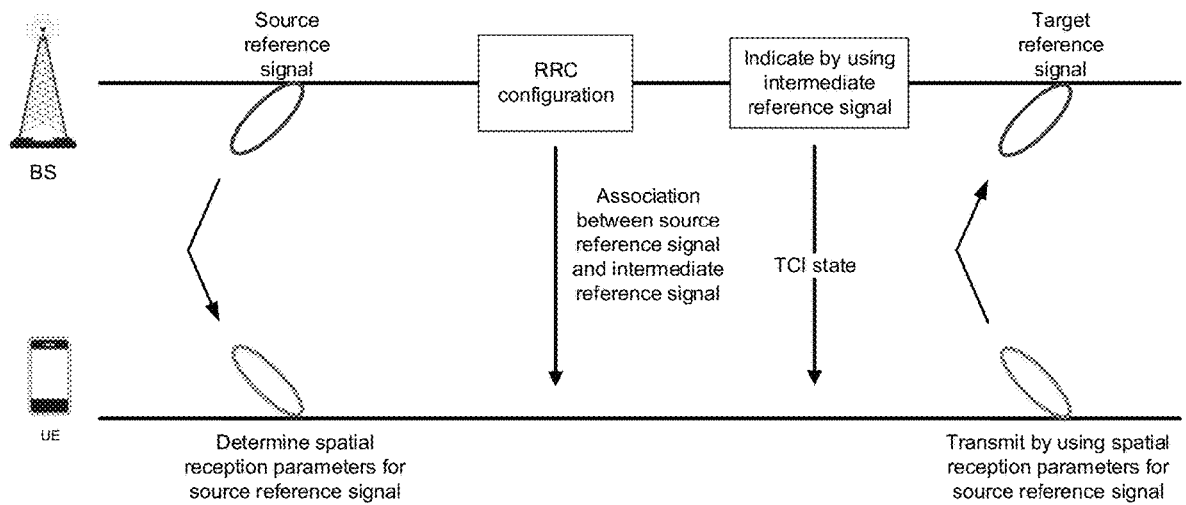
FIGS. 19A and 19B are schematic diagrams illustrating beam indication according to the second embodiment.

Specifically, as shown in FIG. 19A, in a case where the source reference signal in the spatial relation information is a downlink reference signal such as SSB or NZP-CSI-RS, the UE can use the spatial reception parameters for previously receiving this reference signal to determine spatial transmission parameters for transmitting the target reference signal, so as to implementing the transmission of the target reference signal.

Figure 19B:
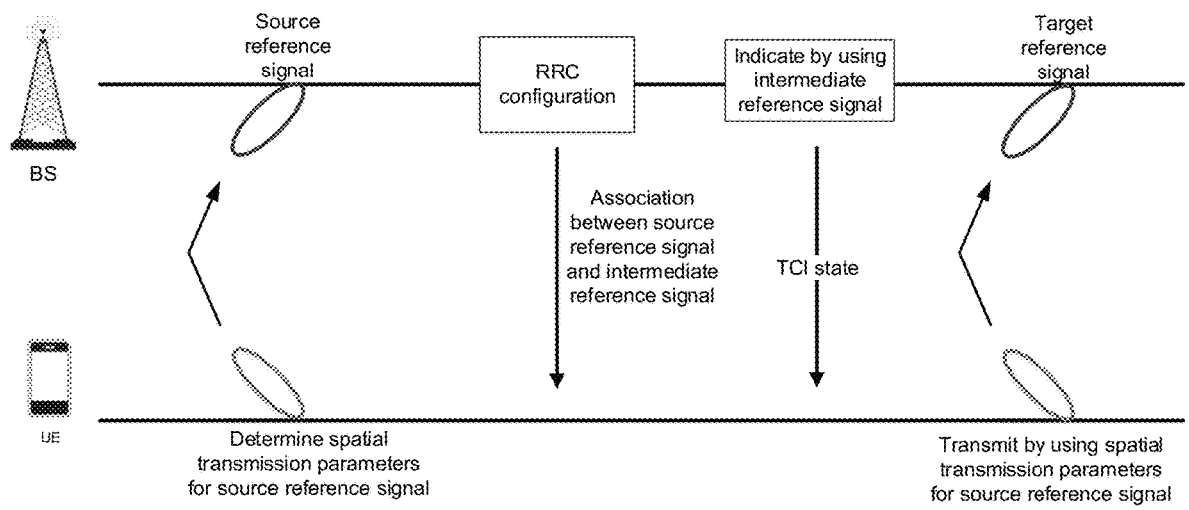

As shown in FIG. 19B, in a case where the source reference signal in the spatial relation information is an uplink reference signal such as SRS, the UE can use the spatial transmission parameters for previously transmitting this reference signal to determine spatial transmission parameters for transmitting the target reference signal, so as to implementing the transmission of the target reference signal.

In this way, the TCI state corresponding to the intermediate reference signal can be used to implement both of the downlink beam indication and the uplink beam indication without additional signaling to activate spatial relation information for the UE. This saves resources consumed for signaling transmission.

For SSB or NZP-CSI-RS as the source reference signal in the spatial relation information and SSB or NZP-CSI-RS as the intermediate reference signal in the TCI state, in an example, they can be configured to have a QCL relationship, even they can be the same reference signal, that is, identified by the same SSB_Index or NZP-CSI-RS-ResourceID. In this case, from the UE side, the beam used by the UE to receive the source reference signal and the beam used to receive the intermediate reference signal have the same beam direction.

In addition, when SSB or NZP-CSI-RS is referred to as the source reference signal in the spatial relation information, in order to ensure that the spatial reception parameters for the SSB or NZP-CSI-RS can be used for the transmission of the target reference signal, the receiving beam used by the UE for receiving the source reference signal and the transmitting beam used for transmitting the target reference signal may have the same direction, that is, the downlink wireless channel through which the source reference signal propagates and the uplink wireless channel through which the target reference signal propagates are symmetrical. In the TDD system, it can be considered that the uplink channel and the downlink channel sharing the same frequency domain resource are symmetrical. For an FDD system, if the frequency bands of the uplink channel and the downlink channel may be close, the channel environments experienced by the uplink channel and the downlink channel may be similar, and they can also be considered to be symmetrical. In this case, the large-scale property of the downlink channel carrying the source reference signal can be inferred from the large-scale property of the uplink channel carrying the target reference signal, and in this sense, there is a QCL relationship of typeD between the receiving portion of the source reference signal and the transmitting port of the target reference signal.

Similarly, when SRS is referred to as the source reference signal in the spatial relation information, in order to ensure that the spatial transmission parameters for the SRS can be used for the transmission of the target reference signal, the transmitting beam used by the UE for transmitting the source reference signal and the transmitting beam used for the target reference signal may have the same direction. In this sense, there is a QCL relationship of typeD between the transmitting port of the source reference signal and the transmitting port of the target reference signal.

Figure 20:
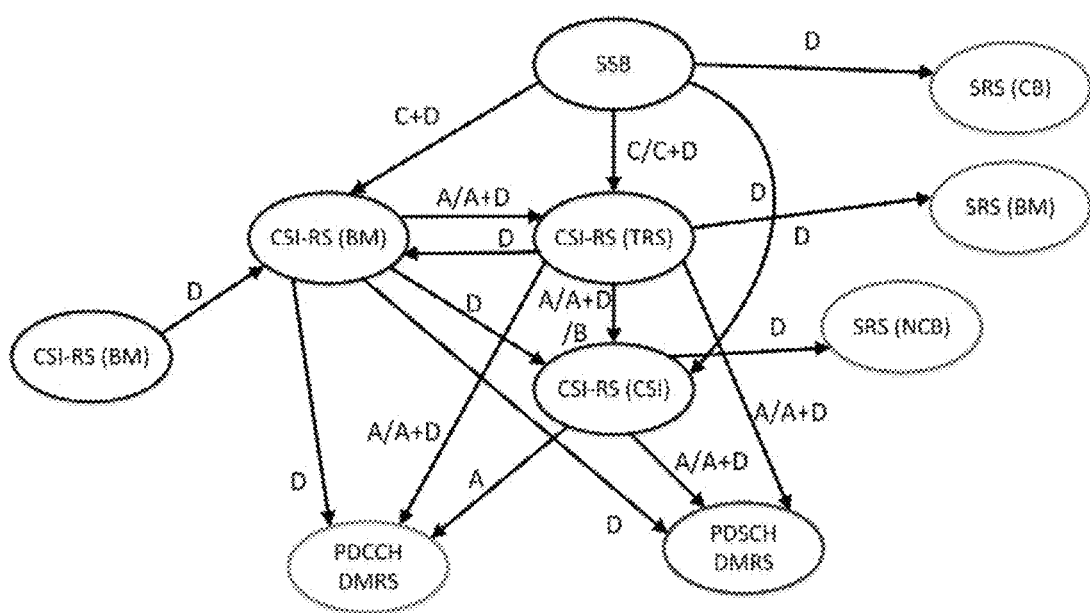
FIG. 20 is a schematic diagram illustrating extended QCL relationships between various reference signals.

Thus, the QCL relationships between various reference signals described with reference to FIG. 8 can be extended to FIG. 20. FIG. 20 differs from FIG. 8 in that a QCL relationship between a downlink reference signal such as SSB or CSI-RS and an uplink reference signal such as SRS can be established. Three SRSs are shown in FIG. 20, namely, SRS (BM) for beam management, SRS (CB) based on codebook scheduling, and SRS (NCB) based on non-codebook scheduling, but it should be understood that the types of SRS may not be limited to these. In addition, the QCL relationships between SSB, CSI-RS, and various SRSs depicted in FIG. 20 is only exemplary and not limiting. For example, SSB may also have a QCL relationship with SRS (BM) or SRS (NCB).

Based on the extended QCL relationship map in FIG. 20, an intermediate reference signal suitable for the indirect beam indication of SRS can be easily selected. Similarly to the first embodiment, a QCL chain between the source reference signal, the intermediate reference signal, and the target reference signal can be established, which facilitates simplifying the beam operation in the uplink and downlink directions.

Some examples of the indirect beam indication according to the second embodiment are described below. It should be understood that the following examples are only used to illustrate some scenarios in which the second embodiment can be applied, rather than to limit the aspects of the second embodiment.

Example 1

Example 1 of the second embodiment involves but is not limited to the following scenario: after the UE receives PDSCH scheduled by the DCI, it needs to feed back ACK/NACK for the PDSCH to the base station through PUCCH. Example 1 of the second embodiment provides a method of indicating the PDSCH and the PUCCH at the same time.

Figure 21:
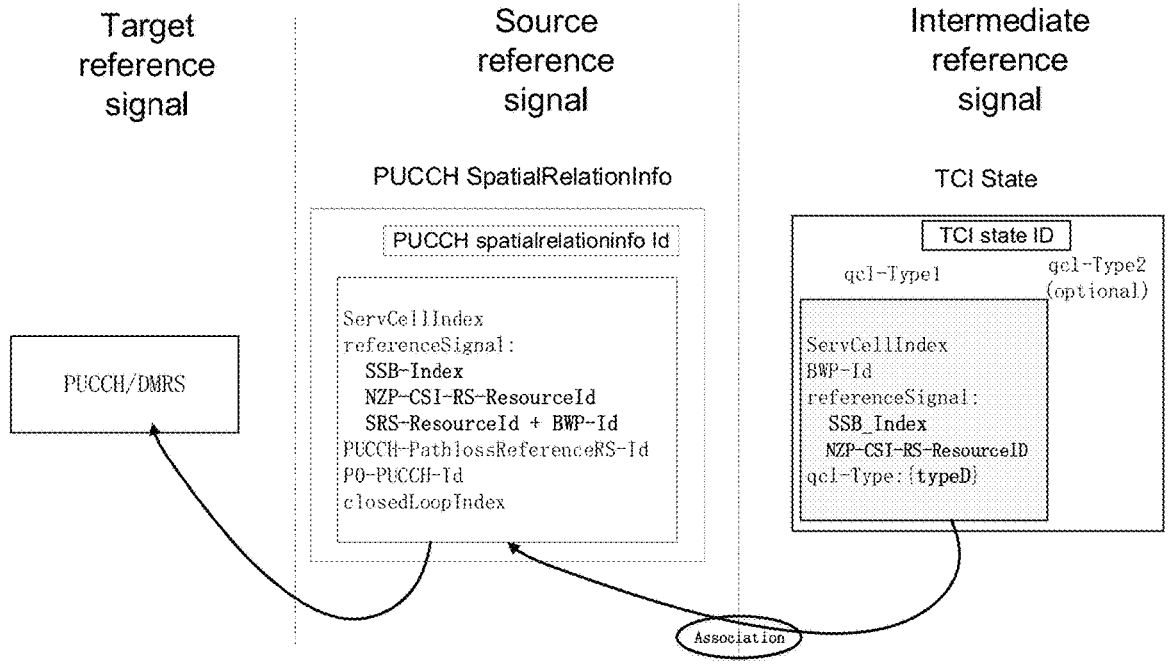
FIG. 21 is a simplified diagram of Example 1 of indirect beam indication according to the second embodiment.

FIG. 21 is a simplified diagram of Example 1 of the indirect beam indication according to the second embodiment. As shown in FIG. 21, the target reference signal is PUCCH or its DMRS.

The base station establishes an association between the TCI state for the beam indication of PDSCH and the PUCCH spatial relation information for the beam indication of PUCCH, and configures it to the UE through RRC layer signaling. For example, the base station can send to the UE the association information between the TCI state ID and the PUCCH spatial relation information ID, and the UE stores such association locally.

The base station indicates the TCI state to the UE through DCI. It should be noted that for the sake of brevity, another optional QCL hypothesis is not shown in FIG. 21, but the TCI state may or may not include an additional QCL hypothesis.

The UE receives the indication, and finds an identifier SSB_Index or NZP-CSI-RS-ResourceID of the reference signal from the qcl hypothesis of typeD (for example, qcl-Type1 in FIG. 21). The UE uses the spatial reception parameters for the reference signal identified by the identifier to configure its antenna array for reception of the PDSCH.

In addition, the UE also finds associated PUCCH spatial relation information based on the association between the TCI state and the PUCCH spatial relation information, and uses the PUCCH spatial relation information to schedule transmission of PUCCH. In particular, the UE can use spatial reception parameters for the reference signal SSB_Index or NZP-CSI-RS-ResourceID listed in the PUCCH spatial relation information or spatial transmission parameters for the SRS identified by SRS-ResourceId plus BWP-Id to determine spatial transmission parameters for transmitting the PUCCH and its DMRS (if the PUCCH has one). The UE configures its antenna array using the determined spatial transmission parameters, so as to transmit ACK/NACK for PDSCH through PUCCH.

Example 2

Example 2 of the second embodiment involves but is not limited to the following scenario: when an aperiodic SRS trigger is received in DCI, the UE transmits the SRS to the base station. Example 2 of the second embodiment provides a method of simultaneously scheduling SRS through the TCI state.

Figure 22:
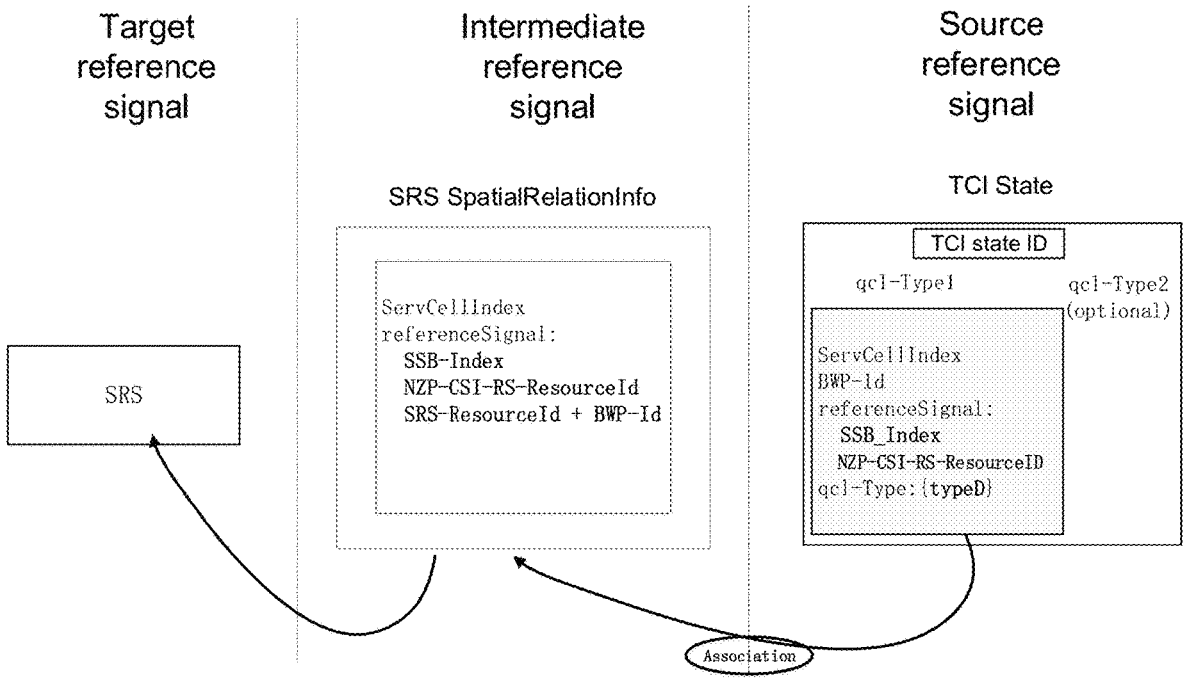
FIG. 22 is a simplified diagram of Example 2 of indirect beam indication according to the second embodiment.

FIG. 22 is a simplified diagram of Example 2 of the indirect beam indication according to the second embodiment. As shown in FIG. 22, the target reference signal is SRS.

The base station establishes an association between the TCI state for the beam indication of PDSCH and the SRS spatial relation information for the beam indication of SRS, and configures it to the UE through RRC layer signaling. For example, the base station can send the association information between the TCI state ID and the SRS spatial relation information ID to the UE, and the UE stores this association locally.

The base station indicates the TCI state to the UE through DCI. It should be noted that for the sake of brevity, another optional QCL hypothesis is not shown in FIG. 22, but the TCI state may or may not include an additional QCL hypothesis.

The UE receives the indication, and finds an identifier SSB_Index or NZP-CSI-RS-ResourceID of the reference signal from the qcl hypothesis of typeD (for example, qcl-Type1 in FIG. 22). The UE uses the spatial reception parameters for the reference signal identified by the identifier to configure its antenna array for reception of the PDSCH.

In addition, the UE also finds associated SRS spatial relation information based on the association between the TCI state and the SRS spatial relation information, and uses the SRS spatial relation information to schedule the transmission of SRS. In particular, the UE can use spatial reception parameters for the reference signal SSB or NZP-CSI-RS listed in the SRS spatial relation information or spatial transmission parameters for the SRS identified by SRS-ResourceId plus BWP-Id to determine spatial transmission parameters for transmitting the SRS. The UE configures its antenna array using the determined spatial transmission parameters for the transmission of an aperiodic SRS.

(Electronic Device and Communication Method According to the Second Embodiment)

Next, an electronic device and a communication method that can implement the second embodiment of the present disclosure are described.

Figure 23A:
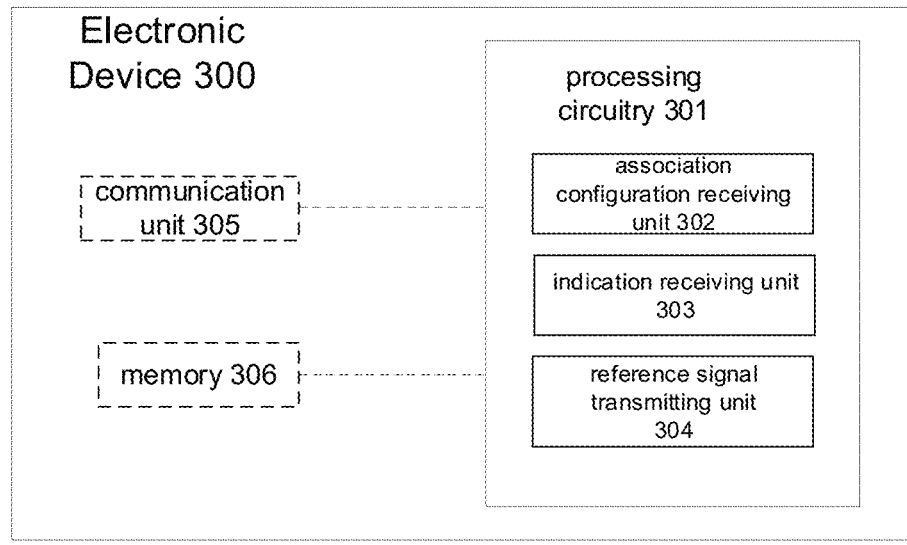
FIGS. 23A and 23B illustrate an electronic device on UE side and a communication method thereof according to the second embodiment.

FIG. 23A is a block diagram illustrating an electronic device 300 according to the present disclosure. The electronic device 300 may be a UE or a component of the UE.

As shown in FIG. 23A, the electronic device 300 includes a processing circuitry 301. The processing circuitry 301 includes at least an association configuration receiving unit 302 and an indication receiving unit 303. The processing circuitry 301 may be configured to perform the communication method shown in FIG. 23B.

Figure 23B:
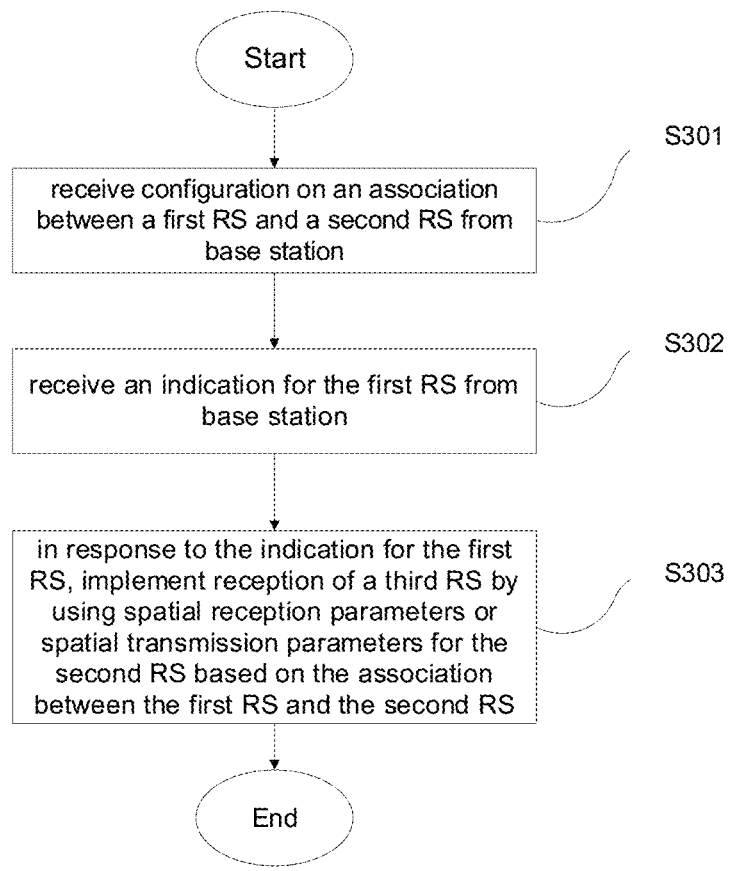

The association configuration receiving unit 302 in the processing circuitry 301 is configured to receive configuration on an association between a source reference signal and an intermediate reference signal from a base station, that is, to perform step S301 in FIG. 23B. The association configuration receiving unit 302 is configured to receive RRC signaling regarding the association between the source reference signal and the intermediate reference signal. The association between the source reference signal and the intermediate reference signal may include the association between the spatial relation information referring to the source reference signal and the TCI state referring to the intermediate reference signal. The processing circuitry 301 may store the received association information in the UE, for example, in a memory 306.

The indication receiving unit 303 is configured to receive an indication for the intermediate reference signal from the base station, that is, to perform step S302 in FIG. 23B. The indication receiving unit 303 may receive the indication information of the TCI state corresponding to the intermediate reference signal through MAC CE or DCI.

The reference signal sending unit 304 is configured to in response to the indication for the intermediate reference signal and based on the association between the intermediate reference signal and the source reference signal, use spatial reception parameters or spatial transmission parameters for the source reference signal to implement reception of a target reference signal, that is, to perform step S303 in FIG. 23B. Based on the association between the intermediate reference signal and the source reference signal, the reference signal sending unit 304 finds the source reference signal from the intermediate reference signal referred to in the TCI state received by the indication receiving unit 303, and configures the antenna array by using the spatial reception parameters previously determined when receiving the source reference signal such as SSB or NZP-CSI-RS or the spatial transmission parameters previously determined when transmitting the source reference signal such as SRS, so as to facilitate the transmission of PUCCH or SRS.

The electronic device 300 may further include, for example, a communication unit 305 and a memory 306.

The communication unit 305 may be configured to communicate with the base station under the control of the processing circuitry 301. In an example, the communication unit 305 may be implemented as a transmitter or transceiver, including communication components such as an antenna array and/or a radio frequency link. The communication unit 305 is drawn with a dashed line because it may also be located outside the electronic device 300. The communication unit 305 may receive configuration information on the association between the source reference signal and the intermediate reference signal, the beam indication information and the like from the base station. The communication unit 305 may also transmit PUCCH or SRS.

The electronic device 300 may further include the memory 306. The memory 306 can store various data and instructions, such as the configuration information on the association between the source reference signal and the intermediate reference signal and the beam instruction information, programs and data used for operation of the electronic device 300, and various data generated by the processing circuitry 301, data received by the communication unit 305, and the like.

Figure 24A:
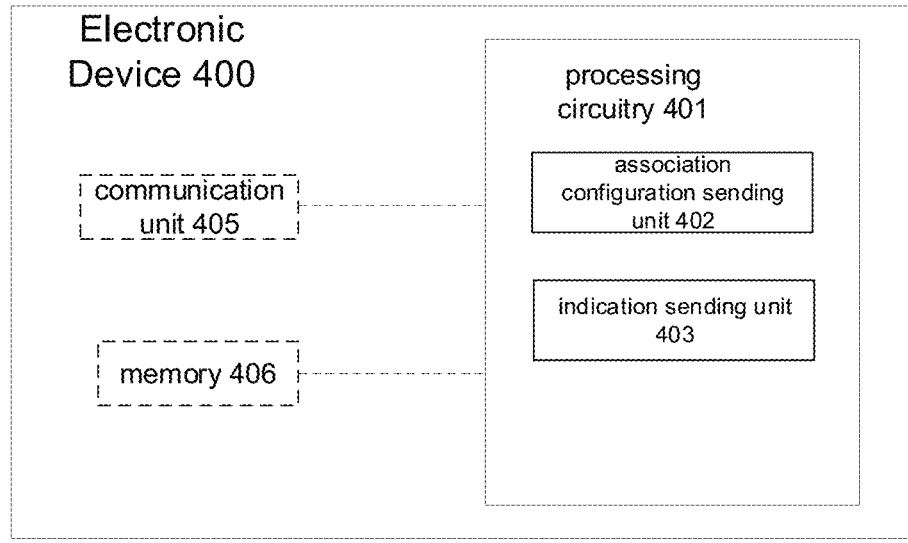
FIGS. 24A and 24B illustrate an electronic device on base station side and a communication method thereof according to the second embodiment.

FIG. 24A is a block diagram illustrating an electronic device 400 according to the present disclosure. The electronic device 400 may be or located in a control device such as a base station.

As shown in FIG. 24A, the electronic device 400 includes a processing circuitry 401. The processing circuitry 401 includes at least an association configuration sending unit 402 and an indication sending unit 403. The processing circuitry 401 may be configured to execute the communication method shown in FIG. 24B.

Figure 24B:
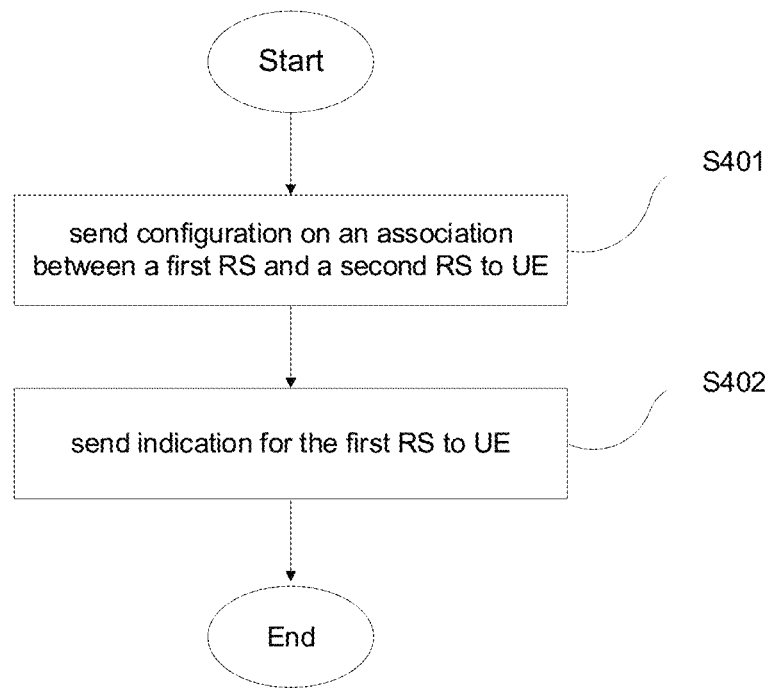

The association configuration sending unit 402 of the processing circuitry 401 is configured to send configuration on an association between a source reference signal and an intermediate reference signal to the UE, that is, to perform step S401 in FIG. 24B. The association configuration sending unit 402 can create the association between two reference signals, and configure such association to the UE through RRC layer signaling. The association between the source reference signal and the intermediate reference signal may include the association between spatial relation information referring to the source reference signal and a TCI state referring to the intermediate reference signal.

The indication sending unit 403 is configured to send an indication for the intermediate reference signal to the UE, that is, to perform step S402 in FIG. 24B. The indication sending unit 403 may include indication information of the TCI state corresponding to the intermediate reference signal in MAC CE or DCI.

In response to the indication for the intermediate reference signal, the UE may use spatial reception parameters or spatial transmission parameters for the source reference signal to implement reception of a target reference signal based on the association between the intermediate reference signal and the source reference signal.

The electronic device 400 may further include, for example, a communication unit 405 and a memory 406.

The communication unit 405 may be configured to communicate with the UE under the control of the processing circuitry 401. In an example, the communication unit 405 may be implemented as a transmitter or transceiver, including communication components such as an antenna array and/or a radio frequency link. The communication unit 405 is drawn with a dashed line because it can also be located outside the electronic device 400. The communication unit 405 may send the configuration information on the association between the intermediate reference signal and the source reference signal and the beam indication information for the intermediate reference signal to the UE.

The electronic device 400 may further include a memory 406. The memory 406 can store various data and instructions, such as programs and data used for operation of the electronic device 400, various data generated by the processing circuitry 401, various control signaling or service data to be sent by the communication unit 405, the association configuration information, beam indication information and the like to be sent by the communication unit 205. The memory 406 is drawn with a dashed line because it can also be located within the processing circuitry 401 or outside the electronic device 400.

Third Embodiment

As described in detail in the first and second embodiments above, in the beam indication for PDSCH, first, the base station uses RRC layer signaling to configure M (for example, M=64) TCI states for the UE. Each TCI state corresponds to a different beam. Then the base station uses a MAC CE to activate up to 8 TCI states for the UE. The beam directions corresponding to these activated TCI states can cover a certain spatial range where the UE is currently located, and the base station can indicate to the UE the beam closest to the current channel direction through DCI.

Figure 25A:
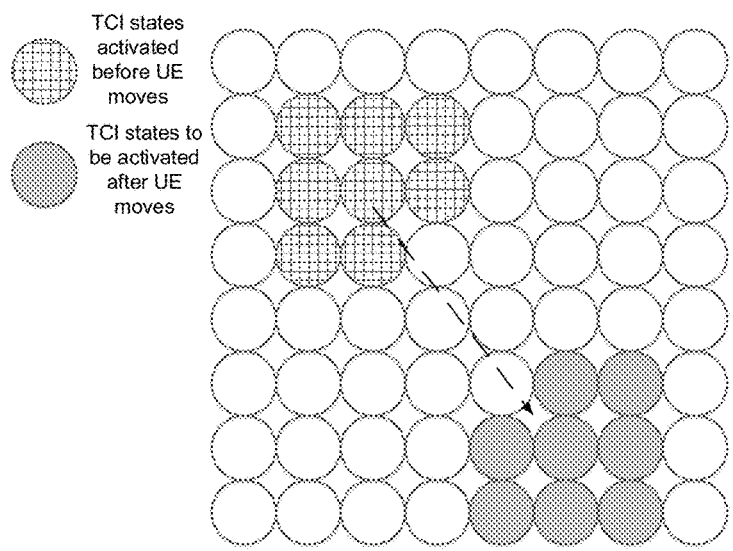
FIGS. 25A and 25B illustrate a situation where the TCI states need to be reactivated or reconfigured due to UE movement.

Consider an issue of mobility within the cell. The UE may have a large movement in the cell, resulting in the 8 activated TCI states becoming unsuitable for the beam indication. As shown in FIG. 25A, circles represent up to 64 TCI states configured for the UE, where the TCI states activated before the UE moves are represented by square-filled circles. After the UE moves, the TCI states that are more suitable for the beam indication to the UE are represented by circles filled with a solid color. In the existing beam indication mechanism, the base station needs to reactivate these TCI states in order to select a TCI state from them to indicate the beam closest to the channel direction to the UE. In addition, a rotation beam blocking or the like of the UE may also lead to situations that require reactivation.

Figure 25B:
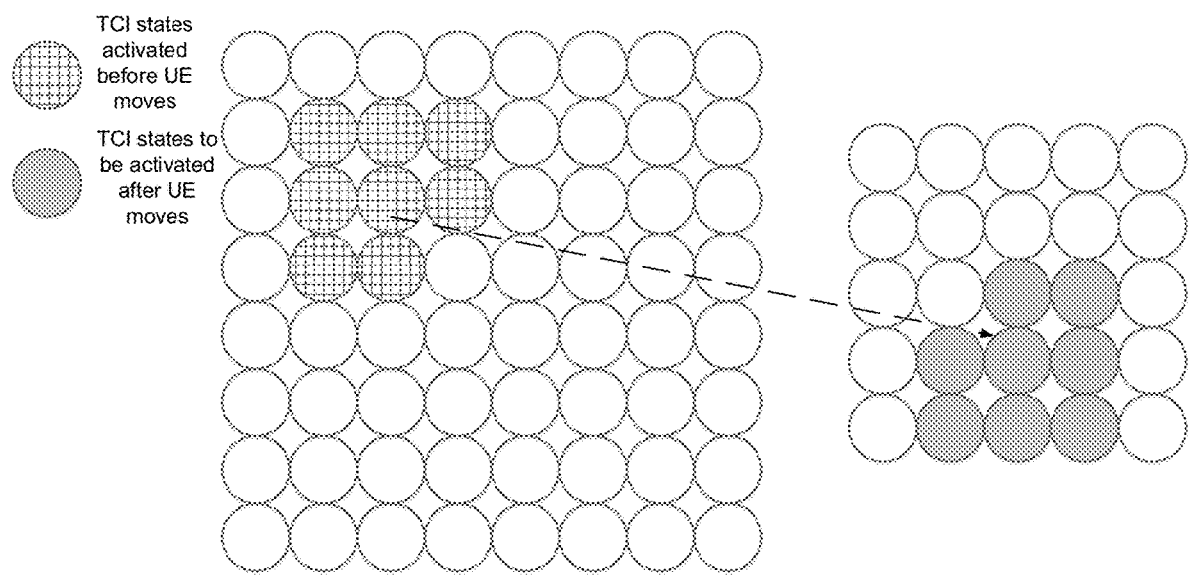

If the movement, rotation and beam blocking of the UE is large enough, it may even cause the currently configured TCI states to be unusable. FIG. 25B schematically shows such a situation. As shown in FIG. 25B, due to the movement of the UE, the current TCI states (circles filled with a solid color) suitable for the beam indication are not included in the configured 64 TCI states. At this time, in the existing beam indication mechanism, the base station needs to reconfigure the TCI states to configure these more suitable TCI states to the UE.

The reconfiguration and reactivation of the TCI state will consume a lot of signaling resources, resulting in a decrease in efficiency of the beam indication, which is undesired. Increasing the number of TCI states configured for the UE each time, for example, from at most 64 for each configuration to at most 128 for each configuration, can reduce the probability of reconfiguration to a certain extent.

In addition to this, the third embodiment of the present disclosure provides a solution for improving beam indication efficiency by establishing an association between TCI states.

Specifically, the base station can create an association between each TCI state and another TCI state, and configure these associations to the UE. Thus, each TCI state can not only represent itself, but also the TCI state associated with it. Based on these associations, an indirect beam indication can be achieved.

The indirect beam indication according to the third embodiment will be described in detail below with reference to FIGS. 26A and 26B.

Figure 26A:
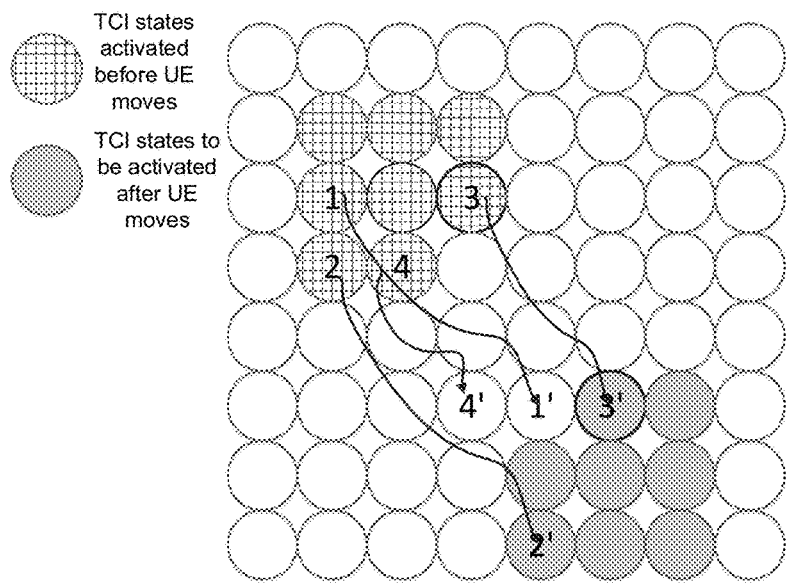
FIGS. 26A and 26B illustrate examples of association of TCI states according to the third embodiment.

FIG. 26A is a schematic diagram illustrating a kind of association of TCI states according to the third embodiment. In an example, the base station can divide the M TCI states configured for the UE (M=64 in FIG. 26A, but M can also be 128, etc.) TCI states into two groups. TCI states in the first group is associated with those in the second group one by one. This kind of association can be called "intra-group association".

FIG. 26A shows that among the 8 currently activated TCI states, TCI state 1 is associated with TCI state 1', TCI state 2 is associated with TCI state 2', TCI state 3 is associated with TCI state 3', and TCI state 4 is associated with TCI state 4'. For brevity, the associations of the remaining four TCI states are not shown in the figure.

It is understandable that since the beam directions corresponding to respective TCI states are generally different, the association of the TCI states in the third embodiment is not a spatial relationship, and the reference signals in the two associated TCI states for which the association is established do not necessarily have a QCL relationship. However, it is preferable to still consider the spatial relationship of the beams when establishing the association between the TCI states. For example, a distance between the beam directions corresponding to the two TCI states associated with each other is within a certain range, so that the coverage area of the beams corresponding to the two TCI states covers the movement of the UE as much as possible.

The base station can configure these associations to the UE through RRC signaling. For example, the base station may configure the association information between the TCI state IDs of the TCI states associated with each other to the UE. The UE receives and saves the association information.

When the UE is experiencing movement, rotation, beam blocking or the like, the currently activated 8 TCI states are not suitable for the beam indication for the UE, but TCI state 2' corresponding to TCI state 2 and TCI state 3 corresponding to TCI state 3' are suitable for the beam indication for the UE. In this case, the base station may not perform reactivation of the TCI states.

The base station can determine which of the beam corresponding to TCI state 2' and the beam corresponding to TCI state 3' is closer to the channel direction, the corresponding TCI state is selected for the beam indication, for example, the base station selects the beam corresponding to TCI state 3' as the optimal beam.

Since TCI state 3 is currently activated and TCI state 3' is not activated, the base station sends the indication information of TCI state 3 to the UE through DCI.

In order that the UE knows whether the indication by TCI state 3 is for the TCI state 3 itself or for the associated TCI state 3', the base station may also send association enabling information on whether to activate the association. The association enabling information can be sent to the UE through DCI together with the indication information for the TCI state 3. The DCI format depicted in FIG. 15B can be used here. As shown in FIG. 15B, the DCI includes a 3-bit identification field of TCI state and 1-bit association enabling information.

The UE receives the DCI through PDCCH, and finds the identification field that identifies the TCI state 3 and the corresponding association enabling information from the DCI. The association enabling information is set to indicate enablement of association, and the UE finds the TCI state 3' based on the association between the TCI state 3 and the TCI state 3', and uses the reference signal referred to in the TCI state 3' to receive the PDSCH.

On the contrary, if the association enabling information is set to indicate disablement of association, the UE uses the reference signal referred to in TCI state 3 to receive the PDSCH.

According to this example, as long as there is a TCI state suitable for beam indication in the currently activated TCI states and their associated TCI states (16 in total), there is no need to reactivate a new TCI state. This improves the efficiency of beam indication.

Figure 26B:
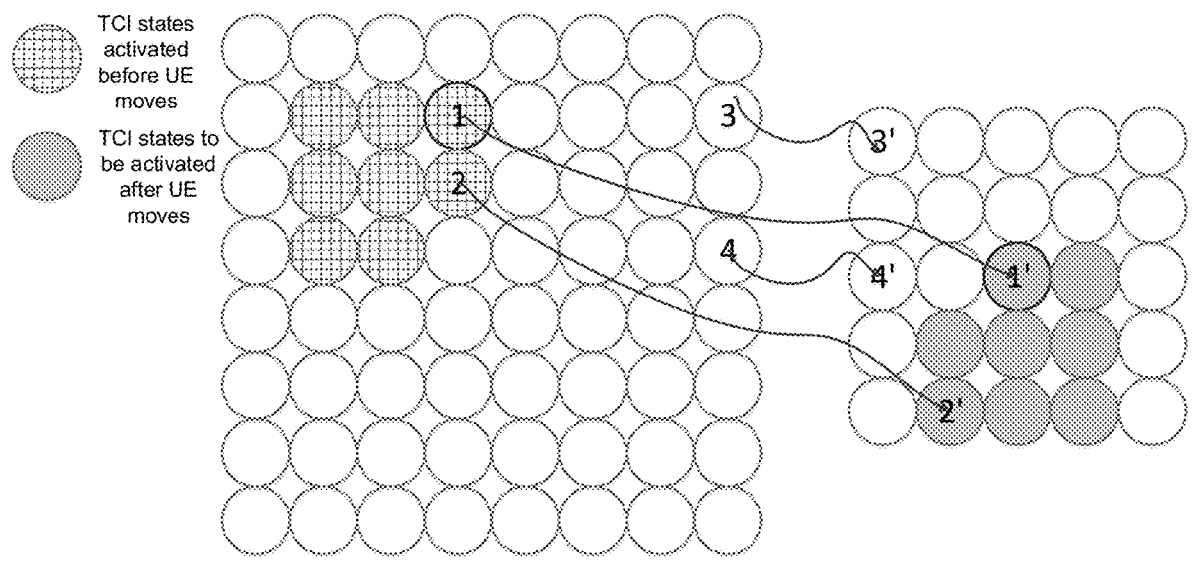

FIG. 26B is a schematic diagram illustrating another type of association of TCI states according to the third embodiment. In an example, the base station may associate M (M=64 in FIG. 26B, but M may also be 128, etc.) TCI states configured for the UE with other M unconfigured TCI states one by one. This type of association can be called "intergroup association".

FIG. 26B shows that among the 8 currently activated TCI states, TCI state 1 is associated with unconfigured TCI state 1', TCI state 2 is associated with unconfigured TCI state 2', and TCI state 3 is associated with unconfigured TCI state 3', and TCI state 4 is associated with unconfigured TCI state 4'. For brevity, the associations of the remaining four TCI states are not shown in the figure.

Similarly, the associations between TCI states here may not have a QCL relationship. The base station can configure these associations to the UE through RRC signaling. For example, the base station may configure the association information between TCI state IDs of the mutually associated TCI states to the UE. The UE receives and saves the associated information.

When the UE is experiencing movement, rotation, beam blocking or the like, the currently activated 8 TCI states are not suitable for the beam indication for the UE, but TCI state 2' corresponding to TCI state 2 and TCI state 1' corresponding to TCI state 1 are suitable for the beam indication for the UE. In this case, the base station may not perform the reconfiguration of the TCI states.

The base station can determine which of the beam corresponding to TCI state 1' and the beam corresponding to TCI state 2' is closer to the channel direction, the corresponding TCI state is selected for beam indication, for example, the base station selects the beam corresponding to TCI state 1' as the optimal beam.

Since TCI state 1 is currently activated and TCI state 1' is not activated, the base station sends indication information of TCI state 1 to the UE through DCI.

In order that the UE knows whether the indication with TCI state 1 is for the TCI state 1 itself or for the associated TCI state 1', the base station may also send association enabling information on whether to activate the association. The association enabling information can be sent to the UE through DCI together with the indication information for TCI state 1. As shown in FIG. 15B, the DCI includes a 3-bit identification field of TCI state and 1-bit association enabling information.

The UE receives the DCI through PDCCH, and finds the identification field that identifies TCI state 1 and the corresponding association enabling information from the DCI. The association enabling information is set to indicate enablement of association, and the UE finds TCI state 1' based on the association between TCI state 1 and TCI state 1', and uses the reference signal referred to in TCI state 1' to receive the PDSCH.

On the contrary, if the association enabling information is set to indicate disablement of association, the UE uses the reference signal referred in TCI state 1 to receive the PDSCH.

According to this example, as long as there is a TCI state suitable for beam indication in the currently activated TCI states and their associated TCI states (16 in total), there is no need to reconfigure and reactivate a new TCI state. This improves the efficiency of beam indication.

Alternatively, when the UE moves, rotates, encounters beam blocking or the like, the base station can determine 8 new TCI states of the most suitable beams (denoted as TCI states 1'~8') at this time, and create these one-to-one associations between the 8 TCI states and the 8 currently activated TCI states (denoted as TCI states 1~8). The base station configures such association information to the UE through RRC layer signaling.

Then, the base station can select a certain TCI state whose beam direction is closest to the channel direction from these 8 new TCI states, for example, TCI state 1'.

Without reactivation, the base station indicates the currently activated TCI state 1 associated with TCI state 1' to the UE. In addition, the base station also sends association enabling information to the UE.

After the UE receives the indication information for TCI state 1 and the association enabling information, in response to the association enabling information indicating enablement of association, it can find TCI state 1' based on the association between TCI state 1 and TCI state 1', and Use the reference signal referred to in TCI state 1' to receive the PDSCH.

Although the indirect beam indication according to the third embodiment is described above by taking PDSCH transmission as example, the third embodiment of the present disclosure is not limited to the PDSCH transmission, and may be applied to PDCCH transmission after appropriate modifications.

(Electronic Device and Communication Method According to the Third Embodiment)

Next, an electronic device and a communication method that can implement the third embodiment of the present disclosure are described.

Figure 27A:
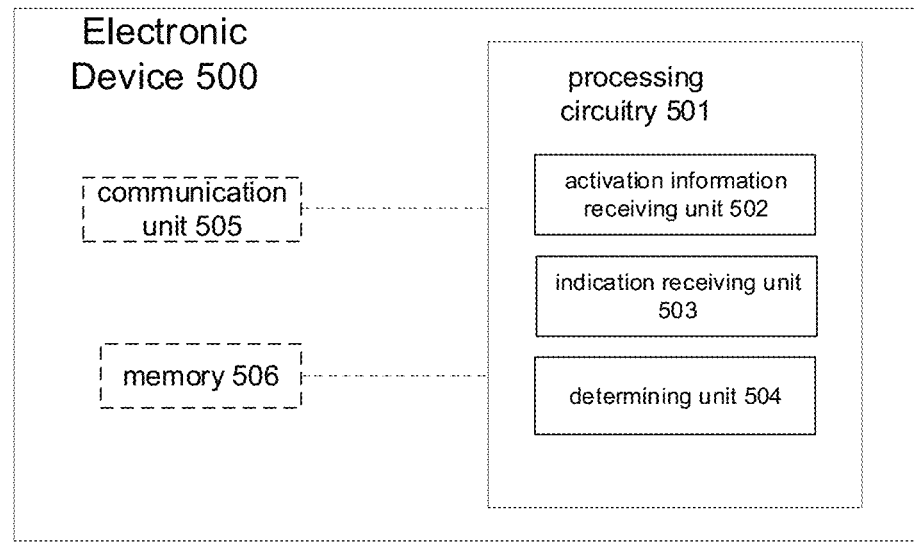
FIGS. 27A and 27B illustrate an electronic device on UE side and a communication method thereof according to the third embodiment.

FIG. 27A is a block diagram illustrating an electronic device 500 according to the present disclosure. The electronic device 500 may be a UE or a component of the UE.

As shown in FIG. 27A, the electronic device 500 includes a processing circuitry 501. The processing circuitry 501 includes at least an activation receiving unit 502 and an indication receiving unit 503. The processing circuitry 501 may be configured to perform the communication method shown in FIG. 27B.

Figure 27B:
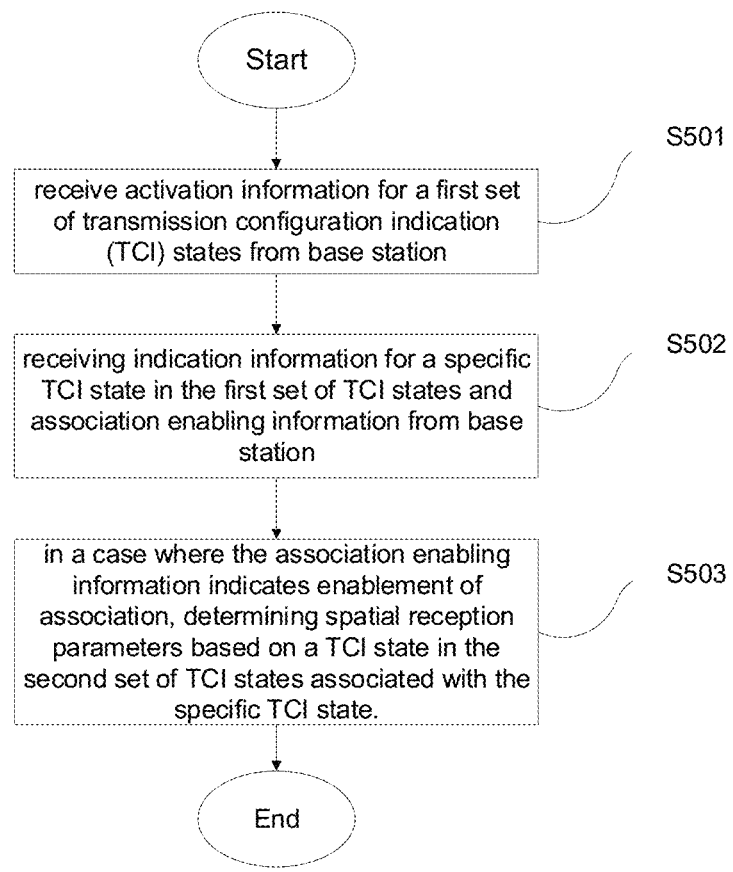

The activation information receiving unit 502 in the processing circuitry 501 is configured to receive activation information for a first set of transmission configuration indication (TCI) states from a control device such as a base station, that is, to perform step S501 in FIG. 27B. Each TCI state in the first set TCI states is respectively associated with a corresponding one in a second set of TCI states.

The indication receiving unit 505 is configured to receive indication information for a specific TCI state in the first set of TCI states and its associated activation information from the control device, that is, to perform step S502 in FIG. 27B. The indication receiving unit 503 may receive the indication information for the specific TCI state through DCI. The association enabling information may be included in the DCI together with the indication information.

The determining unit 504 is configured to determine spatial reception parameters based on the TCI state in the second set of TCI states which is associated with the specific TCI state in a case where the association enabling information indicates enablement of association, that is, to perform step S503 in FIG. 27. In addition, in a case where the association enabling information indicates disablement of association, the determining unit 504 determines spatial reception parameters based on the specific TCI state.

The electronic device 500 may further include, for example, a communication unit 505 and a memory 506.

The communication unit 505 may be configured to communicate with the base station under the control of the processing circuitry 501. In an example, the communication unit 505 may be implemented as a transmitter or transceiver, including communication components such as an antenna array and/or a radio frequency link. The communication unit 505 is drawn with a dashed line because it can also be located outside the electronic device 500. The communication unit 505 may receive the activation information, the indication information, and the association enabling information for the TCI state from the base station.

The electronic device 500 may further include a memory 506. The memory 506 can store various data and instructions, such as the activation information, the indication information, and the association enabling information for the TCI state received from the base station, programs and data for operation of the electronic device 500, various data generated by the processing circuitry 501, data to be sent by the communication unit 505 and the like.

Figure 28A:
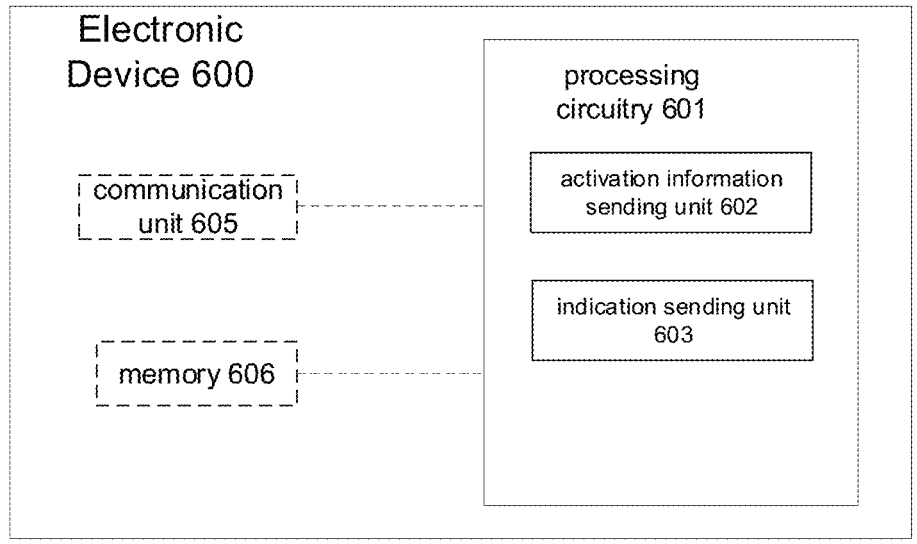
FIGS. 28A and 28B illustrate an electronic device on base station side and a communication method thereof according to the third embodiment.

FIG. 28A is a block diagram illustrating an electronic device 600 according to the present disclosure. The electronic device 600 may be or located in a control device such as a base station.

As shown in FIG. 28A, the electronic device 600 includes a processing circuitry 601. The processing circuitry 601 includes at least an activation information sending unit 602 and an indication sending unit 603. The processing circuitry 601 may be configured to perform the communication method shown in FIG. 28B.

Figure 28B:
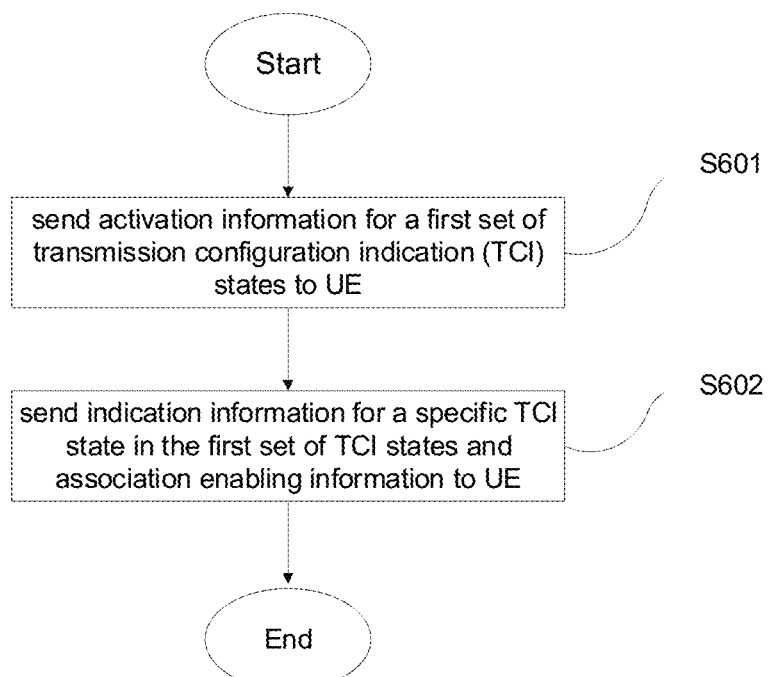

The activation information sending unit 602 of the processing circuitry 601 is configured to send activation information for a first set of TCI states to the UE, that is, to perform step S601 in FIG. 28B. Each TCI state in the first set of TCI states is respectively associated with a corresponding TCI state in a second set of TCI states.

The indication sending unit 603 is configured to send indication information for a specific TCI state in the first set of TCI states and its associated activation information to the UE, that is, to perform step S602 in FIG. 23B. The indication sending unit 503 may send the indication information for the specific TCI state through DCI. The association enabling information may be included in the DCI together with the indication information.

In a case where the association enabling information indicates enablement of association, the UE may determine spatial reception parameters based on the TCI state in the second set of TCI states which is associated with the specific TCI state. In addition, in a case where the association enabling information indicates disablement of association, the UE determines the spatial reception parameters based on the specific TCI state.

The electronic device 600 may further include, for example, a communication unit 605 and a memory 606.

The communication unit 605 may be configured to communicate with the UE under the control of the processing circuitry 601. In an example, the communication unit 605 may be implemented as a transmitter or transceiver, including communication components such as an antenna array and/or a radio frequency link. The communication unit 605 is drawn with a dashed line because it can also be located outside the electronic device 600. The communication unit 605 may send the configuration information on associations between TCI states, the beam indication information, and the association enabling information to the UE.

The electronic device 600 may further include a memory 606. The memory 606 can store various data and instructions, such as programs and data used for operation of the electronic device 600, various data generated by the processing circuitry 601, various control signaling or service data received by the communication unit 605, the beam indication information and the association enabling information to sent by the communication unit 605. The memory 606 is drawn with a dashed line because it can also be located in the processing circuitry 601 or outside the electronic device 600.

The various aspects of the embodiments of the present disclosure have been described in detail above, but it should be noted that, in order to describe the structure, arrangement, type, number, etc. of the antenna array as shown, ports, reference signals, communication devices, communication methods and the like are not intended to limit the aspects of the present disclosure to these specific examples.

It should be understood that the various units of the electronic device 100, 200, 300, 400, 500 and 600 described in the above embodiments are only logical modules divided according to the specific functions they implement, and are not used to limit specific implementations. In the actual implementation, the foregoing units may be implemented as individual physical entities, or may also be implemented by a single entity (for example, a processor (CPU or DSP, etc.), an integrated circuit, etc.).

[Exemplary Implementations of the Present Disclosure]

According to the embodiments of the present disclosure, various implementations for practicing concepts of the present disclosure can be conceived, including but not limited to:

1). An electronic device on user device side, comprising: a processing circuitry configured to: receive, from a control device, configuration on an association between a first reference signal and a second reference signal; receive, from the control device, an indication for the first reference signal; and in response to the indication for the first reference signal, implement reception of a third reference signal by using spatial reception parameters for the second reference signal based on the association between the first reference signal and the second reference signal.

2). An electronic device on control device side, comprising: a processing circuitry configured to: send, to a user device, configuration on an association between a first reference signal and a second reference signal; and send, to the user device, an indication for the first reference signal; wherein in response to the indication for the first reference signal, the user device implements reception of a third reference signal by using spatial reception parameters for the second reference signal based on the association between the first reference signal and the second reference signal.

3). The electronic device of 1) or 2), wherein implementing reception of the third reference signal by using spatial reception parameters for the second reference signal comprising determining spatial reception parameters for the third reference signal by using the spatial reception parameters for the second reference signal so as to implement the reception of the third reference signal.

4). The electronic device of 1) or 2), wherein a port of the second reference signal and a port of the third reference signal have a Quasi Co-Located (QCL) relationship with respect to spatial reception parameters.

5). The electronic device of 1) or 2), wherein the association between the first reference signal and the second reference signal includes a QCL relationship between the first reference signal and the second reference signal.

6). The electronic device of 1) or 2), wherein the association between the first reference signal and the second reference signal is implemented by a QCL relationship between the first reference signal and a fourth reference signal and a QCL relationship between the fourth reference signal and the second reference signal.

7). The electronic device of 1) or 2), wherein the first reference signal includes any of synchronization signal/physical broadcast channel block (SSB) signal and channel state information reference signal (CSI-RS)

8). The electronic device of 1) or 2), wherein the second reference signal includes any of synchronization signal/physical broadcast channel block (SSB) signal and channel state information reference signal (CSI-RS), and the third reference signal includes demodulation reference signal (DMRS).

9). The electronic device of 1) or 2), wherein the spatial reception parameters are beamforming parameters for forming a receiving beam.

10). The electronic device of 1) or 2), wherein receiving the indication for the first reference signal includes receiving a transmission configuration indication (TCI) state containing identification information of the first reference signal.

11). An electronic device on user device side, comprising: a processing circuitry configured to: receive, from a control device, configuration on an association between a first reference signal and a second reference signal; receive, from the control device, an indication for the first reference signal; and in response to the indication for the first reference signal, implement transmission of a third reference signal by using spatial reception parameters or spatial transmission parameters for the second reference signal based on the association between the first reference signal and the second reference signal.

12). An electronic device on control device side, comprising: a processing circuitry configured to: send, to a user device, configuration on an association between a first reference signal and a second reference signal; and send, to the user device, an indication for the first reference signal; wherein in response to the indication for the first reference signal, the user device implements transmission of a third reference signal by using spatial reception parameters or spatial transmission parameters for the second reference signal based on the association between the first reference signal and the second reference signal.

13). The electronic device of 11) or 12), wherein the second reference signal is a downlink reference signal, and wherein implementing the transmission of the third reference signal by using the spatial reception parameters or the spatial transmission parameters for the second reference signal includes: determining the spatial transmission parameters for the third reference signal by using the spatial reception parameters for the second reference signal, so as to implement the transmission of the third reference signal.

14). The electronic device of 11) or 12), wherein the second reference signal is an uplink reference signal, and wherein implementing the transmission of the third reference signal by using the spatial reception parameters or the spatial transmission parameters for the second reference signal includes: determining the spatial transmission parameters for the third reference signal by using the spatial transmission parameters for the second reference signal, so as to implement the transmission of the third reference signal.

15). The electronic device of 11) or 12), wherein a downlink wireless channel through which the second reference signal propagates is symmetrical to an uplink wireless channel through which the third reference signal propagates.

16). The electronic device of 11) or 12), wherein the association between the first reference signal and the second reference signal includes an association between a transmission configuration indication (TCI) state containing identification information of the first reference signal and spatial relation information (SpatialRelationInfo) containing identification information of the second reference signal.

17). The electronic device of 11) or 12), wherein the first reference signal and the second reference signal are the same downlink reference signal.

18). The electronic device of 11) or 12), wherein the first reference signal includes any of synchronization signal/physical broadcast channel block (SSB) signal and channel state information reference signal (CSI-RS).

19). The electronic device of 13), wherein the second reference signal comprises any of synchronization signal/physical broadcast channel block (SSB) signal and channel state information reference signal (CSI-RS), and the third reference signal includes demodulation reference signal (DMRS) and sounding reference signal (SRS).

20). The electronic device of 14), wherein the second reference signal includes sounding reference signal (SRS), and the third reference signal includes any of demodulation reference signal (DMRS) and sounding reference signal (SRS).

21). The electronic device of 11) or 12), wherein the spatial reception parameters are beamforming parameters for forming a receiving beam.

22). The electronic device of 11) or 12), wherein the spatial transmission parameters are beamforming parameters for forming a transmitting beam.

23). The electronic device of 11) or 12), wherein receiving the indication for the first reference signal includes receiving a transmission configuration indication (TCI) state containing identification information of the first reference signal.

24). An electronic device on user device side, comprising: a processing circuitry configured to: receive, from a control device, activation information for a first set of transmission configuration indication (TCI) states, wherein each of the first set of TCI states is respectively associated with a corresponding one of a second set of TCI states; receive, from the control device, indication information for a specific TCI state in the first set of TCI states and association enabling information; and in a case where the association enabling information indicates enablement of association, determine spatial reception parameters based on an TCI state in the second set of TCI states associated with the specific TCI state.

25). The electronic device of 24), wherein the processing circuitry is further configured to in the case where the association enabling information indicates disablement of association, determine the spatial reception parameters based on the specific TCI state.

26). The electronic device of 24), wherein in a case where at least one TCI state in the first set of TCI states and the second set of TCI states is determined to be suitable for beam indication, there is no activation information for the TCI state from the control device.

27). The electronic device of 24) or 25), wherein the association enabling information is included in Downlink Control Information (DCI).

28). An electronic device on control device side, comprising: a processing circuitry configured to send, to a user device, activation information for a first set of transmission configuration indication (TCI) states, wherein each of the first set of TCI states is respectively associated with a corresponding one of a second set TCI states; and send, to the user device, indication information for a specific TCI state in the first set of TCI states and association enabling information, wherein in a case where the association enabling information indicates enablement of association, a TCI state in the second set of TCI states associated with the specific TCI state is used by the user device to determine spatial reception parameters.

29). The electronic device of 28), wherein in a case where the association enabling information indicates disablement of association, the specific TCI state is used by the user device to determine the spatial reception parameters.

30). The electronic device of 28), wherein the processing circuitry is further configured to: in a case where at least one TCI state in the first set of TCI states and the second set of TCI states is determined to be suitable for beam indication, do not send the activation information for the TCI state to the user device.

31). The electronic device of 28) or 29), wherein the association enabling information is included in Downlink Control Information (DCI).

32). A communication method, comprising: receiving, from a control device, configuration on an association between a first reference signal and a second reference signal; receiving, from the control device, an indication for the first reference signal; and in response to the indication for the first reference signal, implementing reception of a third reference signal by using spatial reception parameters for the second reference signal based on the association between the first reference signal and the second reference signal.

33). A communication method, comprising: sending, to a user device, configuration on an association between a first reference signal and a second reference signal; and sending, to the user device, an indication for the first reference signal; wherein in response to the indication for the first reference signal, the user device implements reception of a third reference signal by using spatial reception parameters for the second reference signal based on the association between the first reference signal and the second reference signal.

34). A communication method, comprising: receiving, from a control device, configuration on an association between a first reference signal and a second reference signal; receiving, from the control device, an indication for the first reference signal; and in response to the indication for the first reference signal, implementing transmission of a third reference signal by using spatial reception parameters or spatial transmission parameters for the second reference signal based on the association between the first reference signal and the second reference signal.

35). A communication method, comprising: sending, to a user device, configuration on an association between a first reference signal and a second reference signal; and sending, to the user device, an indication for the first reference signal; wherein in response to the indication for the first reference signal, the user device implements transmission of a third reference signal by using spatial reception parameters or spatial transmission parameters for the second reference signal based on the association between the first reference signal and the second reference signal.

36). A communication method, comprising: receiving, from a control device, activation information for a first set of transmission configuration indication (TCI) states, wherein each of the first set of TCI states is respectively associated with a corresponding one of a second set of TCI states; receiving, from the control device, indication information for a specific TCI state in the first set of TCI states and association enabling information; and in a case where the association enabling information indicates enablement of association, determining spatial reception parameters based on an TCI state in the second set of TCI states associated with the specific TCI state.

37). A communication method, comprising: sending, to a user device, activation information for a first set of transmission configuration indication (TCI) states, wherein each of the first set of TCI states is respectively associated with a corresponding one of a second set TCI states; and sending, to the user device, indication information for a specific TCI state in the first set of TCI states and association enabling information, wherein in a case where the association enabling information indicates enablement of association, a TCI state in the second set of TCI states associated with the specific TCI state is used by the user device to determine spatial reception parameters.

38). A non-transitory computer readable storage medium storing executable instructions which, when executed, perform the communication method according to any of 32)-37).

[Application Examples of the Present Disclosure]

The technology of the present disclosure can be applied to various products.

For example, the electronic device 200, 400 and 600 according to the embodiments of the present disclosure can be implemented as a variety of base stations or included in a variety of base stations, and the electronic device 100, 300 and 500 according to the embodiments of the present disclosure can be implemented as a variety of user devices or included in a variety of user devices.

The communication method according to the embodiments of the present disclosure may be implemented by various base stations or user devices; the methods and operations according to the embodiments of the present disclosure may be embodied as computer-executable instructions, stored in a non-transitory computer-readable storage medium, and can be performed by various base stations or user devices to implement one or more of the above-mentioned functions.

The technology according to the embodiments of the present disclosure can be made into various computer program products, which can be used in various base stations or user devices to implement one or more of the above-mentioned functions.

The base stations mentioned in the present disclosure can be implemented as any type of base stations, preferably, such as the macro gNB or ng-eNB defined in the 3GPP 5G NR standard. A gNB may be a gNB that covers a cell smaller than a macro cell, such as a pico gNB, micro gNB, and home (femto) gNB. Instead, the base station may be implemented as any other types of base stations such as a NodeB, eNodeB and a base transceiver station (BTS). The base station may include a main body configured to control wireless communication, and one or more remote radio heads (RRH), a wirelesss relay, a drone control tower, main control unit in an automated factory or the like disposed in a different place from the main body.

The user device may be implemented as a mobile terminal such as a smartphone, a tablet personal computer (PC), a notebook PC, a portable game terminal, a portable/dongle type mobile router, and a digital camera apparatus, or an in-vehicle terminal such as a car navigation device. The terminal device may also be implemented as a terminal (that is also referred to as a machine type communication (MTC) terminal) that performs machine-to-machine (M2M) communication, a drone, a sensor or actuator in an automated factory or the like. Furthermore, the terminal device may be a wireless communication module (such as an integrated circuit module including a single die) mounted on each of the above terminals.

Examples of the base station and the user device in which the present disclosure can be applied will be described briefly below.

It should be understood that the term "base station" in the present disclosure has the full breadth of its usual meaning and includes at least a wireless communication station that is used as part of a wireless communication system or radio system for facilitating communication. Examples of base stations may be, for example but not limited to, the following: maybe one or both of a base transceiver station (BTS) and a base station controller (BSC) in a GSM system, may be one or both of a radio network controller (RNC) and Node B in a WCDMA system, may be eNBs in LTE and LTE-Advanced systems, or may be corresponding network nodes in future communication systems (such as gNB, eLTE, eNB, etc. that may appear in 5G communication systems). Part of the functions in the base station of the present disclosure can also be implemented as an entity with control function for communication in D2D, M2M, and V2V communication scenarios, or as an entity that plays a spectrum coordination role in cognitive radio communication scenarios. In an automated factory, an entity providing a network control function can be called a base station.

First Application of Base Station

Figure 29:
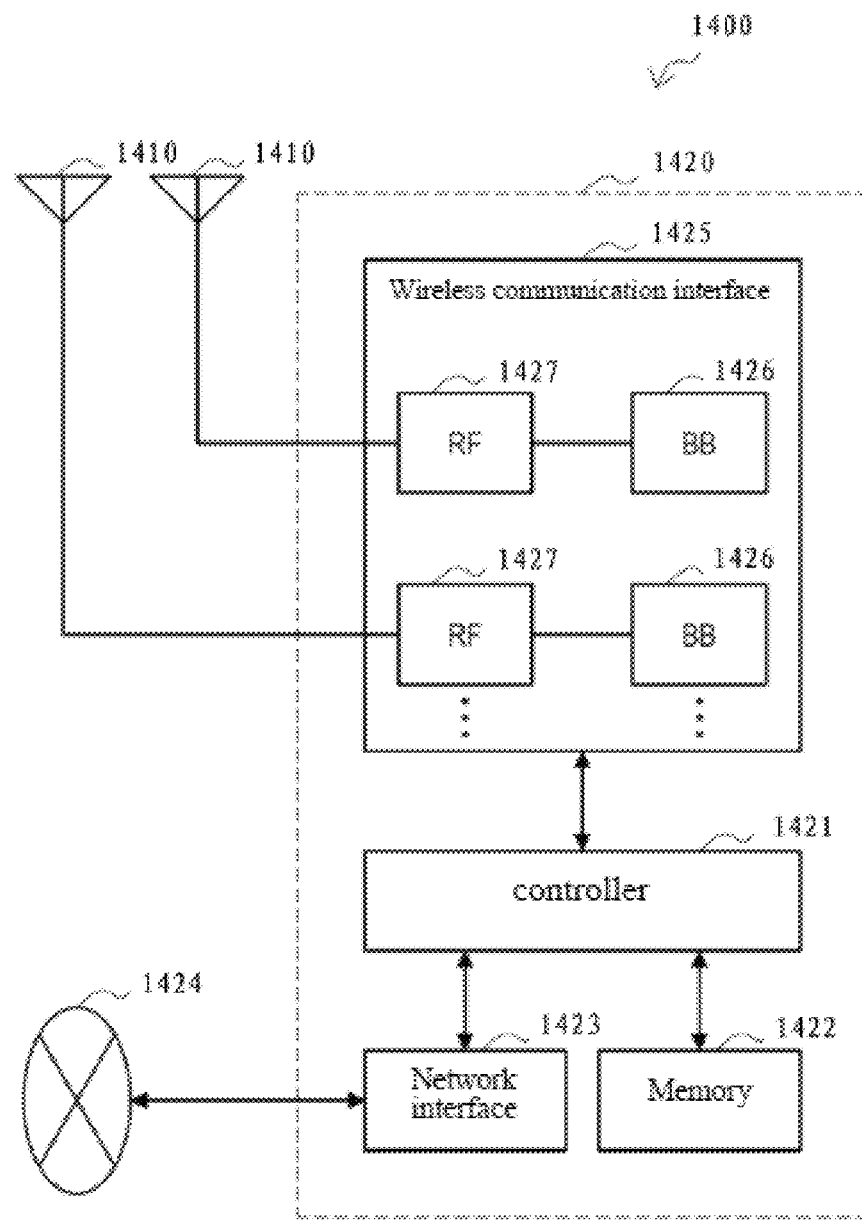
FIG. 29 illustrates a first example of schematic configuration of the base station according to the present disclosure.

FIG. 29 is a block diagram showing a first example of a schematic configuration of a base station to which the technology of the present disclosure can be applied. In FIG. 29, the base station is implemented as gNB 1400. The gNB 1400 includes a plurality of antennas 1410 and a base station device 1420. The base station device 1420 and each antenna 1410 may be connected to each other via an RF cable. In an implementation manner, the gNB 1400 (or the base station device 1420) herein may correspond to the above-mentioned electronic devices 200, 400 and/or 60.

The antennas 1410 includes multiple antenna elements, such as multiple antenna arrays for large-scale MIMO. The antennas 1410, for example, can be arranged into the antenna array matrix as shown in FIG. 2A, and are used for the base station device 1420 to transmit and receive wireless signals. For example, multiple antennas 1410 may be compatible with multiple frequency bands used by gNB 1400.

The base station device 1420 includes a controller 1421, a memory 1422, a network interface 1423, and a wireless communication interface 1425.

The controller 1421 may be, for example, a CPU or a DSP, and operates various functions of the base station device 1420 at a higher layer. For example, the controller 1421 may include the processing circuitry 201, 401, or 601 described above, perform the communication method described in FIG. 17B, 24B, or 28B, or control various components of the electronic device 200, 400, or 600. For example, the controller 1421 generates data packets based on data in signals processed by the wireless communication interface 1425, and passes the generated packets via the network interface 1423. The controller 1421 may bundle data from multiple baseband processors to generate bundled packets, and pass the generated bundled packets. The controller 1421 may have logical functions that perform controls such as radio resource control, radio bearer control, mobility management, admission control, and scheduling. The controls can be performed in conjunction with a nearby gNB or core network node. The memory 1422 includes a RAM and a ROM, and stores a program executed by the controller 1421 and various types of control data such as a terminal list, transmission power data, and scheduling data.

The network interface 1423 is a communication interface for connecting the base station device 1420 to the core network 1424. The controller 1421 may communicate with a core network node or another gNB via the network interface 1423. In this case, the gNB 1400 and the core network node or other gNBs may be connected to each other through a logical interface such as an S1 interface and an X2 interface. The network interface 1423 may also be a wired communication interface or a wireless communication interface for a wireless backhaul line. If the network interface 1423 is a wireless communication interface, compared with the frequency band used by the wireless communication interface 1425, the network interface 1423 can use a higher frequency band for wireless communication.

The wireless communication interface 1425 supports any cellular communication scheme such as 5G NR, and provides a wireless connection to a terminal located in a cell of the gNB 1400 via an antenna 1410. The wireless communication interface 1425 may generally include, for example, a baseband (BB) processor 1426 and an RF circuit 1427. The BB processor 1426 may perform, for example, encoding/decoding, modulation/demodulation, and multiplexing/demultiplexing, and execute various types of signal processing in layers such as L1, Medium Access Control (MAC), Radio Link Control (RLC), and Packet Data Convergence Protocol (PDCP). As an alternative of the controller 1421, the BB processor 1426 may have a part or all of the above-mentioned logical functions. The BB processor 1426 may be a memory storing a communication control program, or a module including a processor and related circuits configured to execute the program. Updating the program can change the function of the BB processor 1426. The module may be a card or a blade inserted into a slot of the base station device 1420. Alternatively, the module may be a chip mounted on a card or a blade. Meanwhile, the RF circuit 1427 may include, for example, a mixer, a filter, and an amplifier, and transmits and receives a wireless signal via the antenna 1410. Although FIG. 16 illustrates an example in which one RF circuit 1427 is connected to one antenna 1410, the present disclosure is not limited to this illustration, but one RF circuit 1427 may be connected to multiple antennas 1410 at the same time.

As shown in FIG. 29, the wireless communication interface 1425 may include a plurality of BB processors 1426. For example, the plurality of BB processors 1426 may be compatible with multiple frequency bands used by gNB 1400. As shown in FIG. 29, the wireless communication interface 1425 may include a plurality of RF circuits 1427. For example, the plurality of RF circuits 1427 may be compatible with multiple antenna elements. Although FIG. 29 shows an example in which the wireless communication interface 1425 includes a plurality of BB processors 1426 and a plurality of RF circuits 1427, the wireless communication interface 1425 may also include a single BB processor 1426 or a single RF circuit 1427.

In the gNB 1400 illustrated in FIG. 29, one or more of the units included in the processing circuitry 201 described with reference to FIG. 17A, the processing circuitry 401 described with reference to FIG. 24A or the processing circuitry 601 described with reference to FIG. 28A may be implemented in the radio communication interface 1425. Alternatively, at least a part of these components may be implemented in the controller 1421. As an example, the gNB 1400 includes a part (for example, the BB processor 1426) or the entire of the radio communication interface 1425 and/or a module including the controller 1421, and the one or more components may be implemented in the module. In this case, the module may store a program (in other words, a program causing the processor to execute operations of the one or more components) causing the processor to function as the one or more components, and execute the program. As another example, a program causing the processor to function as the one or more components may be installed in the gNB 1400, and the radio communication interface 1425 (for example, the BB processor 1426) and/or the controller 1421 may execute the program. As described above, as a device including the one or more components, the gNB 1400, the base station device 1420 or the module may be provided. In addition, a readable medium in which the program is recorded may be provided.

Second Application Example of Base Station

Figure 30:
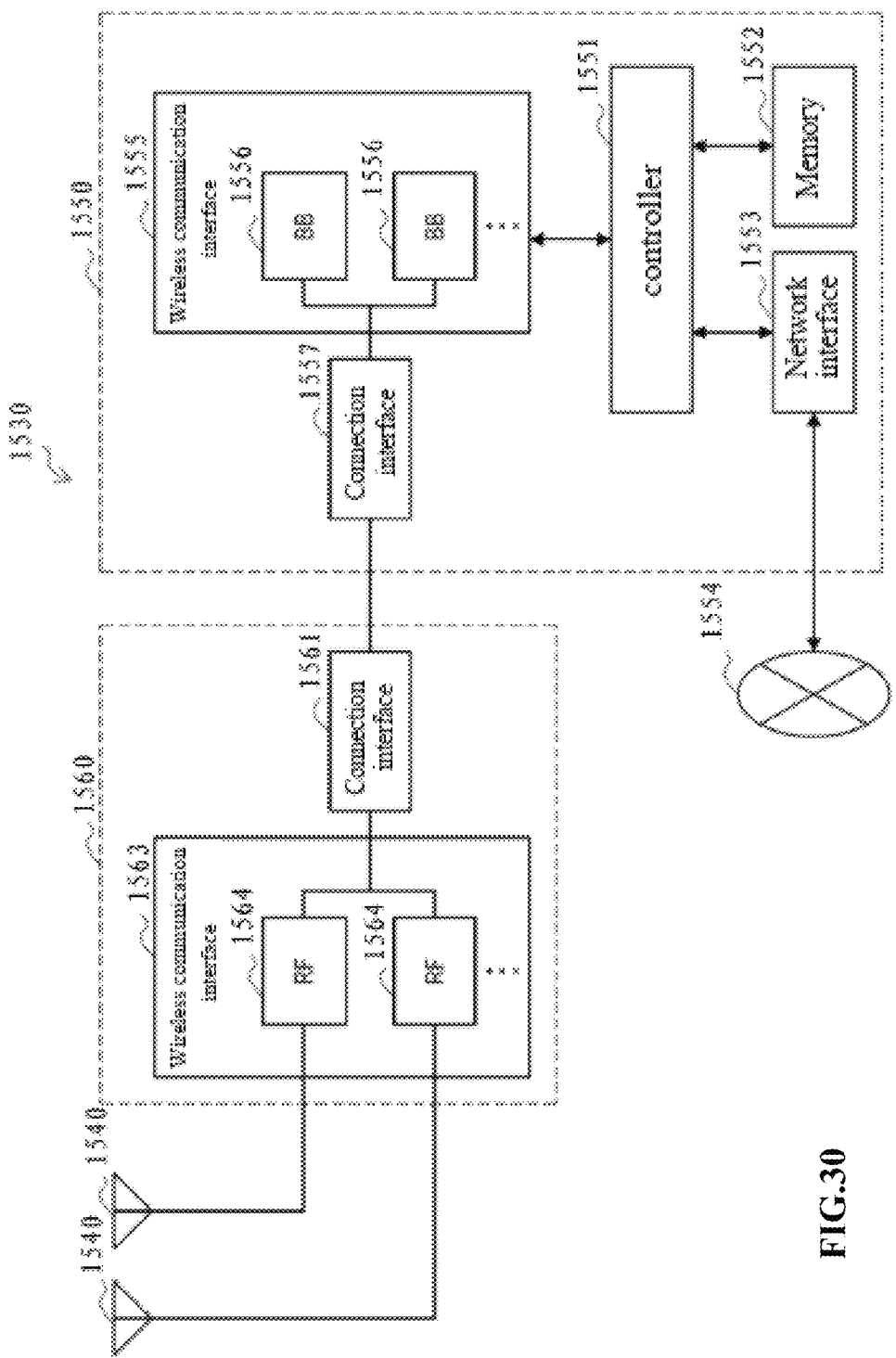
FIG. 30 illustrates a second example of schematic configuration of the base station according to the present disclosure.

FIG. 30 is a block diagram showing a second example of a schematic configuration of a base station to which the technology of the present disclosure can be applied. In FIG. 30, the base station is shown as gNB 1530. The gNB 1530 includes multiple antennas 1540, base station equipment 1550, and RRH 1560. The RRH 1560 and each antenna 1540 may be connected to each other via an RF cable. The base station equipment 1550 and the RRH 1560 may be connected to each other via a high-speed line such as a fiber optic cable. In an implementation manner, the gNB 1530 (or the base station device 1550) herein may correspond to the foregoing electronic devices 200, 400, 600.

The antennas 1540 includes multiple antenna elements, such as multiple antenna arrays for large-scale MIMO. The antennas 1540, for example, can be arranged into the antenna array matrix as shown in FIG. 2A, and are used for the base station device 1550 to transmit and receive wireless signals. For example, multiple antennas 1540 may be compatible with multiple frequency bands used by gNB 1530.

The base station device 1550 includes a controller 1551, a memory 1552, a network interface 1553, a wireless communication interface 1555, and a connection interface 1557. The controller 1551, the memory 1552, and the network interface 1553 are the same as the controller 1421, the memory 1422, and the network interface 1423 described with reference to FIG. 29.

The wireless communication interface 1555 supports any cellular communication scheme such as 5G NR, and provides wireless communication to a terminal located in a sector corresponding to the RRH 1560 via the RRH 1560 and the antenna 1540. The wireless communication interface 1555 may typically include, for example, a BB processor 1556. The BB processor 1556 is the same as the BB processor 1426 described with reference to FIG. 29 except that the BB processor 1556 is connected to the RF circuit 1564 of the RRH 1560 via the connection interface 1557. As shown in FIG. 30, the wireless communication interface 1555 may include a plurality of BB processors 1556. For example, multiple BB processors 1556 may be compatible with multiple frequency bands used by gNB 1530. Although FIG. 30 shows an example in which the wireless communication interface 1555 includes a plurality of BB processors 1556, the wireless communication interface 1555 may also include a single BB processor 1556.

The connection interface 1557 is an interface for connecting the base station device 1550 (wireless communication interface 1555) to the RRH 1560. The connection interface 1557 may also be a communication module for communication in the above-mentioned high-speed line connecting the base station device 1550 (wireless communication interface 1555) to the RRH 1560.

The RRH 1560 includes a connection interface 1561 and a wireless communication interface 1563.

The connection interface 1561 is an interface for connecting the RRH 1560 (wireless communication interface 1563) to the base station device 1550. The connection interface 1561 may also be a communication module for communication in the above-mentioned high-speed line.

The wireless communication interface 1563 transmits and receives wireless signals via the antenna 1540. The wireless communication interface 1563 may generally include, for example, an RF circuit 1564. The RF circuit 1564 may include, for example, a mixer, a filter, and an amplifier, and transmits and receives wireless signals via the antenna 1540. Although FIG. 30 illustrates an example in which one RF circuit 1564 is connected to one antenna 1540, the present disclosure is not limited to this illustration, but one RF circuit 1564 may be connected to multiple antennas 1540 at the same time.

As shown in FIG. 30, the wireless communication interface 1563 may include a plurality of RF circuits 1564. For example, the plurality of RF circuits 1564 may support multiple antenna elements. Although FIG. 30 shows an example in which the wireless communication interface 1563 includes a plurality of RF circuits 1564, the wireless communication interface 1563 may include a single RF circuit 1564.

In the gNB 1500 shown in FIG. 30, one or more units included in the processing circuitry 201 described with reference to FIG. 17A, the processing circuitry 401 described with reference to FIG. 24A, or the processing circuitry 601 described with reference to FIG. 28A may be implemented in the wireless communication interface 1525. Alternatively, at least a part of these components may be implemented in the controller 1521. For example, the gNB 1500 includes a part (for example, the BB processor 1526) or the whole of the wireless communication interface 1525, and/or a module including the controller 1521, and one or more components may be implemented in the module. In this case, the module may store a program for allowing the processor to function as one or more components (in other words, a program for allowing the processor to perform operations of one or more components), and may execute the program. As another example, a program for allowing the processor to function as one or more components may be installed in the gNB 1500, and the wireless communication interface 1525 (for example, the BB processor 1526) and/or the controller 1521 may execute the program. As described above, as a device including one or more components, the gNB 1500, the base station device 1520, or a module may be provided, and a program for allowing the processor to function as one or more components may be provided. In addition, a readable medium in which the program is recorded may be provided.

First Application Example of User Device

Figure 31:
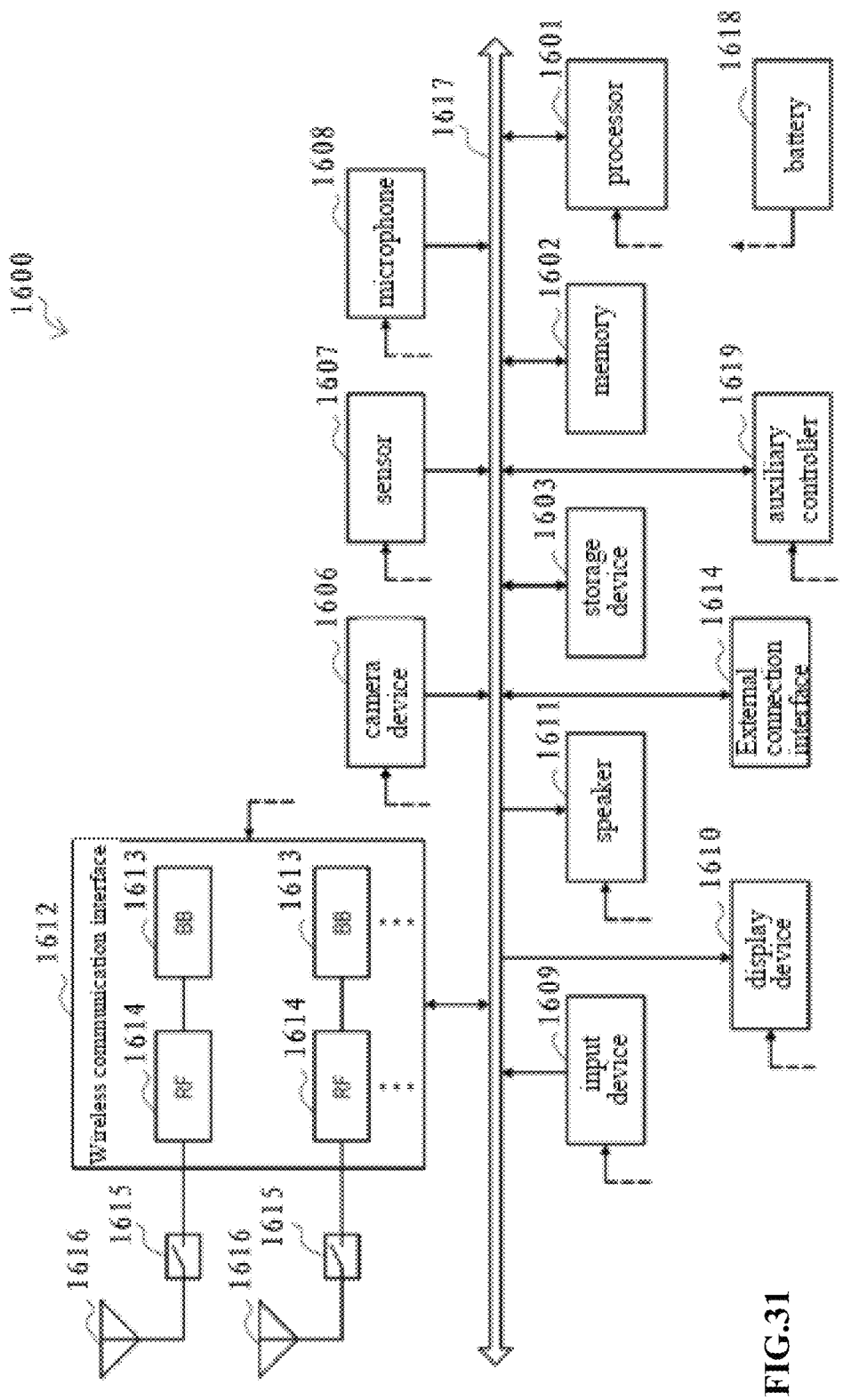
FIG. 31 illustrates an example of schematic configuration of a smart phone according to the present disclosure.

FIG. 31 is a block diagram showing an example of a schematic configuration of a smartphone 1600 to which the technology of the present disclosure can be applied. In an example, the smart phone 1600 may be implemented as the electronic device 100 described with reference to FIG. 16A, the electronic device 300 described with reference to FIG. 23A, or the electronic device 500 described with reference to FIG. 27A.

The smartphone 1600 includes a processor 1601, a memory 1602, a storage device 1603, an external connection interface 1604, a camera device 1606, a sensor 1607, a microphone 1608, an input device 1609, a display device 1610, a speaker 1611, a wireless communication interface 1612, one or more antenna switches 1615, one or more antennas 1616, a bus 1617, a battery 1618, and an auxiliary controller 1619.

The processor 1601 may be, for example, a CPU or a system on chip (SoC), and controls functions of an application layer and another layer of the smartphone 1600. The processor 1601 may include or serve as the processing circuitry 101 described with reference to 16A, the processing circuitry 301 described with reference to 12A, and the processing circuitry 501 described with reference to 27A. The memory 1602 includes a RAM and a ROM, and stores data and programs executed by the processor 1601. The storage device 1603 may include a storage medium such as a semiconductor memory and a hard disk. The external connection interface 1604 is an interface for connecting external devices such as a memory card and a universal serial bus (USB) device to the smartphone 1600.

The camera device 1606 includes an image sensor such as a charge-coupled device (CCD) and a complementary metal oxide semiconductor (CMOS), and generates a captured image. The sensor 1607 may include a set of sensors such as a measurement sensor, a gyroscope sensor, a geomagnetic sensor, and an acceleration sensor. The microphone 1608 converts a sound input to the smartphone 1600 into an audio signal. The input device 1609 includes, for example, a touch sensor, a keypad, a keyboard, a button, or a switch configured to detect a touch on the screen of the display device 1610, and receives an operation or information input from a user. The display device 1610 includes a screen such as a liquid crystal display (LCD) and an organic light emitting diode (OLED) display, and displays an output image of the smartphone 1600. The speaker 1611 converts an audio signal output from the smartphone 1600 into a sound.

The wireless communication interface 1612 supports any cellular communication scheme such as 4G LTE, 5G NR or the like, and performs wireless communication. The wireless communication interface 1612 may generally include, for example, a BB processor 1613 and an RF circuit 1614. The BB processor 1613 may perform, for example, encoding/decoding, modulation/demodulation, and multiplexing/demultiplexing, and perform various types of signal processing for wireless communication. Meanwhile, the RF circuit 1614 may include, for example, a mixer, a filter, and an amplifier, and transmits and receives wireless signals via the antenna 1616. The wireless communication interface 1612 may be a chip module on which a BB processor 1613 and an RF circuit 1614 are integrated. As shown in FIG. 31, the wireless communication interface 1612 may include multiple BB processors 1613 and multiple RF circuits 1614. Although FIG. 31 illustrates an example in which the wireless communication interface 1612 includes a plurality of BB processors 1613 and a plurality of RF circuits 1614, the wireless communication interface 1612 may also include a single BB processor 1613 or a single RF circuit 1614.

In addition, in addition to the cellular communication scheme, the wireless communication interface 1612 may support other types of wireless communication scheme, such as a short-range wireless communication scheme, a near field communication scheme, and a wireless local area network (LAN) scheme. In this case, the wireless communication interface 1612 may include a BB processor 1613 and an RF circuit 1614 for each wireless communication scheme.

Each of the antenna switches 1615 switches a connection destination of the antenna 1616 between a plurality of circuits included in the wireless communication interface 1612 (for example, circuits for different wireless communication schemes).

The antennas 1616 includes multiple antenna elements, such as multiple antenna arrays for large-scale MIMO. The antennas 1616, for example, can be arranged into the antenna array matrix as shown in FIG. 2A, and are used for the wireless communication interface 1612 to transmit and receive wireless signals. The smart phone 1600 can includes one or more antenna panels (not shown).

In addition, the smartphone 1600 may include an antenna 1616 for each wireless communication scheme. In this case, the antenna switch 1615 may be omitted from the configuration of the smartphone 1600.

The bus 1617 connects the processor 1601, the memory 1602, the storage device 1603, the external connection interface 1604, the camera device 1606, the sensor 1607, the microphone 1608, the input device 1609, the display device 1610, the speaker 1611, the wireless communication interface 1612, and the auxiliary controller 1619 to each other. The battery 1618 supplies power to each block of the smartphone 1600 shown in FIG. 31 via a feeder, and the feeder is partially shown as a dotted line in the figure. The auxiliary controller 1619 operates the minimum necessary functions of the smartphone 1600 in the sleep mode, for example.

In the smart phone 1600 shown in FIG. 31, one or more components included in the processing circuitry 101 described with reference to FIG. 16A, the processing circuitry 301 described with reference to FIG. 23A, or the processing circuitry 501 described with reference to FIG. 27A may be implemented in the wireless communication interface 1612. Alternatively, at least a part of these components may be implemented in the processor 1601 or the auxiliary controller 1619. As an example, the smart phone 1600 includes a part (for example, the BB processor 1613) or the whole of the wireless communication interface 1612, and/or a module including the processor 1601 and/or the auxiliary controller 1619, and one or more components may be Implemented in this module. In this case, the module may store a program that allows processing to function as one or more components (in other words, a program for allowing the processor to perform operations of one or more components), and may execute the program. As another example, a program for allowing the processor to function as one or more components may be installed in the smart phone 1600, and the wireless communication interface 1612 (for example, the BB processor 1613), the processor 1601, and/or the auxiliary The controller 1619 can execute this program. As described above, as a device including one or more components, a smart phone 1600 or a module may be provided, and a program for allowing a processor to function as one or more components may be provided. In addition, a readable medium in which the program is recorded may be provided.

Second Application Example of User Device

Figure 32:
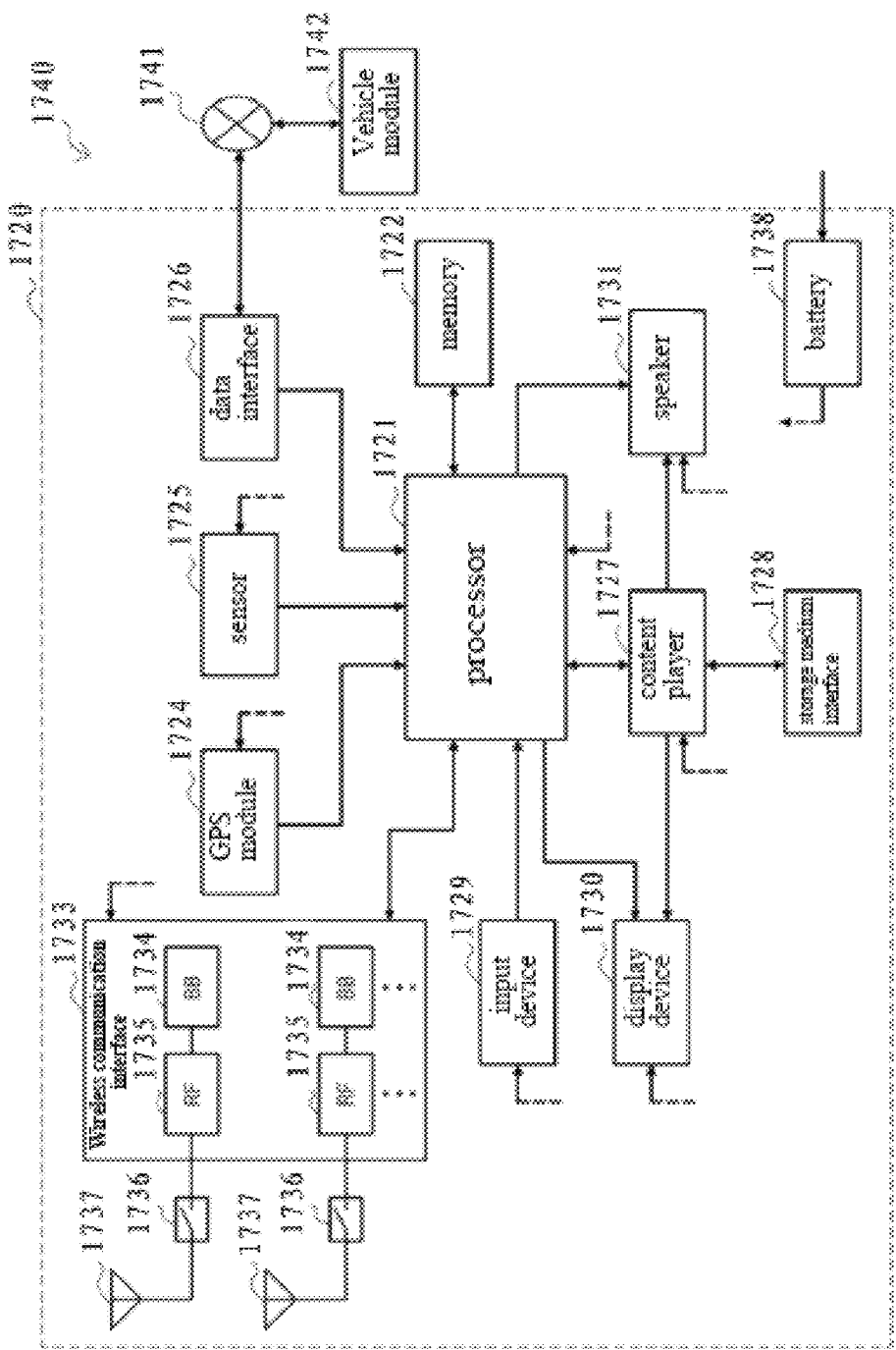
FIG. 32 illustrates an example of schematic configuration of an automobile navigation device according to the present disclosure.

FIG. 32 is a block diagram showing an example of a schematic configuration of a car navigation device 1720 to which the technology of the present disclosure can be applied. The car navigation device 1720 may be implemented as the electronic device 100 described with reference to FIG. 16A, the electronic device 300 described with reference to FIG. 23A, or the electronic device 500 described with reference to FIG. 27A. The car navigation device 1720 includes a processor 1721, a memory 1722, a global positioning system (GPS) module 1724, a sensor 1725, a data interface 1726, a content player 1727, a storage medium interface 1728, an input device 1729, a display device 1730, a speaker 1731, and a wireless communication interface 1733, one or more antenna switches 1736, one or more antennas 1737, and a battery 1738.

The processor 1721 may be, for example, a CPU or a SoC, and controls navigation functions and other functions of the car navigation device 1720. The memory 1722 includes a RAM and a ROM, and stores data and programs executed by the processor 1721.

The GPS module 1724 uses a GPS signal received from a GPS satellite to measure the position (such as latitude, longitude, and altitude) of the car navigation device 1720. The sensor 1725 may include a set of sensors such as a gyroscope sensor, a geomagnetic sensor, and an air pressure sensor. The data interface 1726 is connected to, for example, an in-vehicle network 1741 via a terminal not shown, and acquires data (such as vehicle speed data) generated by the vehicle.

The content player 1727 reproduces content stored in a storage medium such as a CD and a DVD, which is inserted into the storage medium interface 1728. The input device 1729 includes, for example, a touch sensor, a button, or a switch configured to detect a touch on the screen of the display device 1730, and receives an operation or information input from a user. The display device 1730 includes a screen such as an LCD or OLED display, and displays an image of a navigation function or reproduced content. The speaker 1731 outputs the sound of the navigation function or the reproduced content.

The wireless communication interface 1733 supports any cellular communication scheme such as 4G LTE or 5G NR, and performs wireless communication. The wireless communication interface 1733 may generally include, for example, a BB processor 1734 and an RF circuit 1735. The BB processor 1734 may perform, for example, encoding/decoding, modulation/demodulation, and multiplexing/demultiplexing, and perform various types of signal processing for wireless communication. Meanwhile, the RF circuit 1735 may include, for example, a mixer, a filter, and an amplifier, and transmit and receive wireless signals via the antenna 1737. The wireless communication interface 1733 may also be a chip module on which a BB processor 1734 and an RF circuit 1735 are integrated. As shown in FIG. 32, the wireless communication interface 1733 may include a plurality of BB processors 1734 and a plurality of RF circuits 1735. Although FIG. 32 shows an example in which the wireless communication interface 1733 includes a plurality of BB processors 1734 and a plurality of RF circuits 1735, the wireless communication interface 1733 may also include a single BB processor 1734 or a single RF circuit 1735.

In addition, in addition to the cellular communication scheme, the wireless communication interface 1733 may support other types of wireless communication scheme, such as a short-range wireless communication scheme, a near field communication scheme, and a wireless LAN scheme. In this case, the wireless communication interface 1733 may include a BB processor 1734 and an RF circuit 1735 for each wireless communication scheme.

Each of the antenna switches 1736 switches the connection destination of the antenna 1737 between a plurality of circuits included in the wireless communication interface 1733, such as circuits for different wireless communication schemes.

The antennas 1737 includes multiple antenna elements, such as multiple antenna arrays for large-scale MIMO. The antennas 1737, for example, can be arranged into the antenna array matrix as shown in FIG. 2A, and are used for the wireless communication interface 1733 to transmit and receive wireless signals.

In addition, the car navigation device 1720 may include an antenna 1737 for each wireless communication scheme. In this case, the antenna switch 1736 may be omitted from the configuration of the car navigation device 1720.

The battery 1738 supplies power to each block of the car navigation device 1720 shown in FIG. 32 via a feeder, and the feeder is partially shown as a dotted line in the figure. The battery 1738 accumulates power provided from the vehicle.

In the car navigation device 1720 shown in FIG. 32, one or more components included in the processing circuitry 101 described with reference to FIG. 16A, the processing circuitry 301 described with reference to FIG. 23A, or the processing circuitry 501 described with reference to FIG. 27A can be implemented in the wireless communication interface 1733. Alternatively, at least a part of these components may be implemented in the processor 1721. As an example, the car navigation device 1720 includes a part (for example, the BB processor 1734) or the whole of the wireless communication interface 1733, and/or a module including the processor 1721, and one or more components may be implemented in the module. In this case, the module may store a program that allows processing to function as one or more components (in other words, a program for allowing the processor to perform operations of one or more components), and may execute the program. As another example, a program for allowing the processor to function as one or more components may be installed in the car navigation device 1720, and the wireless communication interface 1733 (for example, the BB processor 1734) and/or the processor 1721 may Execute the procedure. As described above, as a device including one or more components, a car navigation device 1720 or a module may be provided, and a program for allowing the processor to function as one or more components may be provided. In addition, a readable medium in which the program is recorded may be provided.

In addition, in the car navigation device 1720 shown in FIG. 32, for example, the communication units 105, 305, and 505 of FIGS. 16A, 23A, and 27A may be implemented in the wireless communication interface 1933 (for example, the RF circuit 1935).

The technology of the present disclosure may also be implemented as an in-vehicle system (or vehicle) 1740 including one or more of a car navigation device 1720, an in-vehicle network 1741, and a vehicle module 1742. The vehicle module 1742 generates vehicle data such as vehicle speed, engine speed, and failure information, and outputs the generated data to the in-vehicle network 1741.

Although the illustrative embodiments of the present disclosure have been described with reference to the accompanying drawings, the present disclosure is certainly not limited to the above examples. Those skilled in the art may achieve various adaptions and modifications within the scope of the appended claims, and it will be appreciated that these adaptions and modifications certainly fall into the scope of the technology of the present disclosure.

For example, in the above embodiments, the multiple functions included in one module may be implemented by separate means. Alternatively, in the above embodiments, the multiple functions included in multiple modules may be implemented by separate means, respectively. In additions, one of the above functions may be implemented by multiple modules. Needless to say, such configurations are included in the scope of the technology of the present disclosure.

In this specification, the steps described in the flowcharts include not only the processes performed sequentially in chronological order, but also the processes performed in parallel or separately but not necessarily performed in chronological order. Furthermore, even in the steps performed in chronological order, needless to say, the order may be changed appropriately.

Although the present disclosure and its advantages have been described in detail, it will be appreciated that various changes, replacements and transformations may be made without departing from the spirit and scope of the present disclosure as defined by the appended claims. In addition, the terms "include", "comprise" or any other variants of the embodiments of the present disclosure are intended to be non-exclusive inclusion, such that the process, method, article or device including a series of elements includes not only these elements, but also those that are not listed specifically, or those that are inherent to the process, method, article or device. In case of further limitations, the element defined by the sentence "include one" does not exclude the presence of additional same elements in the process, method, article or device including this element.

What is claimed is:

1. An electronic device on user device side, comprising:
a processing circuitry configured to:
receive, from a control device in radio resource control (RRC) layer signaling, configuration on an association between a first reference signal and a second reference signal;
receive, from the control device in a medium access control (MAC) control element (CE) activation command, a transmission configuration indication (TCI) state indication for the first reference signal; and
in response to the MAC CE activation command for the first reference signal, implement reception of a third reference signal by using spatial reception parameters for the second reference signal based on the association between the first reference signal and the second reference signal, or
in response to the MAC CE activation command for the first reference signal, implement transmission of a third reference signal by using spatial reception parameters or spatial transmission parameters for the second reference signal based on the association between the first reference signal and the second reference signal.

2. The electronic device of claim 1, wherein implementing reception of the third reference signal by using spatial reception parameters for the second reference signal comprising determining spatial reception parameters for the third reference signal by using the spatial reception parameters for the second reference signal so as to implement the reception of the third reference signal.

3. The electronic device of claim 1, wherein a port of the second reference signal and a port of the third reference signal have a Quasi Co-Located (QCL) relationship with respect to spatial reception parameters.

4. The electronic device of claim 1, wherein the association between the first reference signal and the second reference signal includes a QCL relationship between the first reference signal and the second reference signal.

5. The electronic device of claim 1, wherein the association between the first reference signal and the second reference signal is implemented by a QCL relationship between the first reference signal and a fourth reference signal and a QCL relationship between the fourth reference signal and the second reference signal.

6. The electronic device of claim 1, wherein the first reference signal includes any of synchronization signal/physical broadcast channel block (SSB) signal and channel state information reference signal (CSI-RS).

7. The electronic device of claim 1, wherein the second reference signal includes any of synchronization signal/physical broadcast channel block (SSB) signal and channel state information reference signal (CSI-RS), and the third reference signal includes any of demodulation reference signal (DMRS) and sounding reference signal (SRS).

8. The electronic device of claim 1, wherein the second reference signal is a downlink reference signal, and wherein implementing the transmission of the third reference signal by using the spatial reception parameters or the spatial transmission parameters for the second reference signal includes: determining the spatial transmission parameters for the third reference signal by using the spatial reception parameters for the second reference signal, so as to implement the transmission of the third reference signal.

9. The electronic device of claim 1, wherein the second reference signal is an uplink reference signal, and wherein implementing the transmission of the third reference signal by using the spatial reception parameters or the spatial transmission parameters for the second reference signal includes: determining the spatial transmission parameters for the third reference signal by using the spatial transmission parameters for the second reference signal, so as to implement the transmission of the third reference signal.

10. The electronic device of claim 1, wherein a downlink wireless channel through which the second reference signal propagates is symmetrical to an uplink wireless channel through which the third reference signal propagates.

11. The electronic device of claim 1, wherein the TCI state contains identification information of the first reference signal and spatial relation information (SpatialRelationInfo) containing identification information of the second reference signal.

12. The electronic device of claim 1, wherein the first reference signal and the second reference signal are the same downlink reference signal.

13. The electronic device of claim 9, wherein the second reference signal includes sounding reference signal (SRS), and the third reference signal includes any of demodulation reference signal (DMRS) and sounding reference signal (SRS).

14. An electronic device on control device side, comprising:
a processing circuitry configured to:
send, to a user device in radio resource control (RRC) layer signaling, configuration on an association between a first reference signal and a second reference signal; and
send, to the user device in a medium access control (MAC) control element (CE) activation command, a transmission configuration indication (TCI) state indication for the first reference signal;
wherein in response to the MAC CE activation command for the first reference signal, the user device implements reception of a third reference signal by using spatial reception parameters for the second reference signal based on the association between the first reference signal and the second reference signal, or wherein in response to the MAC CE activation command for the first reference signal, the user device implements transmission of a third reference signal by using spatial reception parameters or spatial transmission parameters for the second reference signal based on the association between the first reference signal and the second reference signal.

15. A method performed by an electronic device on user device side, the method comprising:

receiving, from a control device in radio resource control (RRC) layer signaling, configuration on an association between a first reference signal and a second reference signal;

receiving, from the control device in a medium access control (MAC) control element (CE) activation command, a transmission configuration indication (TCI) state indication for the first reference signal; and in response to the MAC CE activation command for the first reference signal, implementing reception of a third reference signal by using spatial reception parameters for the second reference signal based on the association between the first reference signal and the second reference signal, or in response to the MAC CE activation command for the first reference signal, implementing transmission of a third reference signal by using spatial reception parameters or spatial transmission parameters for the second reference signal based on the association between the first reference signal and the second reference signal.

16. A method performed by an electronic device on control device side, the method comprising:

sending, to a user device in radio resource control (RRC) layer signaling, configuration on an association between a first reference signal and a second reference signal; and sending, to the user device in a medium access control (MAC) control element (CE) activation command, a transmission configuration indication (TCI) state indication for the first reference signal;

wherein in response to the MAC CE activation command for the first reference signal, the user device implements reception of a third reference signal by using spatial reception parameters for the second reference signal based on the association between the first reference signal and the second reference signal, or wherein in response to the MAC CE activation command for the first reference signal, the user device implements transmission of a third reference signal by using spatial reception parameters or spatial transmission parameters for the second reference signal based on the association between the first reference signal and the second reference signal.

* * * * *